(12) United States Patent (10) Patent No.: US 12,591,312 B2
Adachi et al. (45) Date of Patent: Mar. 31, 2026

(54) WEARABLE TERMINAL APPARATUS, PROGRAM, AND IMAGE PROCESSING METHOD

(71) Applicant: KYOCERA Corporation, Kyoto (JP)

(72) Inventors: Tomokazu Adachi, Yokohama (JP); Shingo Ito, Kyoto (JP); Kai Shimizu, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 203 days.

(21) Appl. No.: 18/571,304

(22) PCT Filed: Jun. 25, 2021

(86) PCT No.: PCT/JP2021/024076
§ 371 (c)(1),
(2) Date: Dec. 18, 2023

(87) PCT Pub. No.: WO2022/269887
PCT Pub. Date: Dec. 29, 2022

(65) Prior Publication Data
US 2024/0288948 A1 Aug. 29, 2024

(51) Int. Cl.
*G06F 3/01* (2006.01)
*G02B 27/01* (2006.01)
(Continued)

(52) U.S. Cl.
CPC ......... *G06F 3/017* (2013.01); *G02B 27/0101* (2013.01); *G02B 27/017* (2013.01);
(Continued)

(58) Field of Classification Search
CPC ......... G06F 3/017; G06F 3/011; G06V 40/10; G06V 40/28; G02B 27/0101; G02B 27/017; G02B 2027/0138; G02B 2027/014
See application file for complete search history.

(56) References Cited

U.S. PATENT DOCUMENTS

2016/0109957 A1 4/2016 Takashima
2017/0287218 A1* 10/2017 Nuernberger ....... G06F 3/04845
(Continued)

FOREIGN PATENT DOCUMENTS

JP 2013-161247 A 8/2013
JP 2014-93050 A 5/2014
(Continued)

OTHER PUBLICATIONS

Charles B. Owen et al., Dispay-Relative Calibration for Optical See-Through Head-Mounted Displays, Jan. 1, 2004, International Symposium on Mixed and Augmented Reality, pp. 1-9 (Year: 2004).*

(Continued)

*Primary Examiner* — Tam T Tran

(74) *Attorney, Agent, or Firm* — Studebaker Brackett PLLC

(57) ABSTRACT

A wearable terminal apparatus to be worn by a user for use includes a camera and at least one processor. The camera images a space as a visible region of the user. The at least one processor identifies, as a capture region, a part of the visible region in the space imaged by the camera, based on a first gesture operation of the user, and stores a capture image corresponding to the capture region in a storage unit. This allows a part of the visible region desired by the user to be stored as the capture image in the storage unit and thus can improve the user convenience.

36 Claims, 35 Drawing Sheets

(51) Int. Cl.
    G06V 40/10           (2022.01)
    G06V 40/20           (2022.01)

(52) U.S. Cl.
    CPC .............. G06F 3/011 (2013.01); G06V 40/10
               (2022.01); G06V 40/28 (2022.01); *G02B*
               *2027/0138* (2013.01); *G02B 2027/014*
                                 (2013.01)

(56)                References Cited

U.S. PATENT DOCUMENTS

| | | |
|---|---|---|
| 2019/0087021 A1 | 3/2019 | Balan et al. |
| 2019/0340822 A1 | 11/2019 | Ernst et al. |
| 2019/0377416 A1 | 12/2019 | Alexander |
| 2020/0192556 A1* | 6/2020 | Lee ....................... G06F 3/0488 |

FOREIGN PATENT DOCUMENTS

| | | |
|---|---|---|
| JP | 2014-525081 A | 9/2014 |
| WO | 2014/181380 A1 | 11/2014 |

OTHER PUBLICATIONS

Hyungki Hong et al., Increase of Virtual Image Area by Reflection of Mirrors, Dec. 1, 2007, Journal of Display Technology, vol. 3, No. 4, pp. 421-425 (Year: 2007).*

\* cited by examiner

FIG. 14
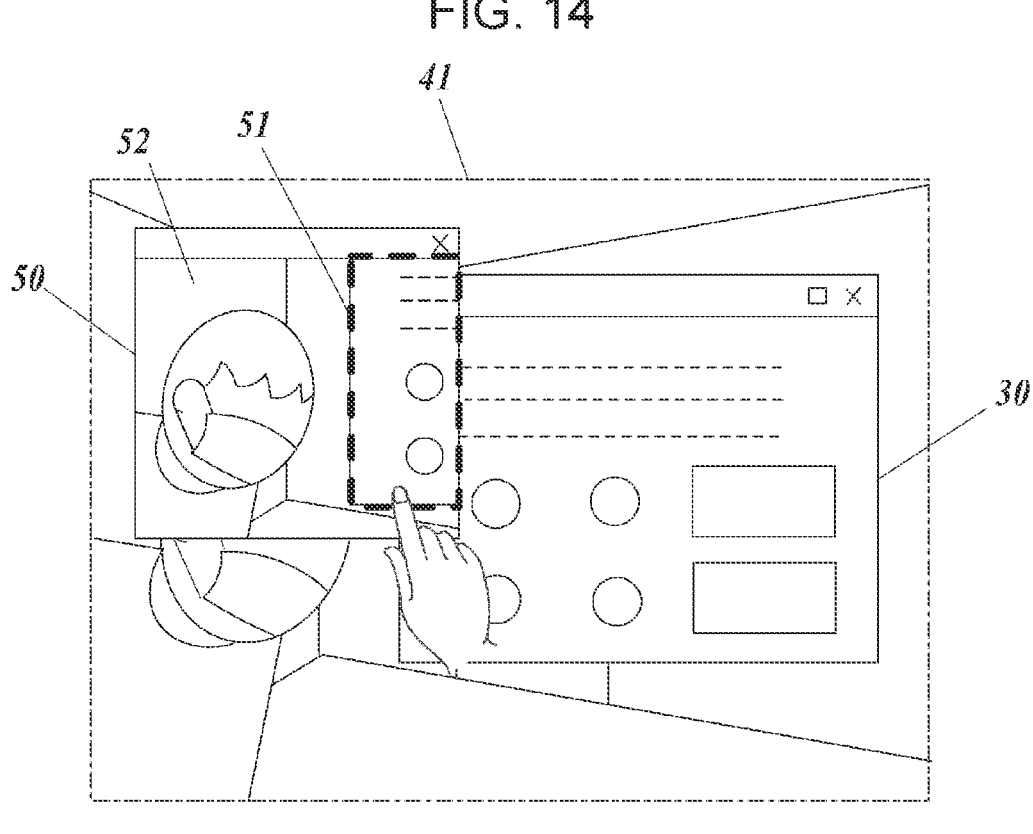
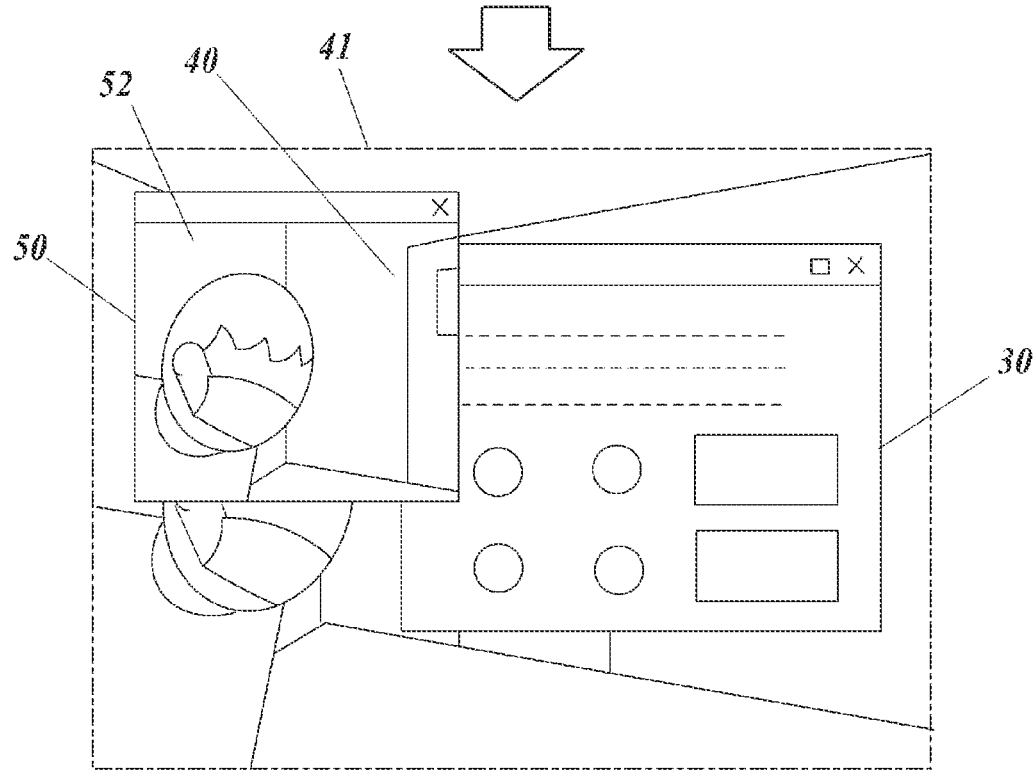

FIG. 16
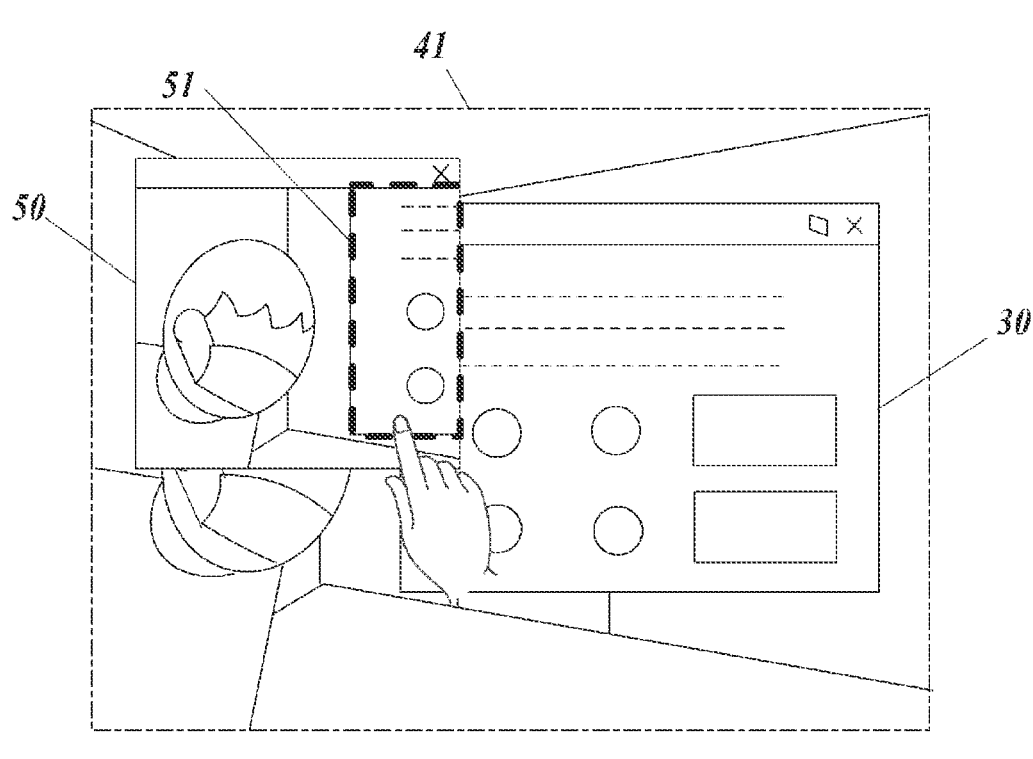
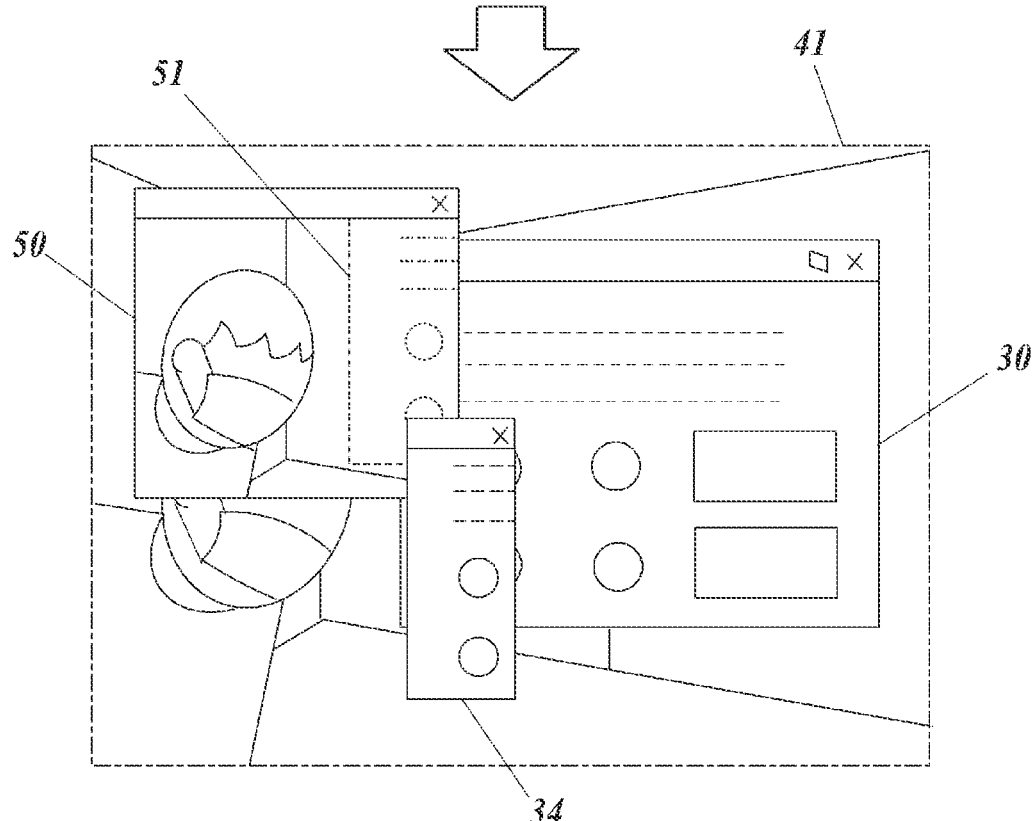

FIG. 22
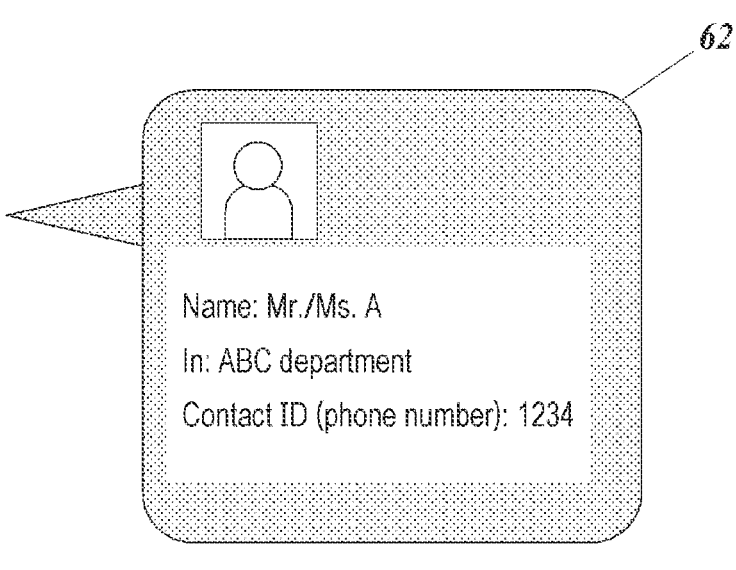
FRONT SIDE
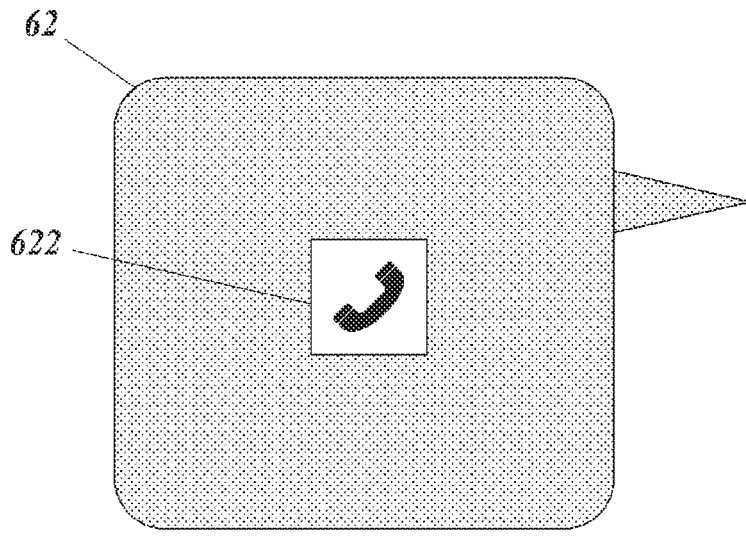
BACK SIDE

FIG. 36
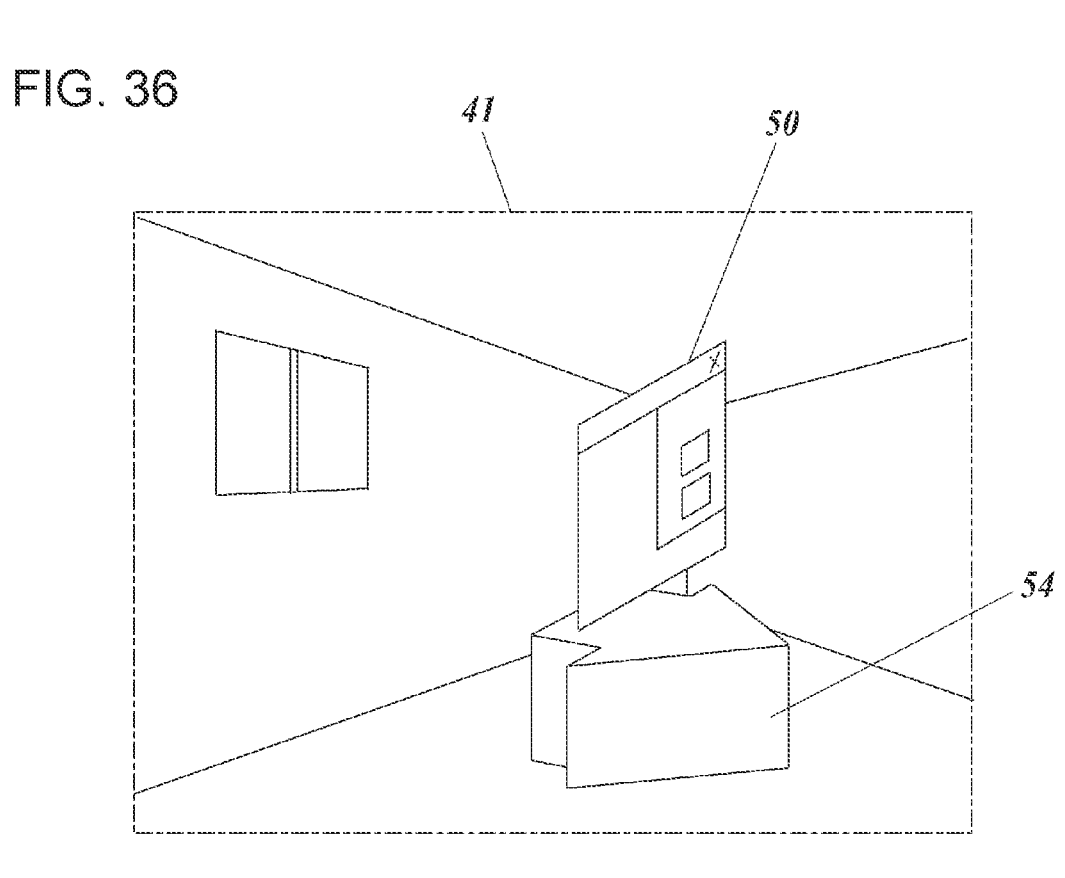
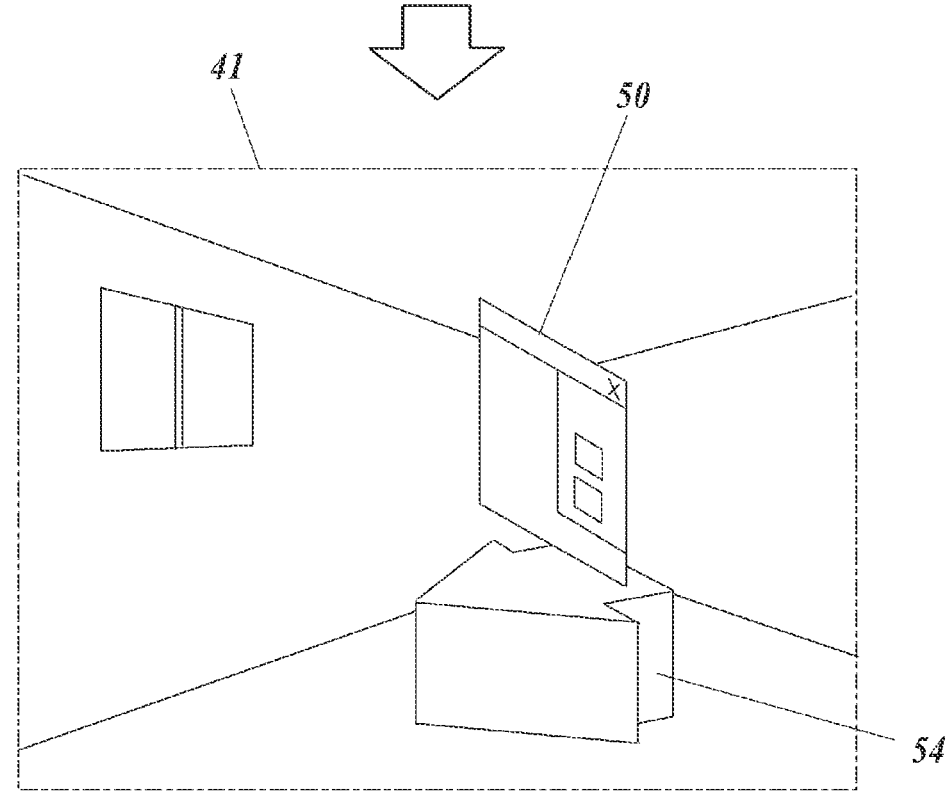

FIG. 37

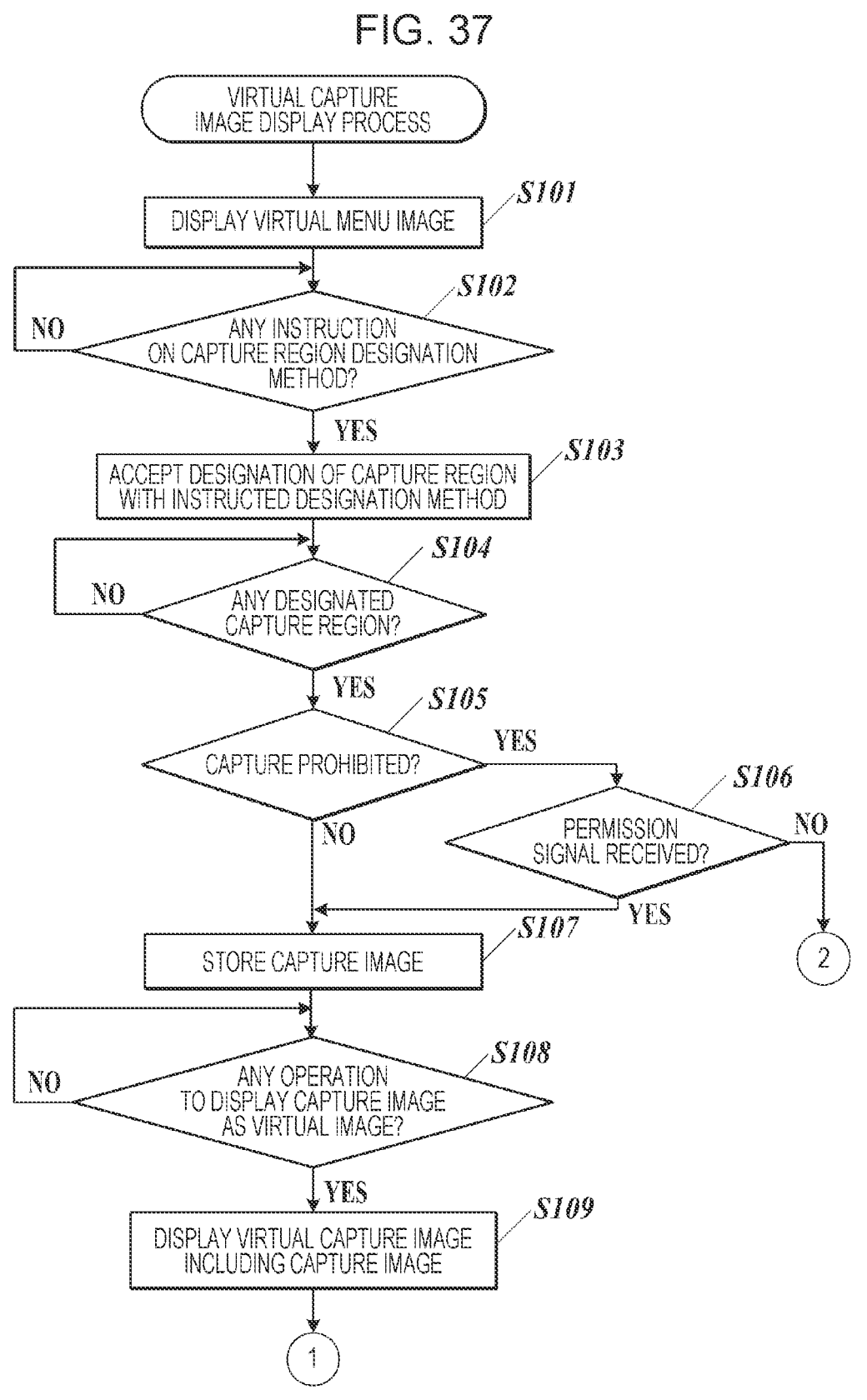

VIRTUAL CAPTURE
IMAGE DISPLAY PROCESS

DISPLAY VIRTUAL MENU IMAGE — *S101*

*S102*

ANY INSTRUCTION
ON CAPTURE REGION DESIGNATION
METHOD? — NO

YES

ACCEPT DESIGNATION OF CAPTURE REGION
WITH INSTRUCTED DESIGNATION METHOD — *S103*

*S104*

ANY DESIGNATED
CAPTURE REGION? — NO

YES — *S105*

CAPTURE PROHIBITED? — YES

NO

*S106*

PERMISSION
SIGNAL RECEIVED? — NO

YES

2

STORE CAPTURE IMAGE — *S107*

*S108*

ANY OPERATION
TO DISPLAY CAPTURE IMAGE
AS VIRTUAL IMAGE? — NO

YES

DISPLAY VIRTUAL CAPTURE IMAGE
INCLUDING CAPTURE IMAGE — *S109*

1

WEARABLE TERMINAL APPARATUS, PROGRAM, AND IMAGE PROCESSING METHOD

TECHNICAL FIELD

The present disclosure relates to a wearable terminal apparatus, a program, and an image processing method.

BACKGROUND OF INVENTION

In the related art, virtual reality (VR), mixed reality (MR), and augmented reality (AR) are known technologies that allow a user to experience a virtual image and/or a virtual space using a wearable terminal apparatus worn by the user on the head. The wearable terminal apparatus includes a display unit that covers the field of vision of the user when worn by the user. A virtual image and/or a virtual space are/is displayed on this display unit in accordance with a position and an orientation of the user. In this manner, a visual effect as if the virtual image and/or the virtual space were present is implemented (for example, U.S. Patent Application Publication No. 2019/0087021 and U.S. Patent Application Publication No. 2019/0340822).

MR is a technology that displays a virtual image as if the virtual image were present at a predetermined position in a real space while allowing a user to visually recognize the real space, to allow the user to experience mixed reality in which the real space and the virtual image are merged. VR is a technology that allows a user to visually recognize a virtual space instead of the real space in MR, to allow the user to experience as if the user were in the virtual space.

A display position of the virtual image displayed in VR and MR is determined in a space in which the user is located. When the display position is inside the visible region of the user, the virtual image is displayed on the display unit and is visually recognized by the user.

SUMMARY

In the present disclosure, a wearable terminal apparatus is to be worn by a user for use and includes a camera and at least one processor. The camera images a space as a visible region of the user. The at least one processor identifies, as a capture region, a part of the visible region in the space imaged by the camera, based on a first gesture operation of the user. The at least one processor stores a capture image corresponding to the capture region in a storage unit.

In the present disclosure, a program is executed by a computer provided in a wearable terminal apparatus to be worn by a user for use and includes a camera to image a space as a visible region of the user. The program causes the computer to execute a process including: identifying, as a capture region, a part of the visible region in the space imaged by the camera, based on a first gesture operation of the user; and storing a capture image corresponding to the capture region in a storage unit.

In the present disclosure, an image processing method is to be executed by a computer provided in a wearable terminal apparatus that is to be worn by a user for use and includes a camera to image a space as a visible region of the user. The image processing method includes identifying, as a capture region, a part of the visible region in the space imaged by the camera, based on a first gesture operation of the user; and storing a capture image corresponding to the capture region in a storage unit.

BRIEF DESCRIPTION OF THE DRAWINGS

FIG. 14 is a diagram illustrating an operation of deleting a virtual image region from the virtual capture image.

FIG. 16 is a diagram illustrating an operation of duplicating a virtual image included in the virtual capture image.

FIG. 22 is a diagram illustrating another example of an extracted information virtual image.

FIG. 36 is a diagram illustrating a virtual capture image that rotates along with the display target.

FIG. 37 is a flowchart illustrating a control procedure of a virtual capture image display process.

DESCRIPTION OF EMBODIMENTS

Embodiments are described below with reference to the drawings. Note that each drawing to be referred to below illustrates in a simplified manner merely major members necessary for describing the embodiments for convenience of explanation. Therefore, a wearable terminal apparatus 10, an external device 20, and an information processing apparatus 80 according to the present disclosure may include any constituent member that is not illustrated in each drawing to be referred to.

First Embodiment

Figure 1:
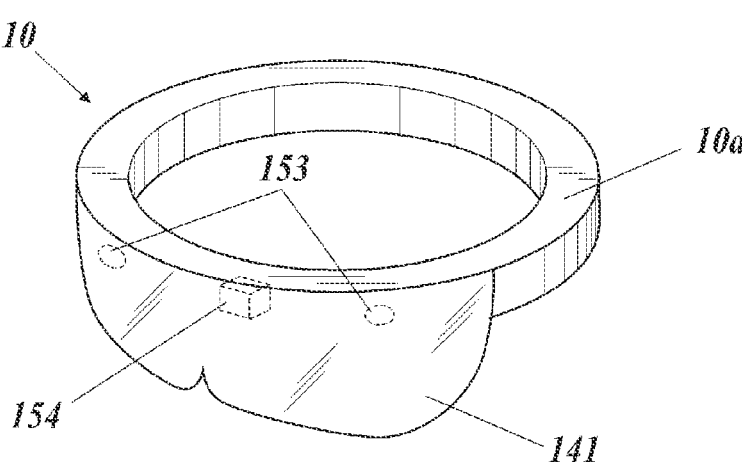
FIG. 1 is a schematic perspective view of a configuration of a wearable terminal apparatus.

As illustrated in FIG. 1, the wearable terminal apparatus 10 includes a body 10a and a visor 141 (display member) attached to the body 10a.

The body 10a is an annular member having an adjustable circumferential length. The body 10a includes various devices such as a depth sensor 153 and a camera 154 built therein. When a user wears the body 10a on the head, the visor 141 covers the field of vision of the user.

The visor 141 has a light-transmitting property. The user can visually recognize a real space through the visor 141.

The body 10a includes a laser scanner 142 (see FIG. 4) therein. The laser scanner 142 projects and displays an image such as a virtual image onto a display surface of the visor 141 facing the eyes of the user. The user visually recognizes the virtual image by reflected light from the display surface. At this time, the user also visually recognizes the real space through the visor 141. Thus, a visual effect as if the virtual image were present in the real space is obtained.

Figure 2:
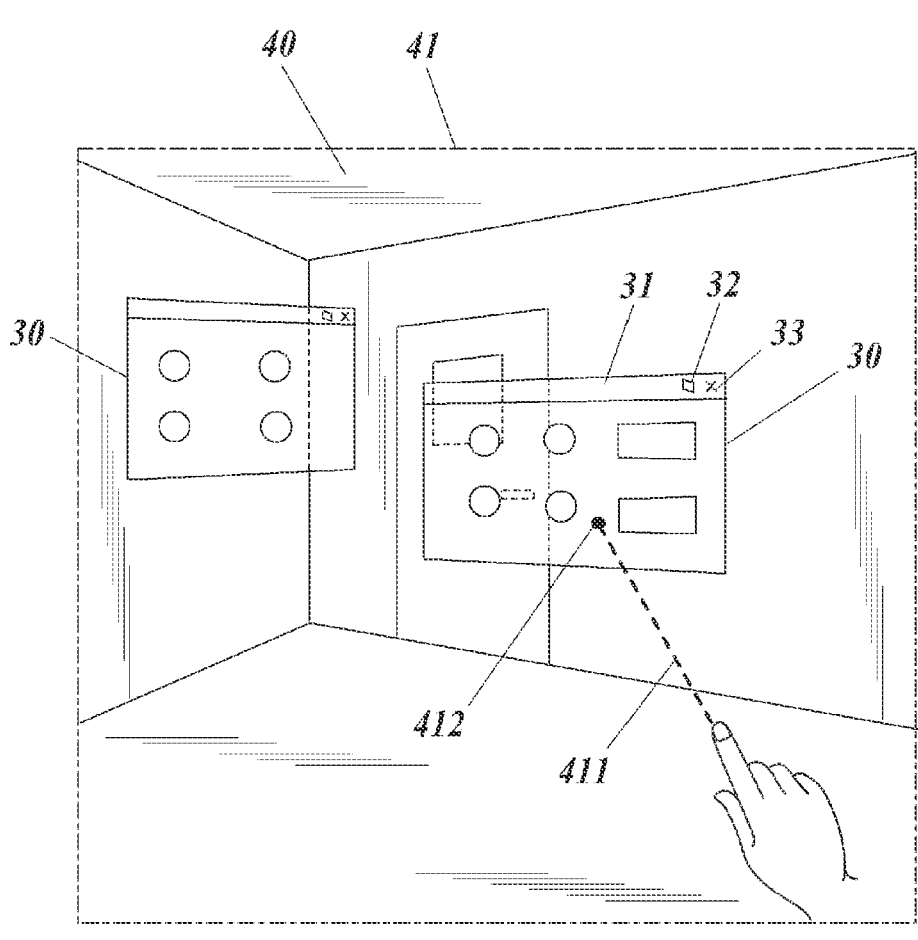
FIG. 2 is a diagram illustrating an example of a visible region and a virtual image visually recognized by a user wearing the wearable terminal apparatus.

As illustrated in FIG. 2, when a virtual image 30 (first virtual image) is displayed, the user visually recognizes the virtual image 30 disposed toward a predetermined direction at a predetermined position in a space 40. In the present embodiment, the space 40 is the real space visually recognized by the user through the visor 141. Since the virtual image 30 is projected onto the visor 141 having a light-transmitting property, the virtual image 30 is visually recognized as a translucent image superimposed on the real space. In FIG. 2, the virtual image 30 is illustrated as a planar window screen. However the virtual image 30 is not limited to this, and may be, for example, an object such as an arrow, or may be various stereoscopic images (stereoscopic virtual objects). When the virtual image 30 is a window screen, the virtual image 30 has a front side (first surface) and a back side (second surface). Among these sides, necessary information is displayed on the front side, and no information is usually displayed on the back side.

Figure 3:
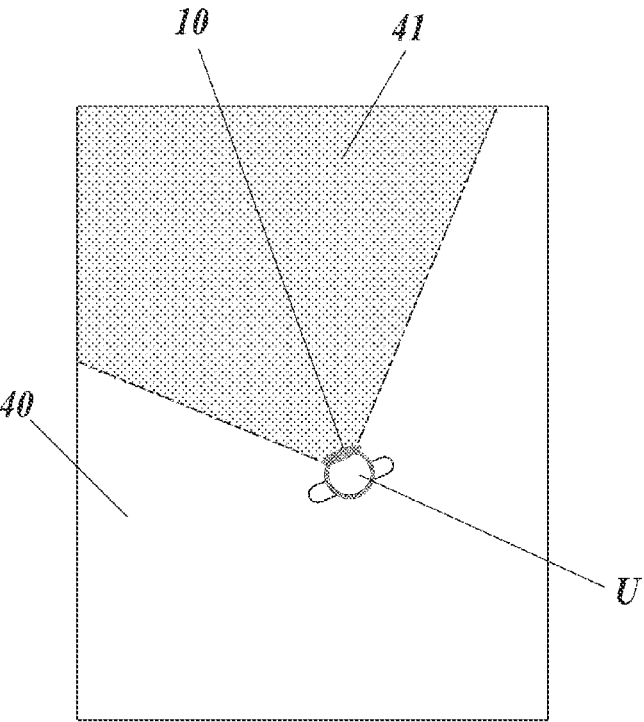
FIG. 3 is a diagram for describing the visible region in a space.

The wearable terminal apparatus 10 detects a visible region 41 of the user, based on a position and an orientation of the user in the space 40 (in other words, a position and an orientation of the wearable terminal apparatus 10). As illustrated in FIG. 3, the visible region 41 is a region located in front of a user U wearing the wearable terminal apparatus 10 in the space 40. For example, the visible region 41 is a region within a predetermined angle range in each of a left-right direction and an up-down direction with respect to the front of the user U. In this case, when a solid corresponding to the shape of the visible region 41 is cut along a plane perpendicular to the front direction of the user U, the cut surface has a quadrangular shape. Note that the shape of the visible region 41 may be determined such that the cut surface has a shape other than the quadrangular shape (such as a circular shape or elliptic shape, for example). The shape of the visible region 41 (for example, angle ranges in the left-right direction and the up-down direction with respect to the front) can be identified using a following method, for example.

The wearable terminal apparatus 10 performs field-of-view adjustment (hereinafter, referred to as calibration) in a predetermined procedure at a predetermined timing such as at the initial startup. By this calibration, a range visually recognizable by the user is identified. Thereafter, the virtual image 30 is displayed within this range. The shape of the visually recognizable range identified by this calibration can be set as the shape of the visible region 41.

The calibration is not limited to calibration performed in the predetermined procedure described above. The calibration may be automatically performed while the wearable terminal apparatus 10 performs a normal operation. For example, when there is no reaction on a display to which a reaction is to be made by the user, the wearable terminal apparatus 10 may regard the display range as being outside the range of the field of view of the user and adjust the field of view (and the shape of the visible region 41). When there is a reaction from the user on a display that is experimentally made at a position determined to be outside the range of the field of view, the wearable terminal apparatus 10 may regard the display range as being inside the range of the field of view of the user and adjust the field of view (and the shape of the visible region 41).

Note that the shape of the visible region 41 may be determined and fixed in advance at the time of shipment or the like irrespective of the adjustment result of the field of view. For example, the shape of the visible region 41 may be determined to be a maximum displayable range in terms of the optical design of a display unit 14.

In response to a predetermined user operation, the virtual image 30 is generated with a determined display position and a determined orientation in the space 40. The wearable terminal apparatus 10 projects and displays, onto the visor 141, the virtual image 30 whose display position is determined to be inside the visible region 41 among the generated virtual images 30. FIG. 2 illustrates the visible region 41 using a chain line.

The display position and the orientation of the virtual image 30 on the visor 141 are updated in real time in accordance with a change of the visible region 41 of the user. That is, the display position and the orientation of the virtual image 30 change in accordance with the change of the visible region 41 so that the user recognizes that "the virtual image 30 is located at the set position and in the set orientation in the space 40". For example, when the user moves from the front side to the back side of the virtual image 30, the shape (angle) of the displayed virtual image 30 gradually changes in accordance with this movement. When the user moves to the back side of the virtual image 30 and then faces toward the virtual image 30, the back side is displayed so that the back side of the virtual image 30 is visually recognized. In response to the change of the visible region 41, the virtual image 30 whose display position becomes out of the visible region 41 is no longer displayed, and if there is the virtual image 30 whose display position enters the visible region 41, the virtual image 30 is newly displayed.

As illustrated in FIG. 2, when the user stretches their hand (or finger) forward, the wearable terminal apparatus 10 detects the stretching direction of the hand, and displays a virtual line 411 extending in the direction and a pointer 412 on the display surface of the visor 141, which are visually recognized by the user. The pointer 412 is displayed at an intersection of the virtual line 411 and the virtual image 30. When the virtual line 411 does not intersect with the virtual image 30, the pointer 412 may be displayed at an intersection of the virtual line 411 with a wall surface or the like in the space 40. When a distance between the user's hand and the virtual image 30 is within a predetermined reference distance, display of the virtual line 411 may be omitted and the pointer 412 may be directly displayed at a position corresponding to the position of the fingertip of the user.

The user can adjust the direction of the virtual line 411 and the position of the pointer 412 by changing the stretching direction of the hand. The user performs a predetermined gesture after adjusting the pointer 412 to be located at a predetermined operation target (such as a function bar 31, a window shape change button 32, or a close button 33, for example) included in the virtual image 30. The wearable terminal apparatus 10 detects this gesture. Thus, the user can perform a predetermined operation on the operation target. For example, by performing a gesture (for example, a pinch gesture with fingers) of selecting an operation target with the pointer 412 placed at the close button 33, the user can close (delete) the virtual image 30. By performing the selecting gesture with the pointer 412 placed at the function bar 31 and performing a gesture of moving the hand forward, backward, leftward, and rightward in the selected state, the user can move the virtual image 30 in a depth direction and a left-right direction. The operations performed on the virtual image 30 are not limited these operations.

As described above, the wearable terminal apparatus 10 according to the present embodiment can implement a visual effect as if the virtual image 30 were present in the real space and can accept a user operation on the virtual image 30 and reflect the user operation on the display of the virtual image 30. That is, the wearable terminal apparatus 10 according to the present embodiment provides MR.

A functional configuration of the wearable terminal apparatus 10 is described with reference to FIG. 4.

The wearable terminal apparatus 10 includes a central processing unit (CPU) 11, a random access memory (RAM) 12, a storage unit 13, the display unit 14, a sensor unit 15, a communication unit 16, a microphone 17, and a speaker 18. These components are connected to one another by a bus 19. The components except for the visor 141 of the display unit 14 among the components illustrated in FIG. 4 are built in the body 10a and operate by electric power supplied from a battery also built in the body 10a.

The CPU 11 is a processor that performs various kinds of arithmetic processing and integrally controls operations of the components of the wearable terminal apparatus 10. The CPU 11 reads and executes a program 131 stored in the storage unit 13 to perform various control operations. The CPU 11 executes the program 131 to perform a visible region detection process and a display control process, for example. Among these processes, the visible region detection process is a process of detecting the visible region 41 of the user in the space 40. The display control process is a process of causing the display unit 14 to display the virtual image 30 whose position is determined to be inside the visible region 41 among the virtual images 30 whose positions in the space 40 are determined.

Figure 4:
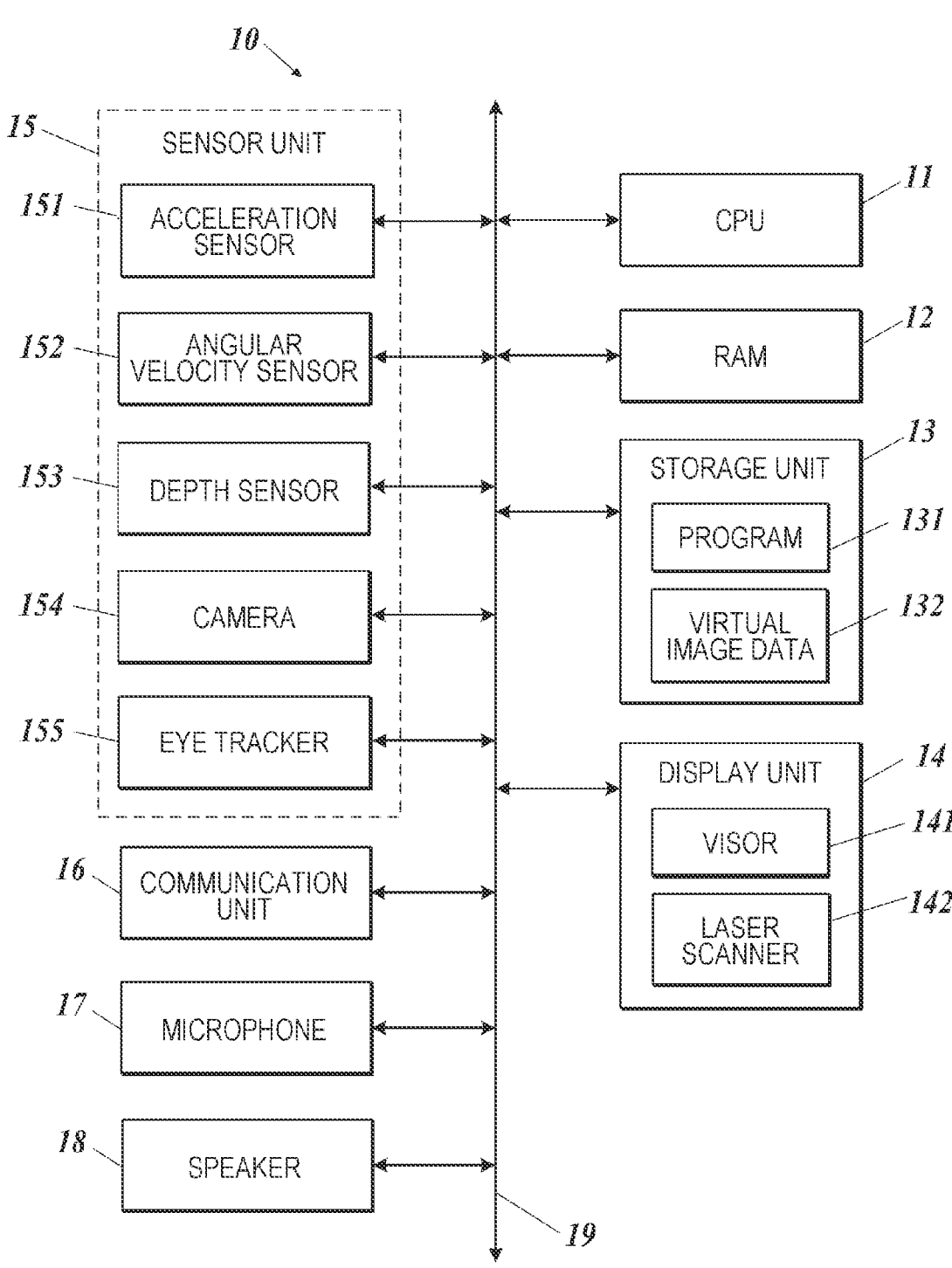
FIG. 4 is a block diagram illustrating a major functional configuration of the wearable terminal apparatus.

Although FIG. 4 illustrates a single CPU 11, the configuration is not limited to this configuration. Two or more processors such as CPUs may be provided. These two or more processors may perform in a distributed manner the processes performed by the CPU 11 in the present embodiment.

The RAM 12 provides a working memory space for the CPU 11 and stores temporary data.

The storage unit 13 is a non-transitory recording medium readable by the CPU 11 which is a computer. The storage unit 13 stores the program 131 to be executed by the CPU 11, various kinds of setting data, and so on. The program 131 is stored in the storage unit 13 in a form of a computer-readable program code. Examples of the storage unit 13 to be used include a nonvolatile storage device such as a solid state drive (SSD) including a flash memory.

Data stored in the storage unit 13 includes virtual image data 132 related to the virtual image 30. The virtual image data 132 includes data (for example, image data) related to display content of the virtual image 30, data of a display position, and data of an orientation.

The display unit 14 includes the visor 141, the laser scanner 142, and an optical system that guides light output from the laser scanner 142 to the display surface of the visor 141. The laser scanner 142 irradiates the optical system with pulsed laser light, of which ON and OFF are controlled for each pixel in accordance with a control signal from the CPU 11, while performing a scan in a predetermined direction. The laser light incident to the optical system forms a display screen that is a two-dimensional pixel matrix on the display surface of the visor 141. A to-be-used system of the laser scanner 142 may be, but not limited to, a system of performing a scan with laser light by operating a mirror by micro electro mechanical systems (MEMS), for example. The laser scanner 142 includes three light-emitting units that emit laser light of red (R), green (G), and blue (B), for example. The display unit 14 projects light from these light-emitting units onto the visor 141, and thus can implement color display.

The sensor unit 15 includes an acceleration sensor 151, an angular velocity sensor 152, the depth sensor 153, the camera 154, and an eye tracker 155. Note that the sensor unit 15 may further include a sensor not illustrated in FIG. 4.

The acceleration sensor 151 detects an acceleration and outputs a detection result to the CPU 11. A translational motion of the wearable terminal apparatus 10 in three orthogonal axial directions can be detected from the detection result obtained by the acceleration sensor 151.

The angular velocity sensor 152 (gyro sensor) detects an angular velocity and outputs a detection result to the CPU 11. A rotational motion of the wearable terminal apparatus 10 can be detected from the detection result obtained by the angular velocity sensor 152.

The depth sensor 153 is an infrared camera that detects a distance to a subject by a time of flight (ToF) method, and outputs a detection result of the distance to the CPU 11. The depth sensor 153 is provided on the front surface of the body 10a to be able to image the visible region 41. Each time the position and the orientation of the user change in the space 40, the depth sensor 153 repeatedly performs measurement. By combining the results, three-dimensional mapping of the entire space 40 can be performed (that is, a three-dimensional structure can be acquired).

The camera 154 images the space 40 with a group of RGB imaging elements, acquires color image data as an imaging result, and outputs the color image data to the CPU 11. The camera 154 is provided on the front surface of the body 10a to be able to image the space 40 as the visible region 41. The image of the space 40 imaged by the camera 154 is used to detect the position, the orientation, and the like of the wearable terminal apparatus 10. The image of the space 40 is also transmitted from the communication unit 16 to an external device and is used to display the visible region 41 of the user of the wearable terminal apparatus 10 on the external device. The image of the space 40 imaged by the camera 154 is also used as an image of the visible region 41 when the visible region 41 is stored as a capture image as described later.

The eye tracker 155 detects the line of sight of the user and outputs a detection result to the CPU 11. The method of detecting the line of sight to be used may be, but not limited to, a method in which reflection points of near-infrared light in the eyes of the user are imaged by an eye tracking camera and the imaging result and an image obtained by the camera 154 are analyzed to identify the target visually recognized by the user, for example. A part of the configuration of the eye tracker 155 may be provided in a peripheral portion or the like of the visor 141.

The communication unit 16 is a communication module including an antenna, a modulation/demodulation circuit, and a signal processing circuit. The communication unit 16 transmits and receives data to and from an external device by wireless communication in accordance with a predetermined communication protocol. The communication unit 16 can perform audio data communication with an external device. That is, the communication unit 16 transmits audio data collected by the microphone 17 to the external device, and receives audio data transmitted from the external device to output sound from the speaker 18.

The microphone 17 converts sound such as voice of the user into an electric signal and outputs the electric signal to the CPU 11.

The speaker 18 converts the input audio data into mechanical vibrations and output the vibrations as sound.

In the wearable terminal apparatus 10 thus configured, the CPU 11 performs control operations below.

The CPU 11 performs three-dimensional mapping of the space 40, based on the distance data to the subject input from the depth sensor 153. The CPU 11 repeatedly performs this three-dimensional mapping each time the position and the orientation of the user change, and updates the result each time. The CPU 11 performs three-dimensional mapping in units of the continuous space 40. Thus, when the user moves between multiple rooms partitioned by a wall or the like, the CPU 11 recognizes each room as one space 40 and performs three-dimensional mapping separately for each room.

The CPU 11 detects the visible region 41 of the user in the space 40. Specifically, the CPU 11 identifies the position and the orientation of the user (the wearable terminal apparatus 10) in the space 40, based on the detection results obtained by the acceleration sensor 151, the angular velocity sensor 152, the depth sensor 153, the camera 154, and the eye tracker 155 and the accumulated three-dimensional mapping results. The CPU 11 then detects (identifies) the visible region 41, based on the identified position and the orientation and the predetermined shape of the visible region 41. The CPU 11 continuously detects the position and the orientation of the user in real time, and updates the visible region 41 in conjunction with the change in the position and the orientation of the user. Note that the visible region 41 may be detected using the detection results of some of the acceleration sensor 151, the angular velocity sensor 152, the depth sensor 153, the camera 154, and the eye tracker 155.

The CPU 11 generates the virtual image data 132 related to the virtual image 30 in response to a user operation. That is, in response to detecting a predetermined operation (gesture) for instructing generation of the virtual image 30, the CPU 11 identifies the display content (for example, image data), the display position, and the orientation of the virtual image, and generates the virtual image data 132 including date representing these identified results.

The CPU 11 causes the display unit 14 to display the virtual image 30 whose display position is determined to be inside the visible region 41. The CPU 11 identifies the virtual image 30, based on the information of the display position included in the virtual image data 132, and generates image data of a display screen to be displayed on the display unit 14, based on a positional relationship between the visible region 41 at that time point and the display position of the virtual image 30. Based on this image data, the CPU 11 causes the laser scanner 142 to perform a scan operation to form the display screen including the virtual image on the display surface of the visor 141. That is, the CPU 11 causes the virtual image 30 to be displayed on the display surface of the visor 141, the virtual image 30 being visually recognized in the space 40 that is visually recognized through the visor 141. By continuously performing this display control process, the CPU 11 updates the display content on the display unit 14 in real time in accordance with the movement of the user (change in the visible region 41). When a setting is made to hold the virtual image data 132 even in a power-off state of the wearable terminal apparatus 10, the existing virtual image data 132 is read in response to the next startup of the wearable terminal apparatus 10. If the virtual image 30 is present inside the visible region 41, the virtual image 30 is displayed on the display unit 14.

Note that the CPU 11 may generate the virtual image data 132 based on instruction data acquired from an external device via the communication unit 16, and may cause the virtual image 30 to be displayed based on the virtual image data 132. Alternatively, the CPU 11 may acquire the virtual image data 132 from an external device via the communication unit 16, and may cause the virtual image 30 to be displayed based on the virtual image data 132. For example, the CPU 11 may display a video from the camera 154 of the wearable terminal apparatus 10 on an external device operated by a remote instructor, may accept an instruction to display the virtual image 30 from the external device, and may cause the instructed virtual image 30 to be displayed on the display unit 14 of the wearable terminal apparatus 10. This enables an operation in which the virtual image 30 indicating work content is displayed near a work target object and the remote instructor instructs the user of the wearable terminal apparatus 10 to perform work, for example.

The CPU 11 detects the position and the orientation of the user's hand (and/or finger) based on the images obtained by the depth sensor 153 and the camera 154, and causes the display unit 14 to display the virtual line 411 extending in the detected direction and the pointer 412. The CPU 11 detects a gesture of the user's hand (and/or finger) based on the images obtained by the depth sensor 153 and the camera 154, and performs a process in accordance with the content of the detected gesture and the position of the pointer 412 at that time point.

An operation of the wearable terminal apparatus 10 is described mainly on a capture operation of the visible region 41.

Since the wearable terminal apparatus 10 includes the camera 154, the wearable terminal apparatus 10 causes the camera 154 to image the space 40 at a timing corresponding to a user operation and stores the image. In this manner, the wearable terminal apparatus 10 can capture the visible region 41 of the user at that time point. However, a simple method of just storing the entire image of the visible region 41 imaged by the camera 154 does not necessarily allow the user to use the capture image for an intended purpose, and thus is less convenient. For this reason, an improved user interface in consideration of convenience of the user is desired for a capture function of the visible region 41 in the wearable terminal apparatus 10 in the related art.

In contrast, the wearable terminal apparatus 10 according to the present disclosure is equipped with various functions related to capturing of the visible region 41. Operations related to these functions and processes performed by the CPU 11 to implement the operations are described below.

Figure 5:
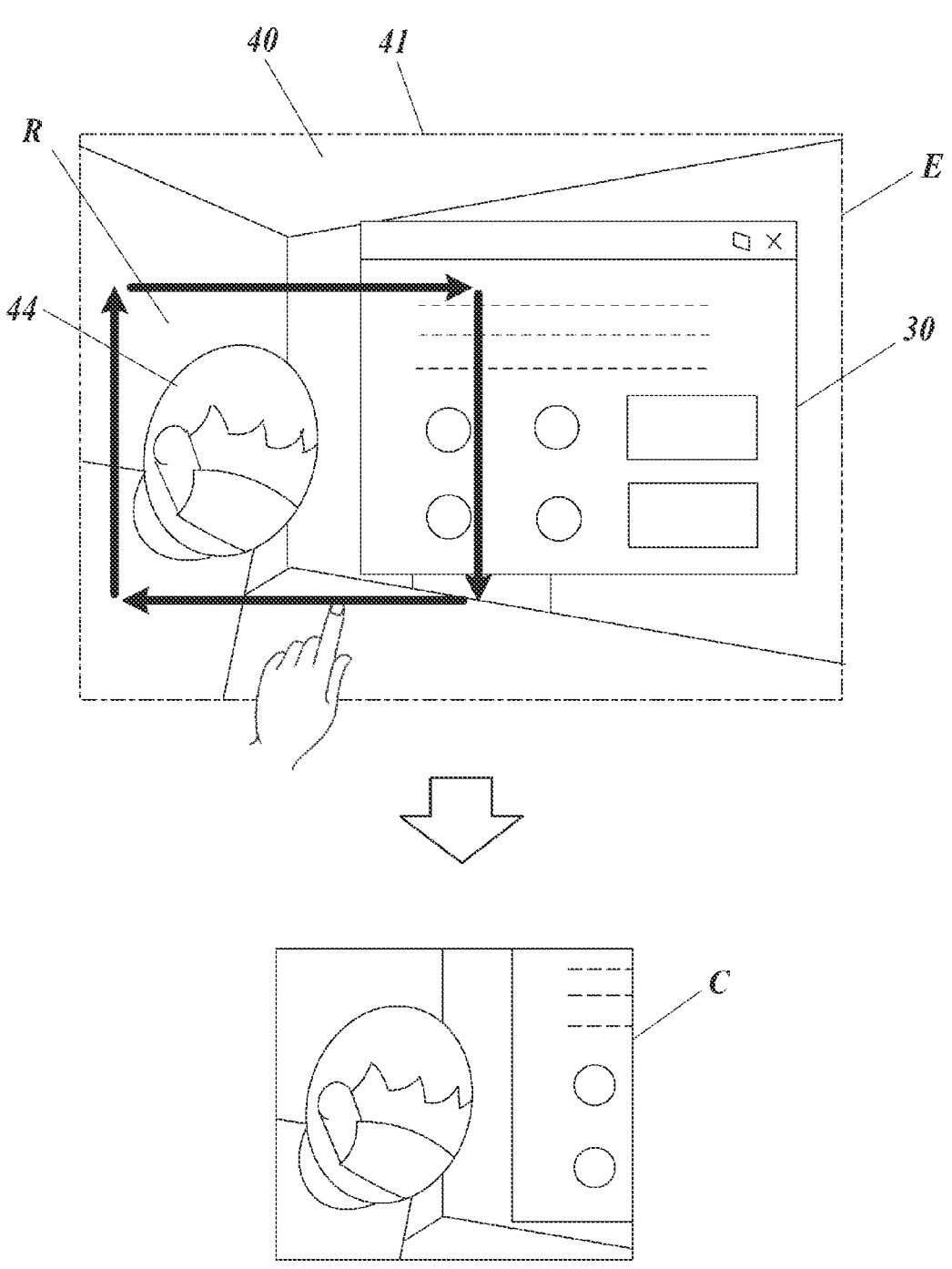
FIG. 5 is a diagram illustrating an example of a first gesture operation for identifying a capture region.
Figure 6:
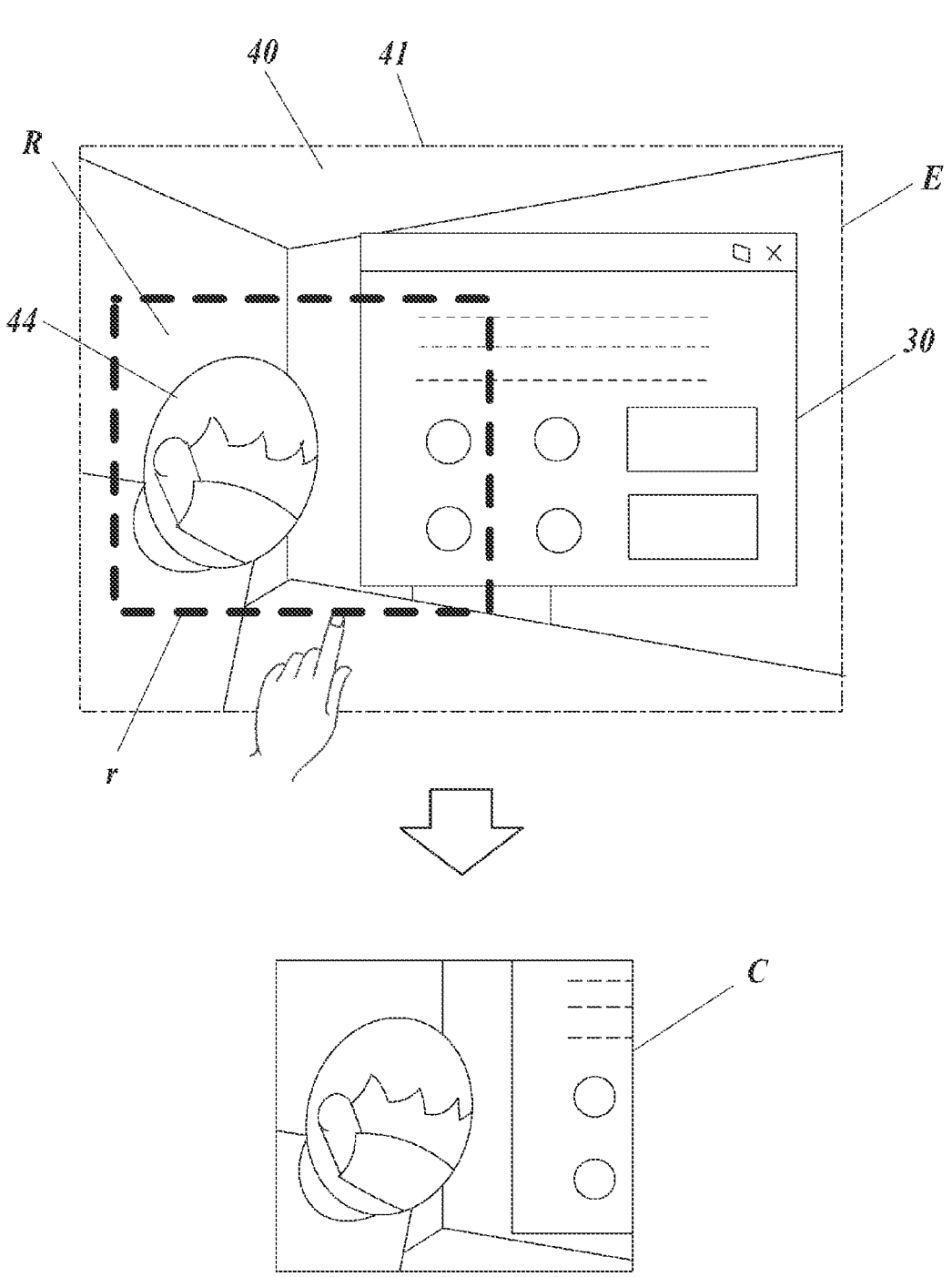
FIG. 6 is a diagram illustrating an example of the first gesture operation for identifying the capture region.
Figure 7:
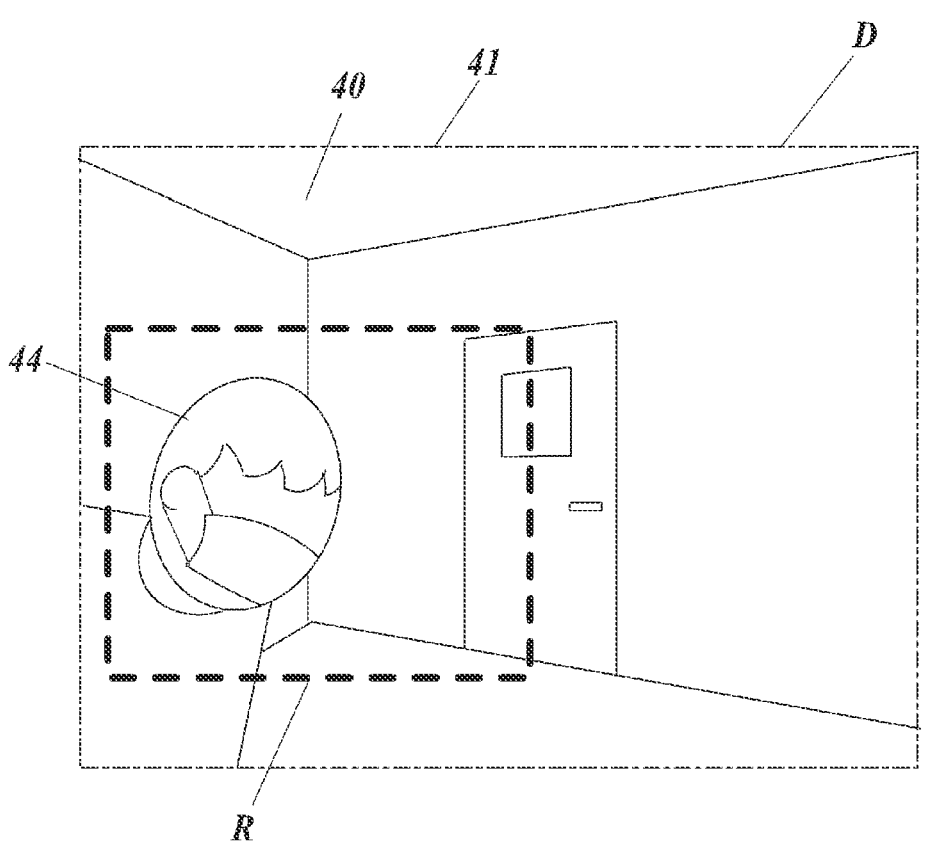
FIG. 7 is a diagram illustrating an image of the entire space imaged by a camera.

As illustrated in FIGS. 5 and 6, the CPU 11 of the wearable terminal apparatus 10 according to the present disclosure identifies a part of the visible region 41 in the space 40 imaged by the camera 154 as a capture region R (see FIGS. 6 and 7), based on a first gesture operation of the user, and stores a capture image C corresponding to the identified capture region R in the storage unit 13. This allows a part of the visible region 41 desired by the user to be stored in the storage unit 13 as the capture image C and thus can improve the user convenience. The capture image C includes an image of a portion corresponding to the capture region R in the visible region 41. When the virtual image 30 is displayed in the visible region 41 and this virtual image 30 is included in the capture region R, the virtual image 30 is reflected also in the capture image C. Therefore, the capture image C is a clipped image of a part of the field of vision visually recognized by the user through the visor 141 when the capture region R is identified.

As illustrated in FIG. 5, the first gesture operation for identifying the capture region R may be a gesture operation of moving a user's hand such that a trajectory of a predetermined portion of the user's hand surrounds a part of the visible region 41. In this case, the CPU 11 can identify, as the capture region R, a region surrounded by the trajectory of the predetermined portion of the user's hand. The first gesture operation may be, for example, a gesture operation of surrounding the capture region R by the trajectory of the fingertip of at least one finger that is held up. Holding up the finger allows the first gesture operation to be distinguished from other gesture operations and thus can reduce false detection. The first gesture operation may be an operation using both hands. A region surrounded by a trajectory of the pointer 412 instead of the user's hand or finger may be identified as the capture region R. In FIG. 5, a range including a person 44 and a part of the virtual image 30 in the visible region 41 is identified as the capture region R.

As illustrated in FIG. 6, the first gesture operation for identifying the capture region R may be a gesture operation of moving a capture frame r having a preset size to a desired position in the visible region 41 and confirming the position. The operation of moving the capture frame r may be an operation of moving the user's hand (or the pointer) with the user's finger (or the pointer 412) placed at the capture frame r. The operation of confirming the position of the capture frame r may be an operation of tapping in the space with the user's hand (finger). The operation of tapping in the space may be an operation of repeating twice an operation of moving the hand (finger) away from the user and then moving the hand (finger) toward the user. The size of the capture frame r may be changed by a gesture operation of moving the hand with a part of the capture frame r pinched with fingers (or selected with the pointer 412). Alternatively, two or more capture frames r having different sizes may be displayed to allow the user to select one of the capture frames r. After the position of the capture frame r is confirmed, a region surrounded by the capture frame r is identified as the capture region R.

After identifying the capture region R, the CPU 11 stores, in the storage unit 13, an image D (see FIG. 7) of the entire space 40 imaged by the camera 154 at that time point. The CPU 11 also stores, in the storage unit 13, a composite image E (corresponding to the visible region 41 illustrated in the upper drawings of FIGS. 5 and 6) which is the image D combined with the virtual image 30 displayed on the display unit 14. The CPU 11 extracts a partial image corresponding to the capture region R from this composite image E, and stores the partial image as the capture image C in the storage unit 13. As described above, when at least a part of the virtual image 30, which is the first virtual image, is included in the capture region, the CPU 11 stores the capture image C including at least the part of the virtual image 30 in the storage unit 13. This allows the field of vision of the user including the virtual image 30 to be stored as the capture image C.

Figure 8:
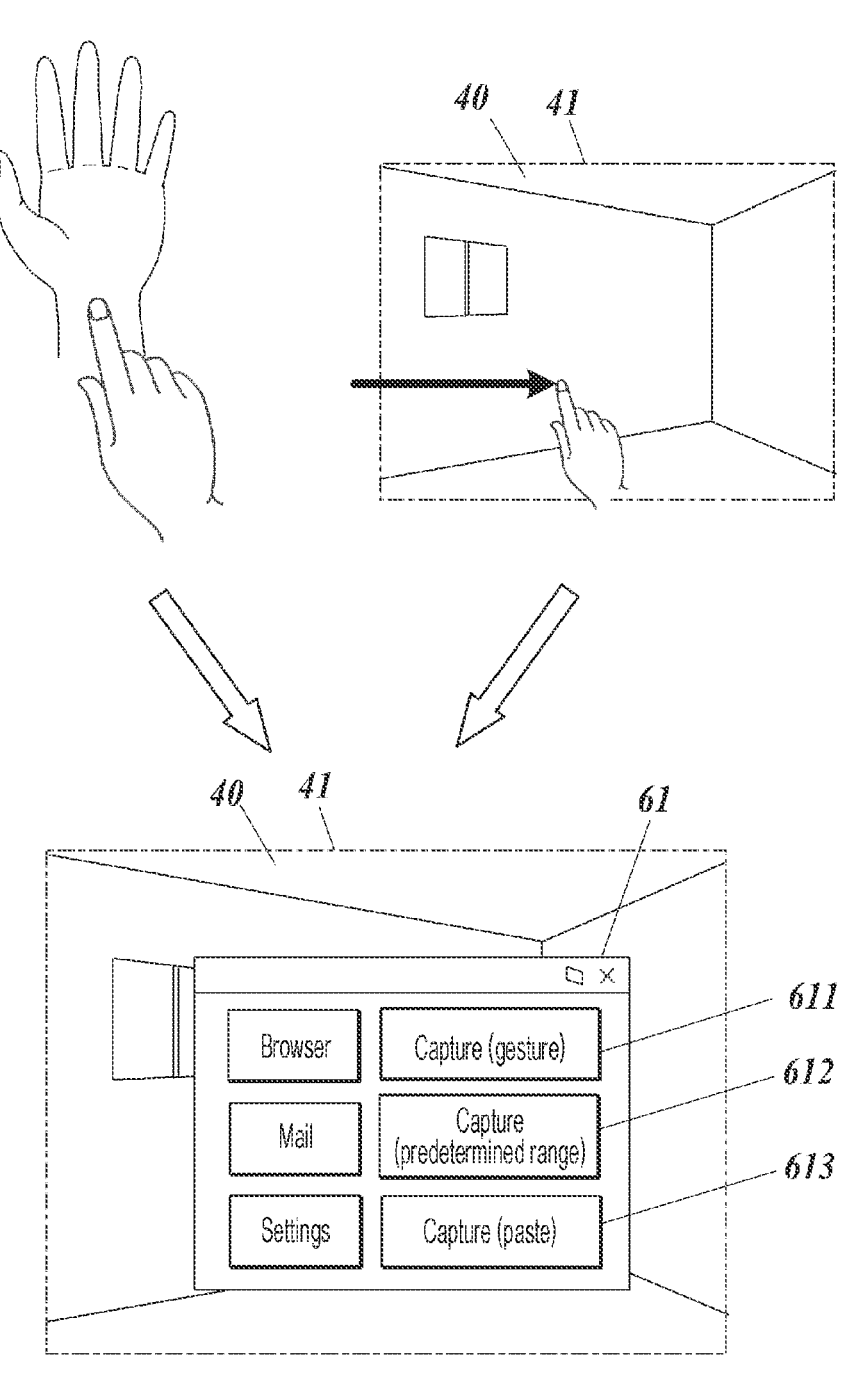
FIG. 8 is a diagram for describing a third gesture operation for displaying a virtual menu image.

When performing the first gesture operation, the user first performs a predetermined operation to cause the wearable terminal apparatus 10 to enter a state of ready to accept the first gesture operation. For example, as illustrated in FIG. 8, the user performs a predetermined third gesture operation to display a virtual menu image 61 (third virtual image) on the display unit 14. The user then selects a capture operation start button 611 or 612 for starting acceptance of the first gesture operation in the virtual menu image 61. The third gesture operation for displaying the virtual menu image 61 may be an operation of moving both hands to have a predetermined positional relationship. For example, as illustrated in an upper left portion of FIG. 8, the third gesture operation may be a gesture operation of pointing the left wrist with the finger of the right hand. Upon detecting this third gesture operation, the CPU 11 causes the virtual menu image 61 to be displayed on the display unit 14. As illustrated in the upper right portion of FIG. 8, the third gesture operation may be a gesture operation of moving the hand (or the pointer 412) in a predetermined direction from the outside of the visible region 41 to the inside of the visible region 41. Upon detecting the third gesture operation, the CPU 11 the display unit 14 to display the virtual menu image 61 such that the virtual menu image 61 slides in in accordance with the motion of the hand (from the left side in the example of FIG. 8). As described above, in response to the third gesture operation of the user, the CPU 11 causes the display unit 14 to display the virtual menu image 61 which is a third virtual image for starting acceptance of the first gesture operation. This allows the capture operation to be started easily.

In response to a gesture operation of selecting the capture operation start button 611 in the virtual menu image 61, the CPU 11 accepts the first gesture operation of surrounding the capture region R with a fingertip or the like as illustrated in FIG. 5. In response to a gesture operation of selecting the capture operation start button 612, the CPU 11 accepts the first gesture operation of identifying the capture region R with the capture frame r as illustrated in FIG. 6. As described above, the CPU 11 identifies the capture region R using a different method for a different type of the first gesture operation, and identifies the type of the first gesture operation to be accepted in accordance with an operation on the virtual menu image 61 which is the third virtual image. In this manner, the user can select the desired first gesture operation for identifying the capture region R.

Note that the wearable terminal apparatus 10 may enter the state of ready to accept the first gesture operation without through the virtual menu image 61. For example, the wearable terminal apparatus 10 may enter the state of ready to accept the first gesture operation, in response to an operation of tapping in the space with the user's hand (finger) as described above. The function bar 31 of the virtual image 30 may be provided with an icon for starting capturing. In response to an operation of selecting the icon, the wearable terminal apparatus 10 may enter the state of ready to accept the first gesture operation.

Figure 9:
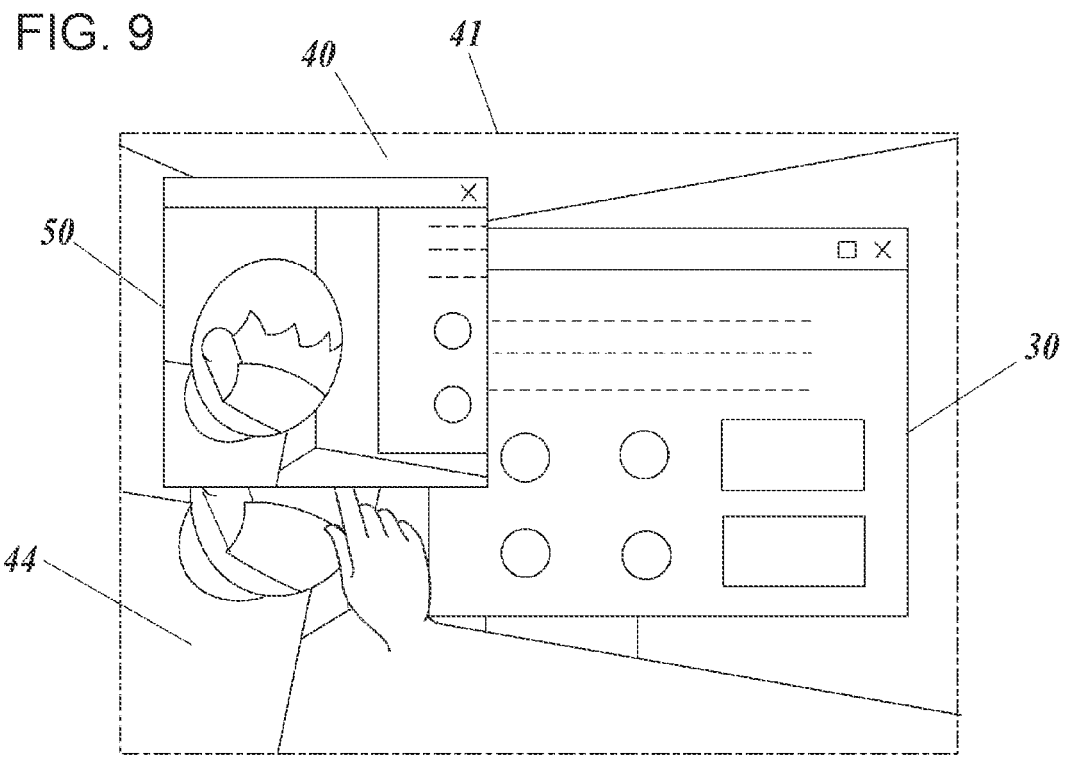
FIG. 9 is a diagram illustrating an example of the visible region in which a virtual capture image is displayed.

As illustrated in FIG. 9, the capture image C stored in the storage unit 13 can be displayed on the display unit 14 as a virtual capture image 50 (second virtual image). Upon storing the capture image C in the storage unit 13, the CPU 11 may cause the display unit 14 to display the capture image C as the virtual capture image 50 (second virtual image). This allows the virtual capture image 50 to be automatically displayed without the user performing a particular gesture operation. The CPU 11 may cause the display unit 14 to display the capture image C as the virtual capture image 50 (second virtual image) in response to a second gesture operation of the user. This allows the user to display the virtual capture image 50 at a desired position at an intended timing.

As illustrated in FIG. 9, when the virtual image 30 that is the first virtual image is displayed before the virtual capture image 50 that is the second virtual image is displayed, the CPU 11 may display the virtual capture image 50 at a position closer to the user than the virtual image 30 in the space 40. This allows the virtual capture image 50 to be displayed in a style in which the entire virtual capture image 50 is visually recognizable.

Figure 10:
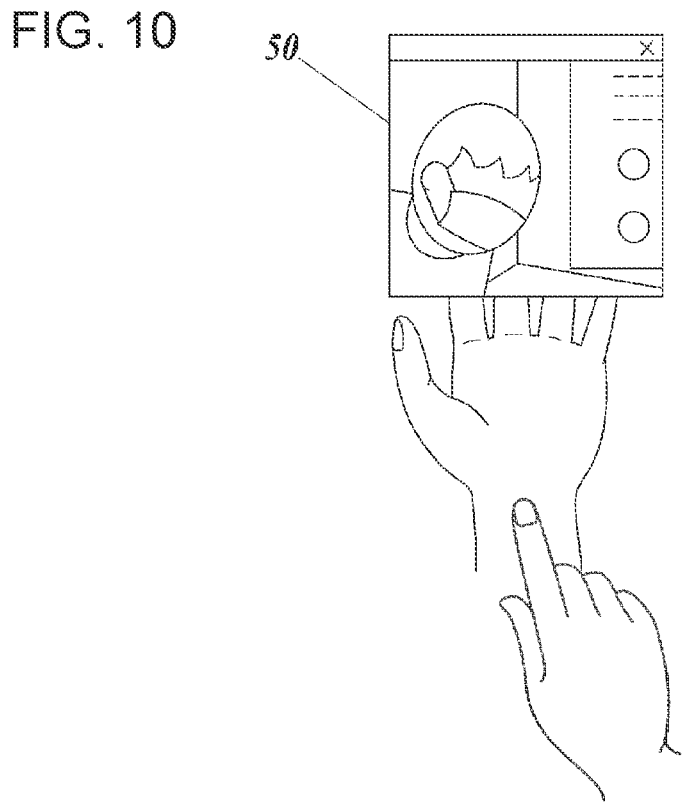
FIG. 10 is a diagram illustrating an example of a display method of the virtual capture image.

The second gesture operation performed to display the virtual capture image 50 in response to the second gesture operation is not limited as long as the second gesture operation is based on a motion of the hand or finger. The second gesture operation may be, for example, a specific motion of a hand (left hand and/or right hand), a specific motion of a finger, opening and closing of a hand or fingers, or a combination thereof. The second gesture operation may be an operation of moving the pointer 412. The different virtual capture images 50 may be displayed in accordance with different types of the second gesture operation. In response to the second gesture operation, the CPU 11 causes the virtual capture image 50 to be displayed at a relative position to the user, which is determined in advance in accordance with the type of the second gesture operation. This relative position can be, for example, near the palm or finger or on a line of sight of the user. FIG. 10 illustrates an example in which the virtual capture image 50 is displayed near the fingertip of the left hand in response to the second gesture operation of pointing the left wrist with a finger of the right hand. As described above, in response to the second gesture operation, the CPU 11 causes the virtual capture image 50 that is the second virtual image to be displayed at a predetermined relative position with respect to the user, and the relative position is set in advance for each type of the second gesture operation. This allows the virtual capture image 50 to be displayed at a desired position by a simple operation.

Figure 11:
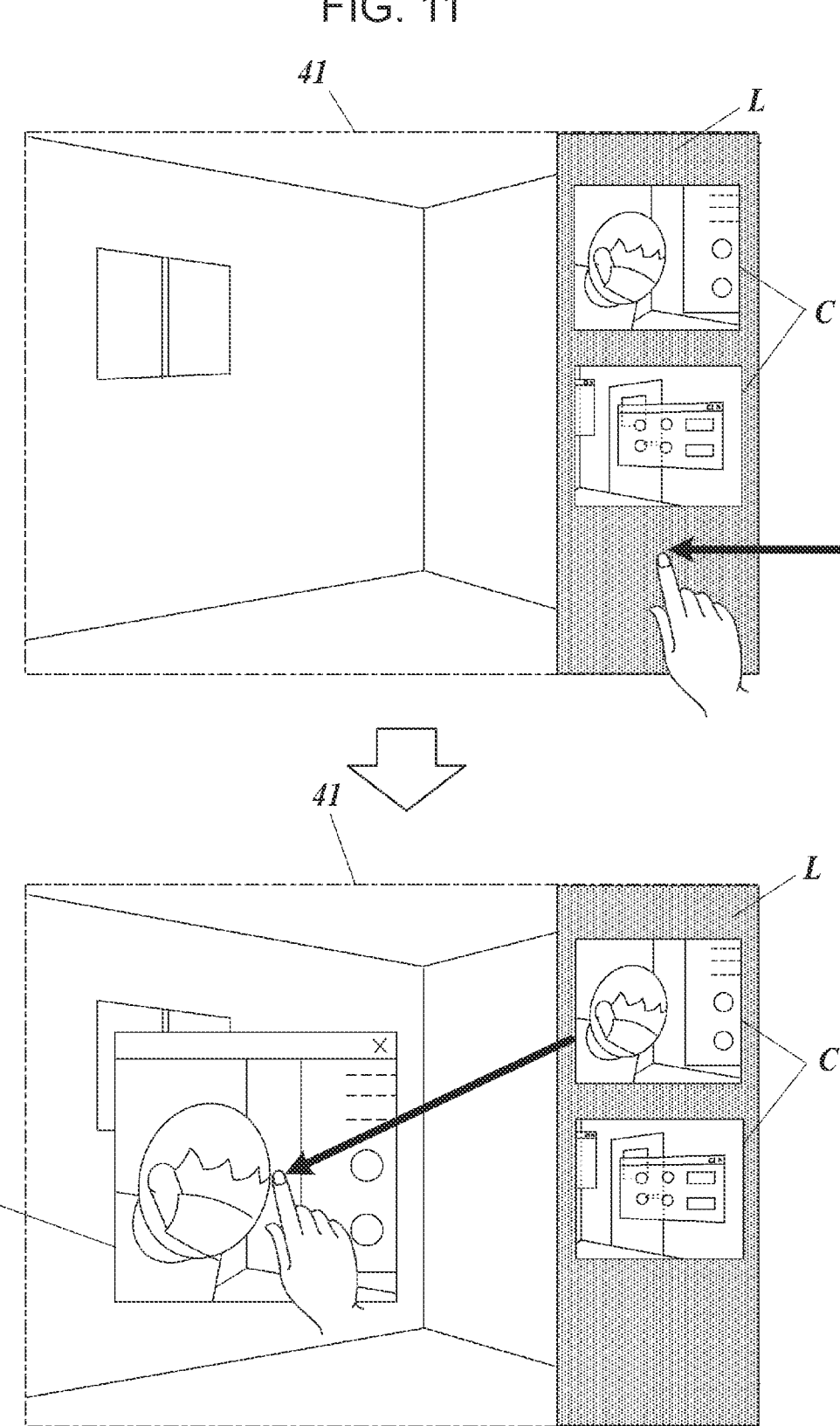
FIG. 11 is a diagram illustrating an example of the display method of the virtual capture image.

The method of displaying the virtual capture image 50 is not limited to the method described above, and may be, for example, a method of selecting one capture image C to be displayed as the virtual capture image 50 from among one or two or more capture images stored in the storage unit 13 as illustrated in FIG. 11. In the example of FIG. 11, as illustrated in an upper drawing, in response to a gesture operation of moving the hand (or the pointer 412) from the outside (right side) of the visible region 41 to the visible region 41, a list region L of the capture image(s) C is displayed to slide in from the right end of the visible region 41 in accordance with the motion of the hand. As illustrated in a lower drawing of FIG. 11, in response to a gesture operation of dragging one capture image C in the list region L to inside of the visible region 41 with the finger placed at the capture image C (or with the capture image C selected with the pointer 412), the capture image C can be displayed on the display unit 14 as the virtual capture image 50. When the list region L includes one capture image C, the list region L may be hidden in response to the drag operation described above. When the list region L includes two or more capture images C, the list region L may be kept displayed after the drag operation described above to allow the drag operation be performed on another capture image C thereafter. An image indicating the list region L may be determined based on a predetermined condition. For example, based on a user ID used when the user has logged into the wearable terminal apparatus 10, the CPU 11 may display a specific image associated with the user ID as the image indicating the list region L.

Figure 12:
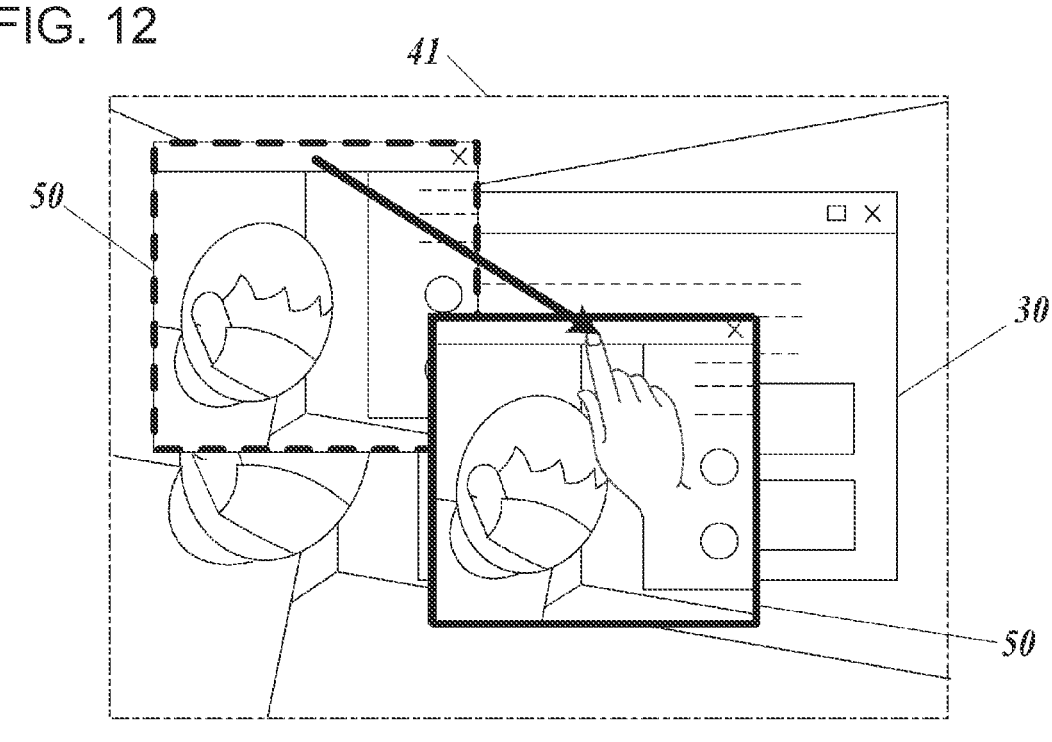
FIG. 12 is a diagram illustrating a virtual capture image with an emphasized outer frame and a moving method of the virtual capture image.

As illustrated in FIG. 12, the CPU 11 may display an outer frame of the virtual capture image 50 that is the second virtual image in a predetermined emphasis style. This can improve the viewability of the virtual capture image 50. An example of the emphasis style is, but not limited to, making the outer frame of the virtual capture image 50 thicker than the outer frame of the virtual image 30 as illustrated in FIG. 12.

As illustrated in FIG. 12, the CPU 11 moves the virtual capture image 50 in response to a fourth gesture operation of the user on the virtual capture image 50 that is the displayed second virtual image. This allows the user to change the display position of the virtual capture image 50 in any manner. The fourth gesture operation may be, but not limited to, an operation of moving a hand with a predetermined portion (for example, a function bar in an upper portion) or any portion of the virtual capture image 50 selected.

Figure 13:
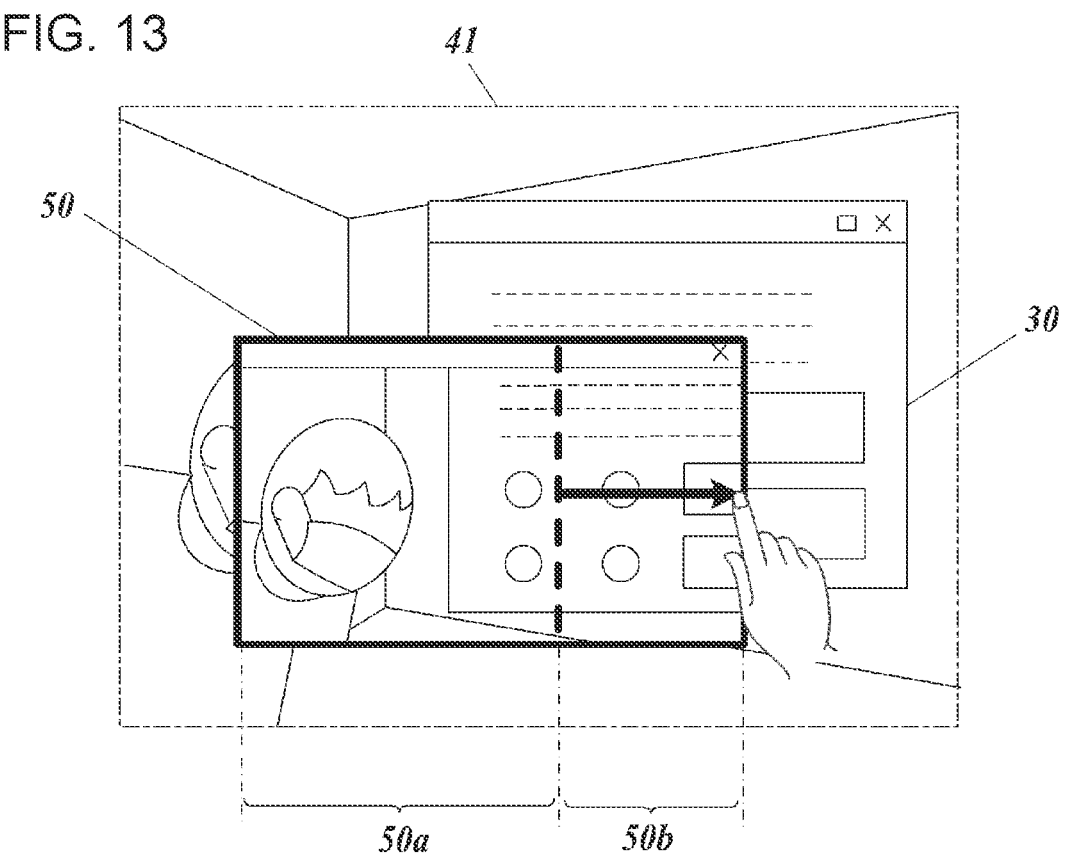
FIG. 13 is a diagram illustrating a method of expanding the virtual capture image.

As illustrated in FIG. 13, the user performs a predetermined fifth gesture operation to be able to expand the display region of the virtual capture image 50. The fifth gesture operation may be, for example, an operation of moving a hand with a portion of the outer frame of the virtual capture image 50 pinched by fingers (or selected with the pointer 412). In response to the expansion of the virtual capture image 50, the range of the capture region R to be reflected in the virtual capture image 50 is expanded. The virtual capture image 50 after expansion includes an initial display region 50*a* before expansion and an expanded region 50*b*. The image of the expanded region 50*b* may be extracted from the composite image E of the entire visible region 41 stored at the time of generation of the capture image C. That is, a portion of the composite image E corresponding to the expanded capture region R is extracted, so that a new capture image C is generated. Based on the new capture image C, the expanded virtual capture image 50 is displayed. Note that the virtual capture image 50 may be shrunk in response to the fifth gesture operation. As described above, the CPU 11 expands or shrinks the virtual capture image 50 in response to the fifth gesture operation of the user on the virtual capture image 50 that is the displayed second virtual image, and, in response to the expansion or shrinkage, expands or shrinks the range of the capture region R to be reflected in the virtual capture image 50. This allows the capture range to be changed even after the virtual capture image 50 is displayed.

When the virtual capture image 50 includes a virtual image region 51 corresponding to the virtual image 30 and a space image region 52 corresponding to the background space 40 as illustrated in an upper drawing of FIG. 14, the virtual image region 51 can be selectively deleted as illustrated in a lower drawing. Hereinafter, the virtual image region 51 of the virtual capture image 50 may be referred to as "the virtual image 30 included in the virtual capture image 50" for convenience. The virtual image region 51 is deleted in response to a sixth gesture operation of the user. The sixth gesture operation may be, but not limited to, an operation of double-tapping the virtual image region 51 or an operation of long-touching the virtual image region 51, for example. The background space 40 is displayed in a range where the virtual image region 51 has been displayed before the deletion in the virtual capture image 50 after the virtual image region 51 is deleted. This image of the space 40 is extracted from the image D (see FIG. 7) of the space 40 stored at the time of generation of the capture image C. As described above, the CPU 11 deletes the virtual image 30 which is the first virtual image included in the virtual capture image 50 in response to the sixth gesture operation of the user on the virtual capture image 50 which is the displayed second virtual image, and causes, in a region from which the virtual image 30 is deleted, the image of the space 40 corresponding to the region to be displayed. This allows the virtual image 30 to be deleted from the virtual capture image

50 even after the virtual capture image 50 is displayed. In this case, the CPU 11 may cause the virtual image 30 included in the virtual capture image 50 to be displayed in a predetermined emphasis style. This can improve the viewability of the virtual image region 51 to be deleted. An example of the emphasis style is, but not limited to, making the outer frame of the virtual image region 51 thick as illustrated in the upper drawing of FIG. 14.

Figure 15:
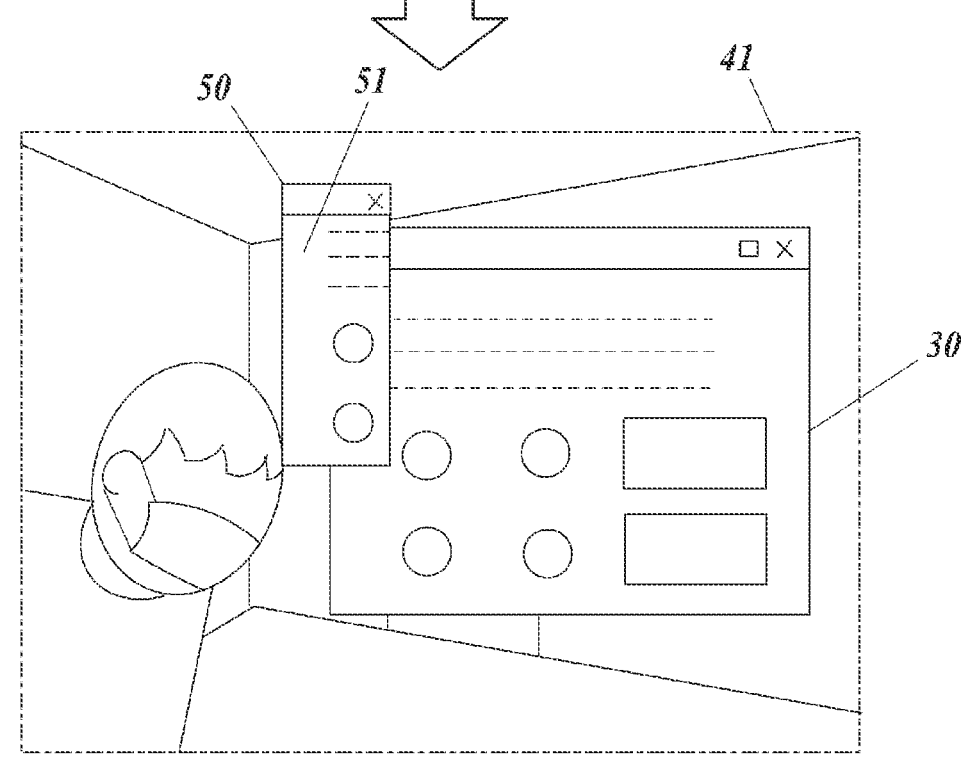
FIG. 15 is a diagram illustrating an operation of deleting a space image region from the virtual capture image.

When the virtual capture image 50 includes the virtual image region 51 and the space image region 52 as illustrated in an upper drawing of FIG. 15, the CPU 11 can selectively delete the space image region 52 from the virtual capture image 50 as illustrated in a lower drawing. The virtual image region 51 is deleted in response to a seventh gesture operation performed by the user. The seventh gesture operation may be, but not limited to, an operation of double-tapping the space image region 52 or an operation of long-touching the space image region 52, for example. The virtual capture image 50 after the space image region 52 is deleted may include the virtual image region 51 alone. The image of the virtual image region 51 may be extracted from the capture image C before the deletion. The image of the virtual image region 51 may also be extracted from the virtual image data 132 stored in the storage unit 13. That is, an ID for identifying the virtual image 30 may be stored when the capture image C is stored, and image data of the virtual image region 51 may be identified and acquired from the virtual image data 132 with reference to the ID. As described above, the CPU 11 deletes a portion of the virtual capture image 50 other than the virtual image 30 in response to the seventh gesture operation of the user on the virtual capture image 50 which is the displayed second virtual image. This allows the background space 40 to be deleted from the virtual capture image 50 even after the virtual capture image 50 is displayed. In this case, the CPU 11 may cause the portion (the space image region 52) of the virtual capture image 50 other than the virtual image 30 to be displayed in a predetermined emphasis style. This can improve the viewability of the space image region 52 to be deleted. An example of the emphasis style is, but not limited to, making the outer frame of the space image region 52 thick as illustrated in the upper drawing of FIG. 15.

As illustrated in FIG. 16, the CPU 11 may duplicate at least a part of the virtual capture image 50 and display a virtual image 34 which is a fifth virtual image in response to a tenth gesture operation of the user on the virtual capture image 50 which is the displayed second virtual image. This allows a part of the virtual capture image 50 to be handled as the separate virtual image 34 and thus can improve the user convenience.

From another viewpoint, when the virtual capture image 50 which is the second virtual image includes a part of the virtual image 30 which is the first virtual image as illustrated in an upper drawing of FIG. 16, the CPU 11 may duplicate the part of the virtual image 30 and display the virtual image 34 which is a fourth virtual image in response to the eighth gesture operation of the user on the displayed virtual image 30. This allows a part of the virtual image 30 included in the virtual capture image 50 to be extracted and handled as the separate virtual image 34 and thus can improve the user convenience. The virtual image region 51 in the virtual capture image 50 from which a duplicate is obtained may be displayed in a predetermined inconspicuous style after the duplication. This allows the duplicated target to be indicated in an easily understandable manner. The inconspicuous style may be, but not limited to, a style of making the image translucent, for example. The image of the virtual image 34

(a part of the virtual image 30) which is the duplicate may be extracted from the virtual image data 132 stored in the storage unit 13. That is, an ID of the virtual image 30 may be stored when the capture image C is stored, and part of image data of the virtual image 30 may be acquired from the virtual image data 132 with reference to the ID. The tenth gesture operation and the eighth gesture operation above may be, but not limited to, an operation of double-tapping the space image region 52 or an operation of long-touching the space image region 52, for example.

Figure 17:
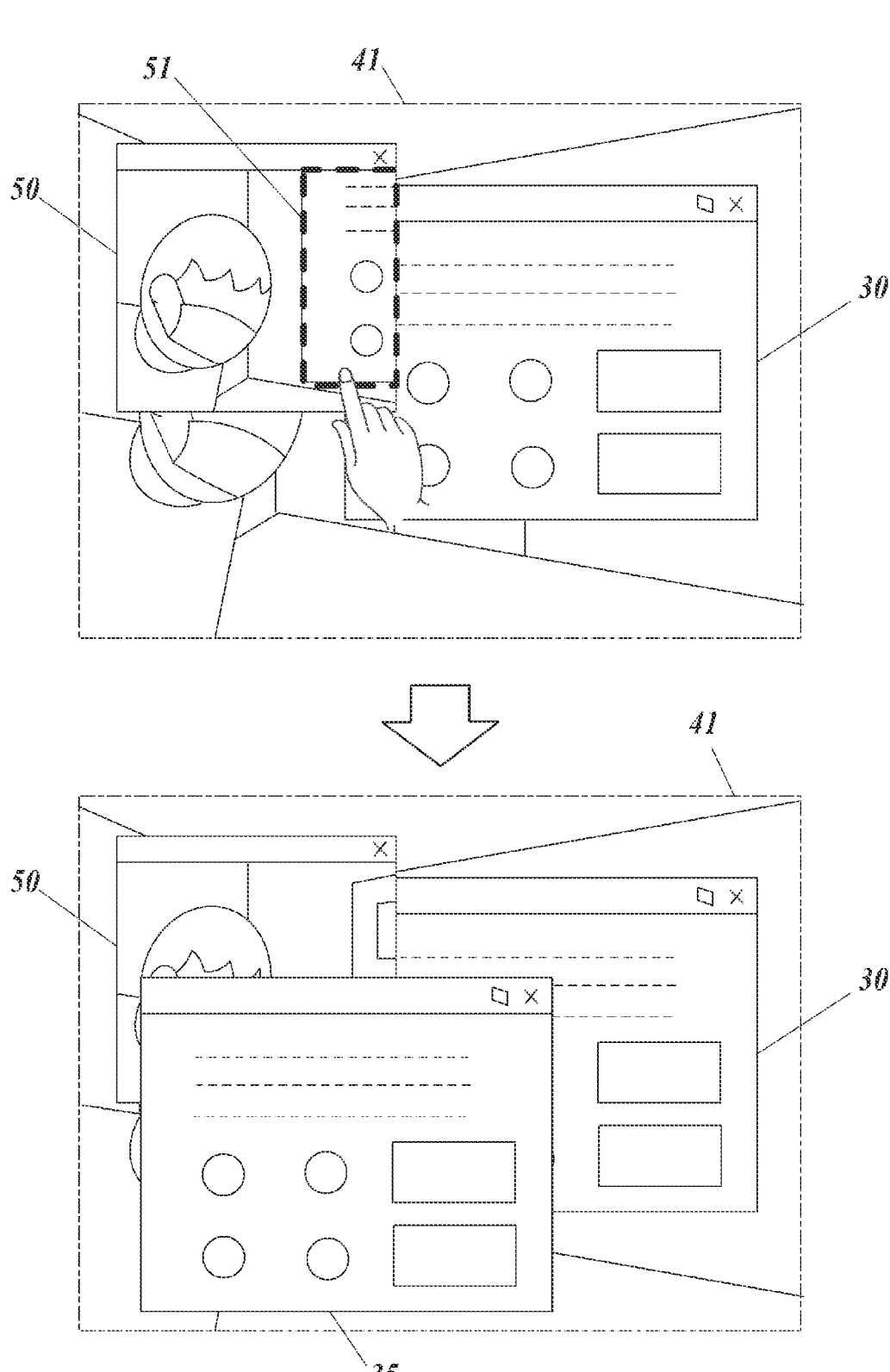
FIG. 17 is a diagram illustrating an operation of duplicating a virtual image included in the virtual capture image.

When the eighth gesture operation is performed on the virtual image region 51 corresponding to a part of the virtual image 30 in the virtual capture image 50 as illustrated in an upper drawing of FIG. 17, the entire virtual image 30 may be restored and displayed as a virtual image 35 as illustrated in a lower drawing of FIG. 17. Therefore, the virtual image 35 has the same content as the virtual image 30. In this case, the image of the virtual image 35 which is a duplicate may be extracted from the virtual image data 132 stored in the storage unit 13. That is, an ID of the virtual image 30 may be stored when the capture image C is stored, and image data of the entire virtual image 30 may be acquired from the virtual image data 132 with reference to the ID. Note that the duplicated virtual image 35 is displayed, and a part (virtual image region 51) of the virtual image 30 located inside the virtual capture image 50 may be deleted. This can provide a visual effect as if the virtual image 30 were moved from the inside of the frame of the virtual capture image 50 to the outside of the frame.

When a part or entirety of the virtual images 30 included in the virtual capture image 50 is duplicated as illustrated in FIGS. 16 and 17, only the virtual image 30 with permission to duplicate may be duplicated and the virtual image 30 without permission to duplicate may not be duplicated.

Figure 18:
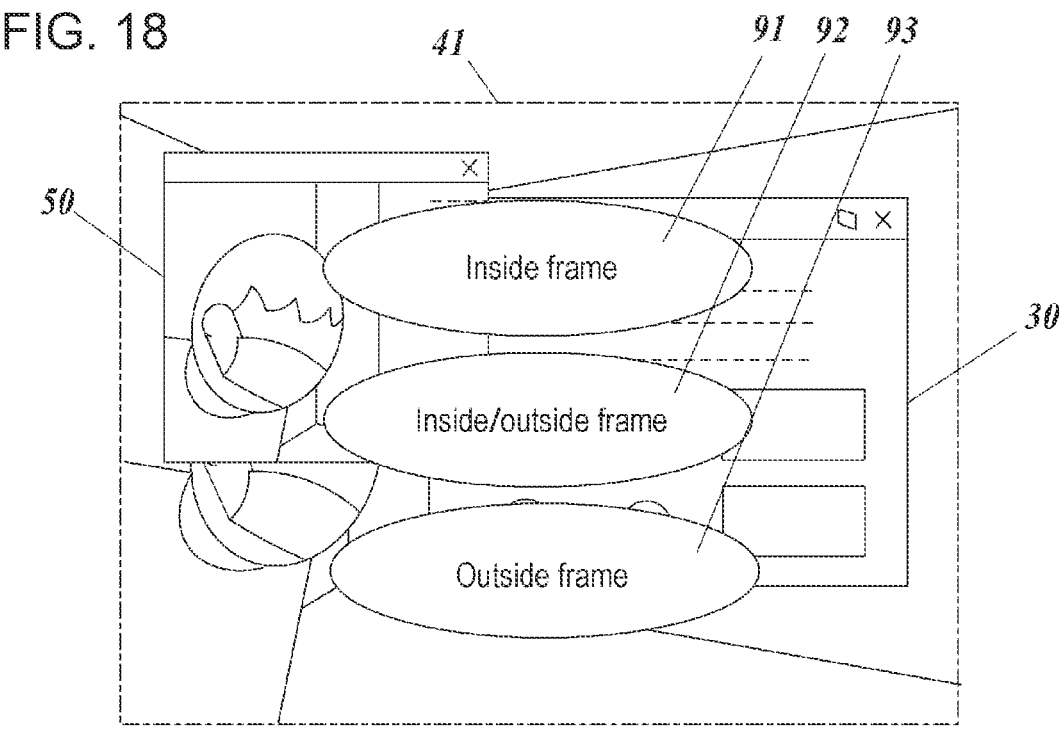
FIG. 18 is a diagram illustrating moving method designation buttons for designating a moving method of the virtual capture image.
Figure 19:
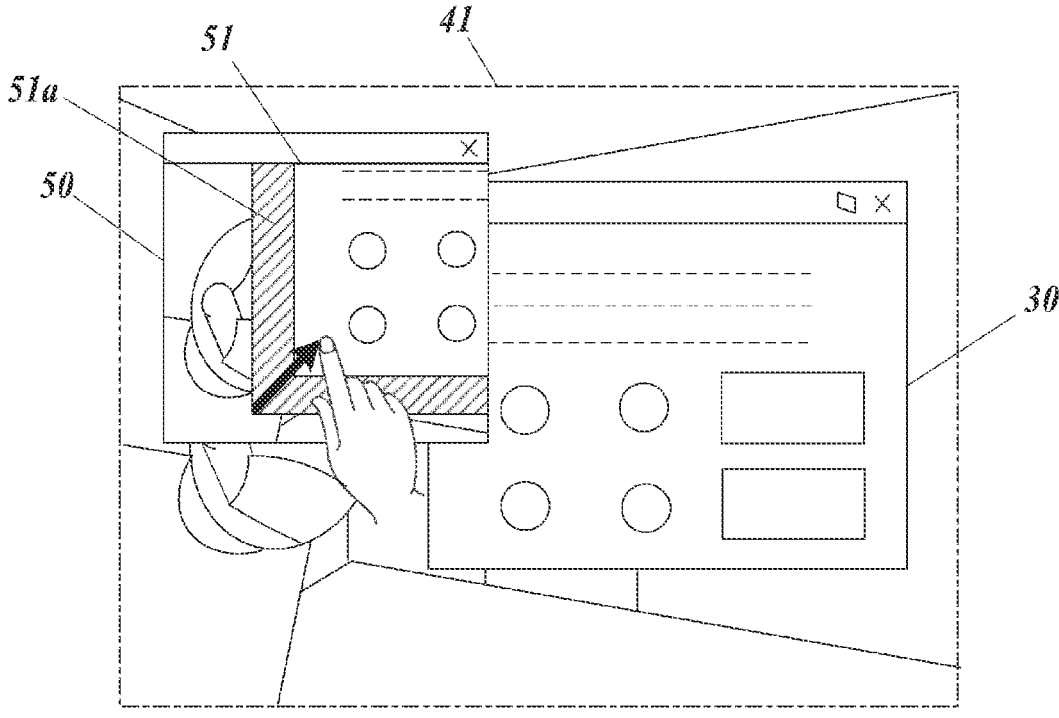
FIG. 19 is a diagram illustrating an operation of moving a virtual image inside the frame of the virtual capture image.
Figure 20:
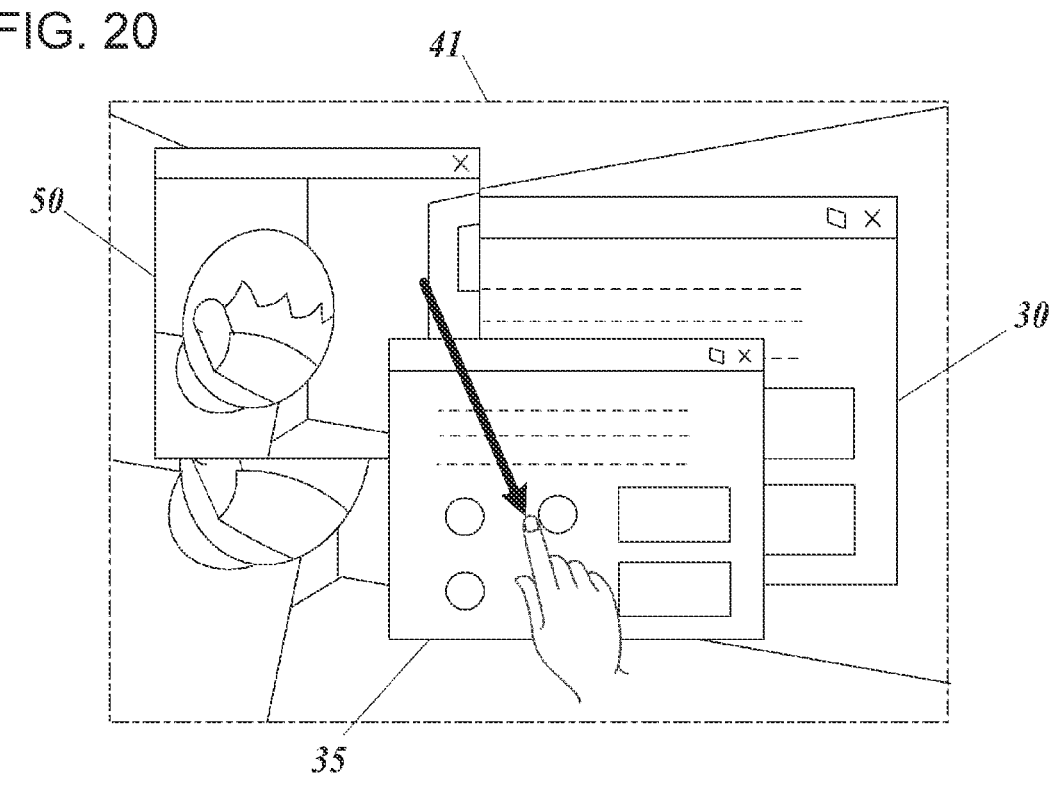
FIG. 20 is a diagram illustrating an operation of moving a virtual image to the outside of the frame of the virtual capture image.

When the virtual capture image 50 includes the virtual image region 51 (at least a part of the virtual image 30), the virtual image region 51 may be moved inside the frame of the virtual capture image 50 and/or to the outside of the frame as illustrated in FIGS. 18 to 20. When such a movement is performed, the user performs a predetermined gesture operation (for example, an operation of long-touching an inner portion of the virtual capture image 50) to display moving method designation buttons 91 to 93 for designating the movement method of the virtual image region 51 as illustrated in FIG. 18. The moving method designation button 91 is a button for moving the virtual image region 51 inside the frame of the virtual capture image 50. The moving method designation button 92 is a button for moving the virtual image region 51 inside the frame of the virtual capture image 50 and/or to outside of the frame. The moving method designation button 93 is a button for moving the virtual image region 51 to outside of the frame of the virtual capture image 50.

When the user performs a ninth gesture operation of selecting the moving method designation button 91, the CPU 11 accepts the start of an operation of moving the virtual image region 51 (at least a part of the virtual image 30) inside the frame of the virtual capture image 50. When the user performs a gesture operation of dragging the virtual image region 51 inside the frame of the virtual capture image 50 in this state, the virtual image region 51 moves inside the frame of the virtual capture image 50 to follow the dragging as illustrated in FIG. 19. Since the outer shape of the virtual capture image 50 does not change, the virtual image region 51 (the display range of the virtual image 30) displayed in the virtual capture image 50 is expanded or shrunk in size in response to the movement of the virtual image region 51. In response to the movement of the virtual image region 51, a shadow 51a may be displayed in the region where the virtual image region 51 has been located before the movement.

When the user performs the ninth gesture operation of selecting the moving method designation button 93, the CPU 11 accepts the start of an operation of moving the virtual image region 51 (a part of the virtual image 30) to the outside of the frame of the virtual capture image 50. When the user performs a gesture operation of dragging the virtual image region 51 to the outside of the frame of the virtual capture image 50 in this state, the virtual image 35 that is a duplicate of the entire virtual image 30 is displayed outside of the frame of the virtual capture image 50 as illustrated in FIG. 20. Alternatively, like the virtual image 34 in FIG. 16, a portion corresponding to the virtual image region 51 in the virtual capture image 50 may be moved to the outside of the frame. In response to the display of the virtual image 35 (or the virtual image 34), the virtual image region 51 located inside the frame of the virtual capture image 50 may be deleted.

When the user performs the ninth gesture operation of selecting the moving method designation button 92, the CPU 11 accepts the start of both the movement of the virtual image region 51 inside the frame of the virtual capture image 50 and the movement of the virtual image region 51 to the outside of the frame of the virtual capture image 50. That is, when the user performs a gesture operation of dragging the virtual image region 51 inside the frame of the virtual capture image 50, the CPU 11 moves the virtual image region 51 inside the frame of the virtual capture image 50 as illustrated in FIG. 19. When the user performs a gesture operation of dragging the virtual image region 51 to the outside of the virtual capture image 50, the CPU 11 causes the virtual image 35 (or the virtual image 34) to be displayed outside of the frame of the virtual capture image 50 as illustrated in FIG. 20.

As described above, the CPU 11 accepts the start of an operation of moving the virtual image 30 which is the first virtual image included in the virtual capture image 50 using one of two or more moving methods in response to the ninth gesture operation of the user on the virtual capture image 50 which is the displayed second virtual image, and the two or more moving methods include a method of expanding or shrinking the display range of the virtual image 30 in the virtual capture image 50 and a method of moving the virtual image 30 to outside of the virtual capture image 50 and displaying the virtual image 30 as the virtual image 34. This allows the virtual image 30 in the virtual capture image 50 to be moved in a desired manner.

The wearable terminal apparatus 10 according to the present disclosure can extract information from the virtual capture image 50 and display the information. That is, when the virtual capture image 50 which is the second virtual image includes an extraction target from which information is extractable, the CPU 11 extracts the information from the extraction target and causes the display unit 14 to display the information. The information extraction target may be at least one selected from the group consisting of a person, an article, a location, text, and code information. This allows an easy access to information that is extractable from a person, an article, a location, text, code information, and the like included in the virtual capture image 50. Various manners related to extraction of information are described below with reference to FIGS. 21 to 30.

Figure 21:
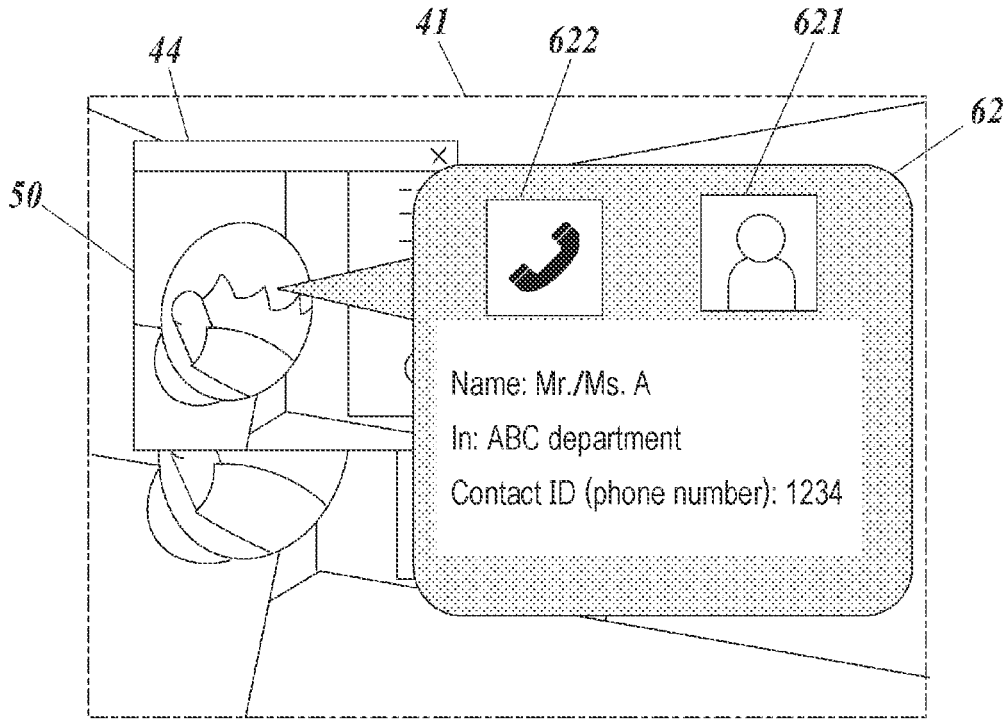
FIG. 21 is a diagram illustrating an operation of extracting information of a person from the virtual capture image and displaying the extracted information.

As illustrated in FIG. 21, when the virtual capture image 50 includes an image of the person 44 and information is extractable from the image of the person 44, an extracted information virtual image 62 (sixth virtual image) including the extracted information is displayed. The extracted information virtual image 62 may be displayed in response to a predetermined user operation performed when the virtual capture image 50 is displayed, or may be automatically displayed along with the display of the virtual capture image 50. The extracted information virtual image 62 displays information such as a face photo 621, a name, an affiliation, and a contact ID of the person 44. When the face photo 621 is not acquirable, a message indicating that the face photo 621 is not acquirable may be displayed. In response to a gesture operation of selecting the face photo 621, an operation for accessing the person 44 (for example, a call operation) may be started. The contact ID is a code, a number, or the like used to contact the person 44, and may be a phone number, for example. A to-be-used method of extracting the information on the person 44 from the virtual capture image 50 may be, but not limited to, a method of performing feature analysis on the image of the person 44, identifying a person matching a result of the feature analysis with reference to a database in which information on multiple persons is registered in advance, and acquiring the information of the person from the database, for example.

The extracted information virtual image 62 may also display an icon 622 (indicator) of an application program (hereinafter, referred to as an app) to be executed to contact the person 44. The app is predetermined in accordance with the type of the information extraction target (person in this example). In response to a gesture operation of selecting the icon 622, an app (phone book app) corresponding to the icon 622 is executed. As described above, when the virtual capture image 50 which is the second virtual image includes the extraction target from which information is extractable, the CPU 11 may cause the display unit 14 to display the icon 622 which is an indicator for starting an application predetermined in accordance with the type of the extraction target. This can make it easier to start an appropriate app corresponding to the type of the extraction target. Note that the display of the icon 622 may be omitted, and an app for making contact with the person 44 may be started in response to a gesture operation of selecting the face photo 621 or the contact ID (such as a phone number) to start a call operation or the like.

In FIG. 21, various kinds of information and icons 622 are displayed on a front side (first surface) of the extracted information virtual image 62 and no information is displayed on a back side (second surface). However, the display style is not limited to this style. For example, as illustrated in FIG. 22, the icon 622 may be displayed on the back side of the extracted information virtual image 62. That is, the CPU 11 causes the extracted information virtual image 62 which is the sixth virtual image including the information extracted from the extraction target to be displayed on the display unit 14, and causes the icon 622 which is an indicator to be displayed on at least one of a first surface of the extracted information virtual image 62 or a second surface opposite to the first surface. This allows the icon 622 to be displayed at an easily accessible position in accordance with the display position and the orientation of the extracted information virtual image 62.

Figures 23, 24:
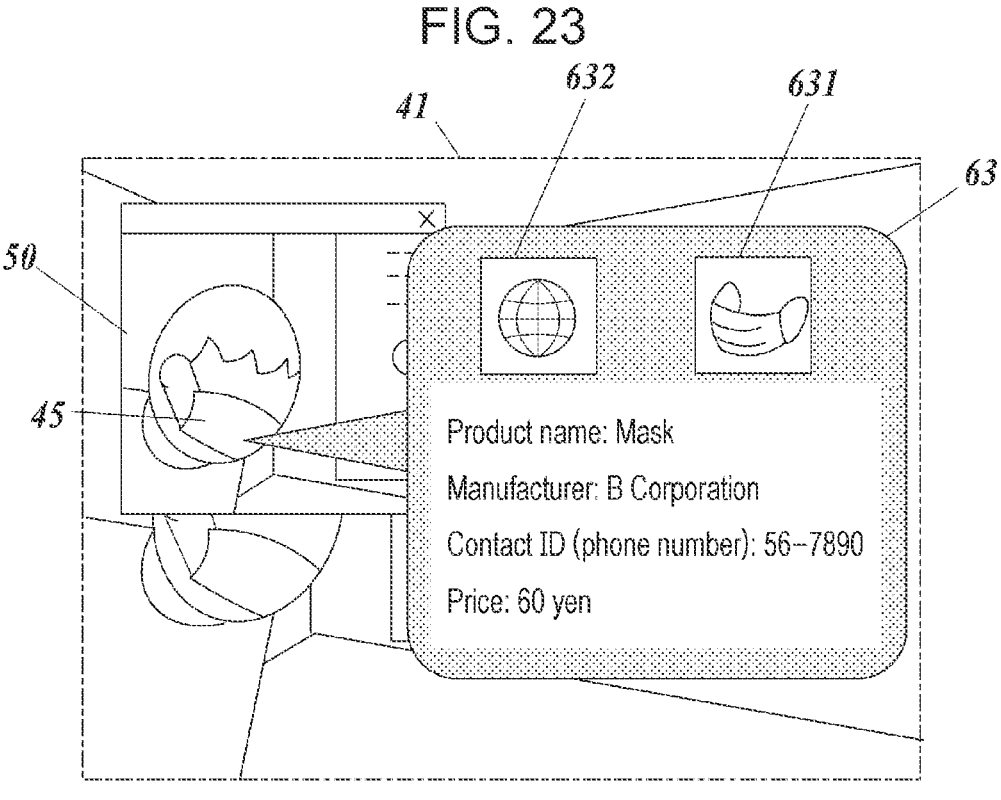
FIG. 23 is a diagram illustrating an operation of extracting information of an article from the virtual capture image and displaying the extracted information.
FIG. 24 is a diagram illustrating an operation of extracting information of a location from the virtual capture image and displaying the extracted information.

As illustrated in FIG. 23, when the virtual capture image 50 includes an image of an article 45 (mask in this example) and information is extractable from the image of the article 45, an extracted information virtual image 63 (sixth virtual image) including the extracted information is displayed. The extracted information virtual image 63 displays information such as an image 631 of the article 45 acquired from a website (for example, e-commerce (EC) site), a product name of the article 45, a manufacturer, a contact ID, and a price. When the image 631 is not acquirable, a message indicating that the image 631 is not acquirable may be displayed. In response to a gesture operation of selecting the image 631, a website (for example, an EC site) or the like where information on the article 45 is accessible may be displayed. The contact ID is a code, a number, or the like used to acquire the information on the article 45 or purchase the article 45, and may be a phone number or Uniform Resource Locator (URL), for example. A to-be-used method of extracting the information on the article 45 from the virtual capture image 50 may be, but not limited to, a method of identifying the article 45 using the same and/or similar method as and/or to the above-described method of identifying the person 44 and acquiring the information on the article 45 from the database, for example.

The extracted information virtual image 63 may also display an icon 632 (indicator) of an app to be executed to access the information on the article 45. The app is predetermined in accordance with the type of the information extraction target (article in this example). In response to a gesture operation of selecting the icon 632, an app (browser app in this case) corresponding to the icon 632 is executed. Note that the display of the icon 632 may be omitted, and an app (such as a browser app) for accessing the information on the article 45 may be started in response to a gesture operation of selecting the image 631 of the article 45 or the contact ID (such as a URL) and, for example, an EC site where the article 45 can be purchased may be displayed.

As illustrated in FIG. 24, when location information is extractable from an image of the background space 40 of the virtual capture image 50, an extracted information virtual image 64 (sixth virtual image) including the extracted information is displayed. The extracted information virtual image 64 displays information such as an image 641 representing the location, a name of the location, information of a building when the location has a building, and a contact ID. For example, when the location has a building, the image 641 may be a logo or the like of a company that owns the building. When the image 641 is not acquirable, a message indicating that the image 641 is not acquirable may be displayed. In response to a gesture operation of selecting the image 641, a map of the location may be displayed. The displayed map may be a standard map if the location is outside a building and may be an indoor map if the location is inside a building. The contact ID is a code, a number, or the like used to access location information, and may be a phone number, a URL, or the like, for example. A to-be-used method of extracting the location information from the virtual capture image 50 may be, but not limited to, a method of identifying the location using the same and/or similar method as and/or to the above-described method of identifying the person 44 and acquiring the location information from the database, for example.

The extracted information virtual image 64 may display an icon 642 (indicator) of an app to be executed to access the location information. The app is predetermined in accordance with the type of the information extraction target (location in this example). In response to a gesture operation of selecting the icon 642, an app (map app in this example) corresponding to the icon 642 is executed. Note that the display of the icon 642 may be omitted, and an app (such as a map app) for accessing the location information may be started in response to a gesture operation of selecting the image 641 of the location or the contact ID (such as a URL) and, for example, a map indicating the location may be displayed.

The operation to be performed when information is extractable from the virtual capture image 50 is not limited to the operation described above. For example, as illustrated on the left side of FIG. 25, when information on a person is extractable from the virtual capture image 50, the icon 622 of an app (for example, a call app) associated in advance with "person" which is the information extraction target may be automatically displayed. The app may be executed in response to a gesture operation of selecting the icon 622, and a virtual image 623 of the app may be displayed in a state where a call with the extracted person is started, for example.

Figure 25:
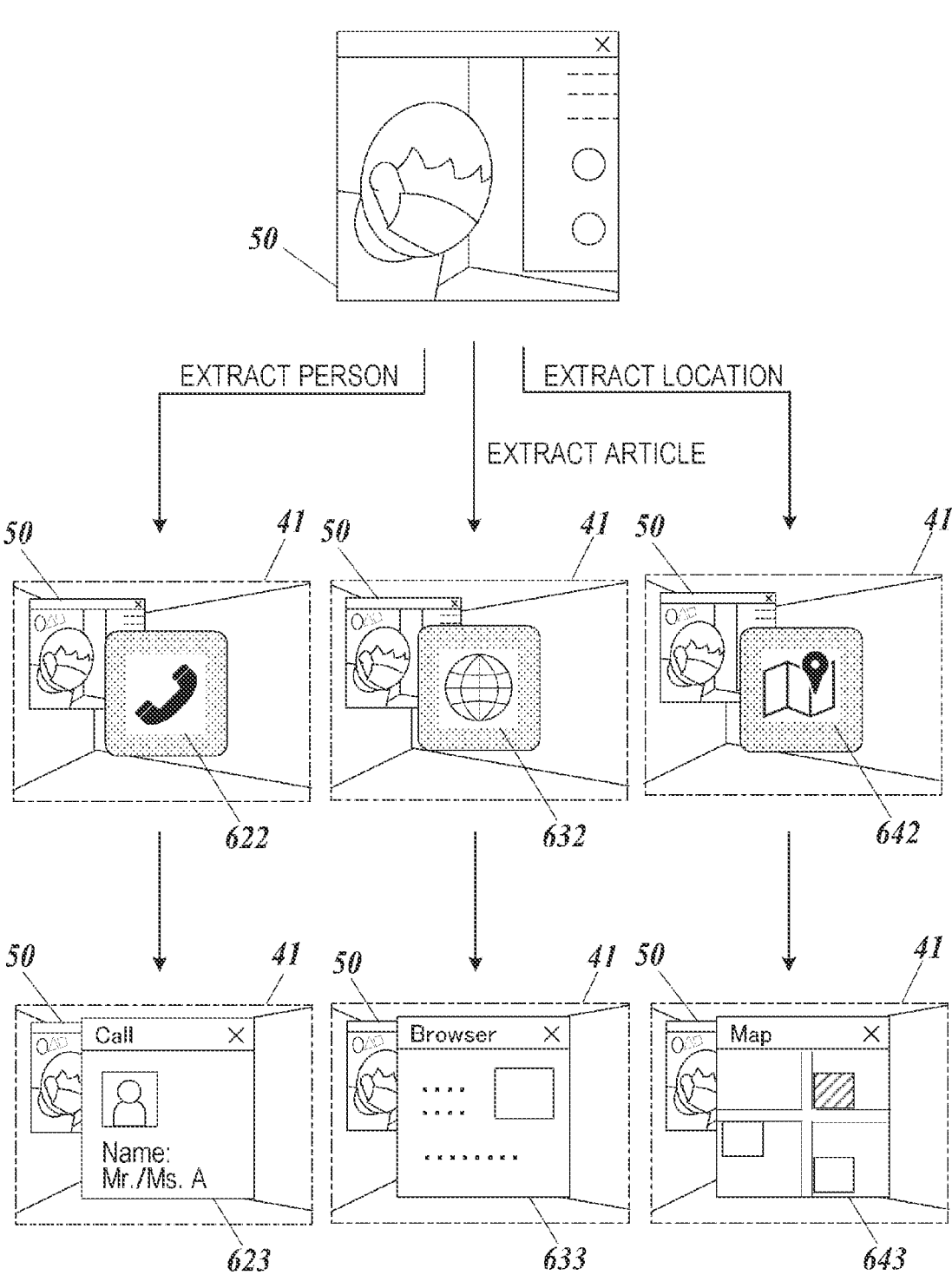
FIG. 25 is a diagram illustrating another example of the operation of extracting information from the virtual capture image and displaying the extracted information.

As illustrated in the center of FIG. 25, when information on an article is extractable from the virtual capture image 50, the icon 632 of an app (for example, a browser app) associated in advance with the "article" which is the information extraction target may be automatically displayed. The app may be executed in response to a gesture operation of selecting the icon 632, and a virtual image 633 of the app including a website where the extracted article information is accessible may be displayed, for example.

As illustrated on the right side of FIG. 25, when information on a location is extractable from the virtual capture image 50, the icon 642 of an app (for example, a map app) associated in advance with the "location" which is the information extraction target may be automatically displayed. The app may be executed in response to a gesture operation of selecting the icon 642, and a virtual image 643 of the app including a map indicating the extracted location may be displayed, for example.

In FIG. 25, the display of the icons 622, 632, and 642 may be skipped, and the virtual images 623, 633, and 643 of the apps may be directly displayed.

Figure 26:
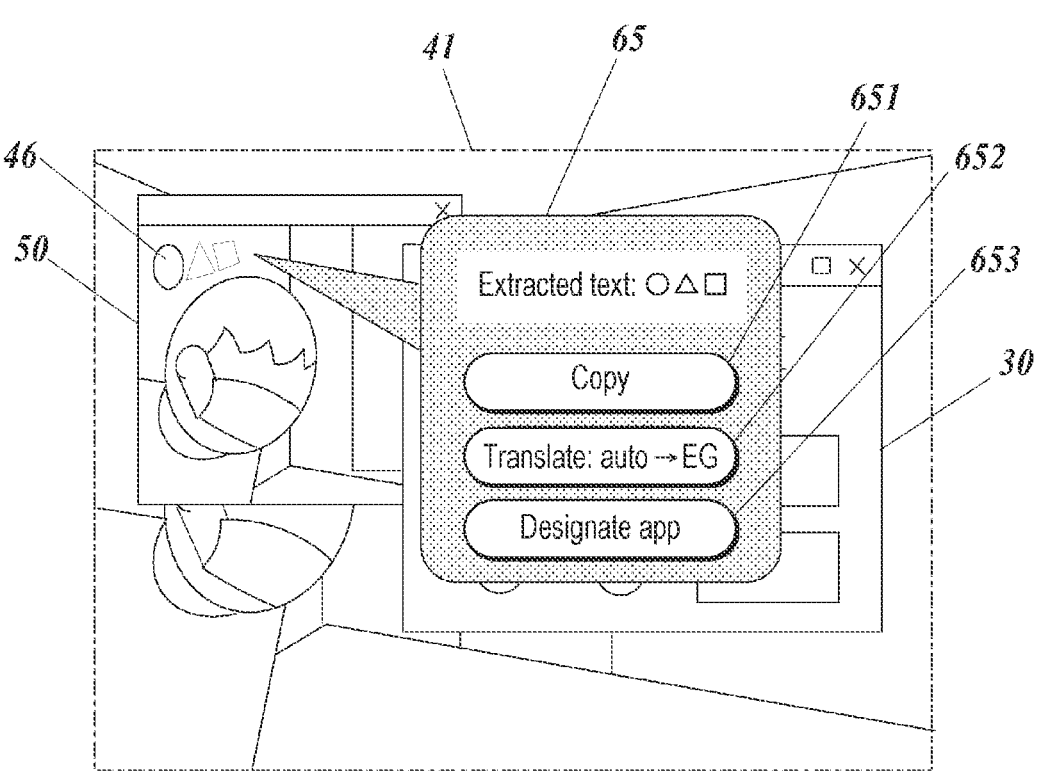
FIG. 26 is a diagram illustrating an operation of extracting information of text from the virtual capture image and displaying the extracted information.

As illustrated in FIG. 26, when the virtual capture image 50 includes an image of text 46 and information is extractable from the image of the text 46, an extracted information virtual image 65 (sixth virtual image) including the extracted information is displayed. The extracted information virtual image 65 displays content of the text 46 extracted by optical character recognition (OCR) or the like and operation buttons 651 to 653 for executing various kinds of processing on the extracted text. The size of the text 46 displayed in the extracted information virtual image 65 may be larger than the size of the text 46 in the virtual capture image 50. The size of the text 46 displayed in the extracted information virtual image 65 may be set in advance.

Figure 27:
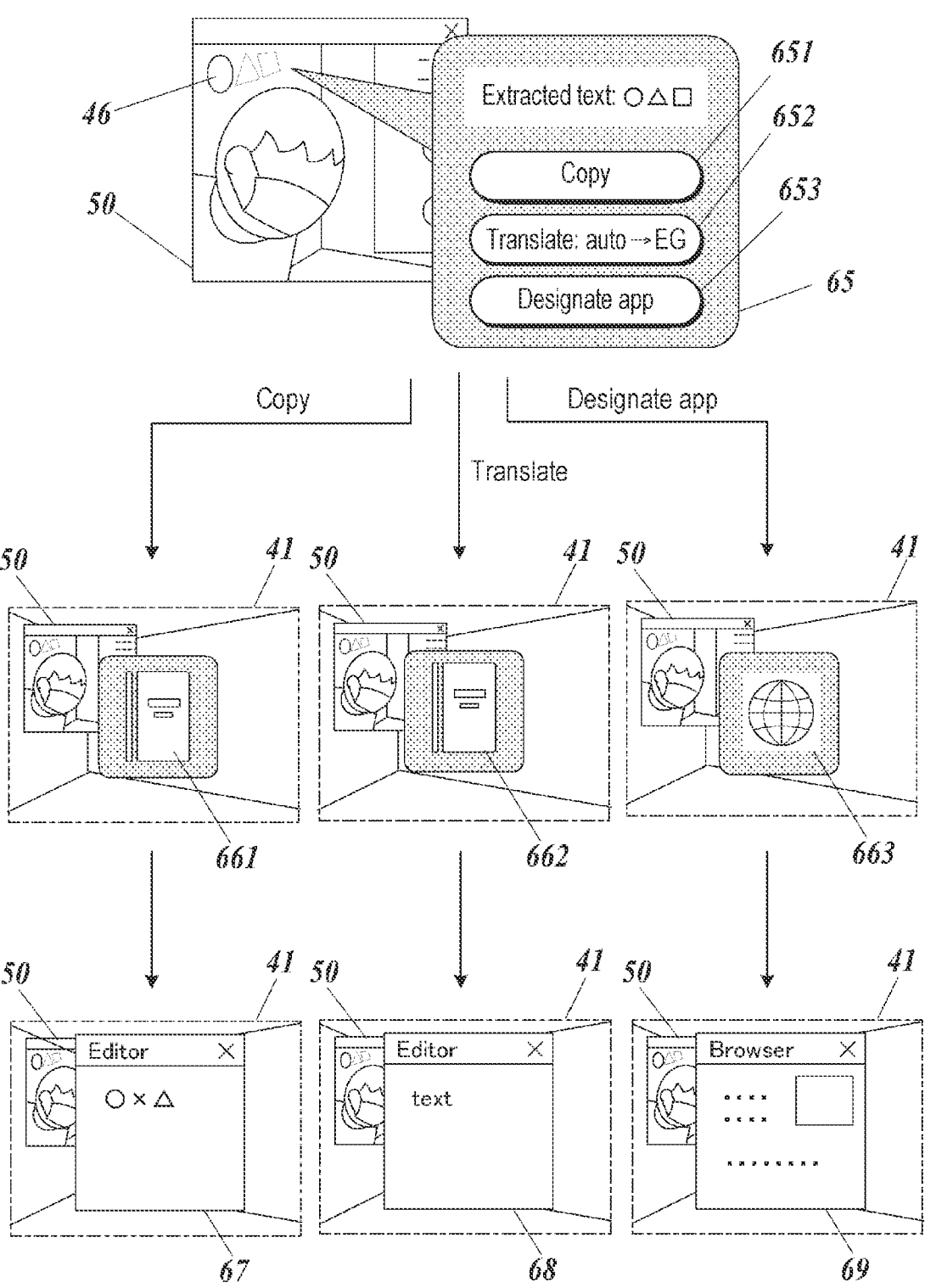
FIG. 27 is a diagram illustrating an operation performed when various kinds of processing are performed on the extracted text information.

As illustrated in FIG. 27, in response to a gesture operation of selecting any operation button of the operation buttons 651 to 653, processing corresponding to the any operation button of the operation buttons 651 to 653 is performed on the extracted text 46. In response to a gesture operation of selecting the operation button 651 displayed as "Copy", an icon 661 of an app (for example, an editor app) set in advance as an app for editing text data is automatically displayed as illustrated on the left side of FIG. 27. The app is executed in response to a gesture operation of selecting the icon 661, and a virtual image 67 of the app is displayed with the text 46 in an editable state.

In response to a gesture operation of selecting an operation button 652 displayed as "Translation: auto→EG", an icon 662 of an app (for example, an editor app) set in advance as an app for editing text data is automatically displayed as illustrated in the center of FIG. 27. The icon 662 may be the same as the icon 661. In response to a gesture operation of selecting the icon 662, the extracted text 46 is translated in accordance with a predetermined translation setting. In this example, the extracted text 46 is set to be translated into English after the language of the extracted text 46 is automatically determined. Alternatively, in response to an eleventh gesture operation of the user on a setting button (not illustrated), a translation setting related to a translation target language or the like may be performed. In this case, the text 46 is translated in accordance with the translation setting performed by the user. Then, the app corresponding to the icon 662 is executed, and a virtual image 68 of the app is displayed with translated text in an editable state. As described above, the CPU 11 translates information extracted from the text 46 in accordance with a predetermined translation setting or in accordance with a translation setting corresponding to the eleventh gesture operation of the user, and causes the translated information to be displayed on the display unit 14. This allows the extracted text 46 to be easily translated and displayed.

In response to a gesture operation of selecting the operation button 653 displayed as "Designate app", an icon 663 of the app (a browser app in this case) designated by the user is automatically displayed as illustrated on the right side of FIG. 27. The app may be designated by the user and the designated app may be set in advance, or the app may be selected by the user each time from options of apps displayed in response to selection of the operation button 653. The app is executed in response to a gesture operation of selecting the icon 663, and a virtual image 69 of the app for performing processing on the information of the extracted text 46 is displayed. In the example of FIG. 27, the virtual image 69 of the browser app presenting a search result of the extracted text 46 is displayed.

In FIG. 27, the display of the icons 661 to 663 may be skipped, and the virtual images 67 to 69 of the apps may be directly displayed.

Figure 28:
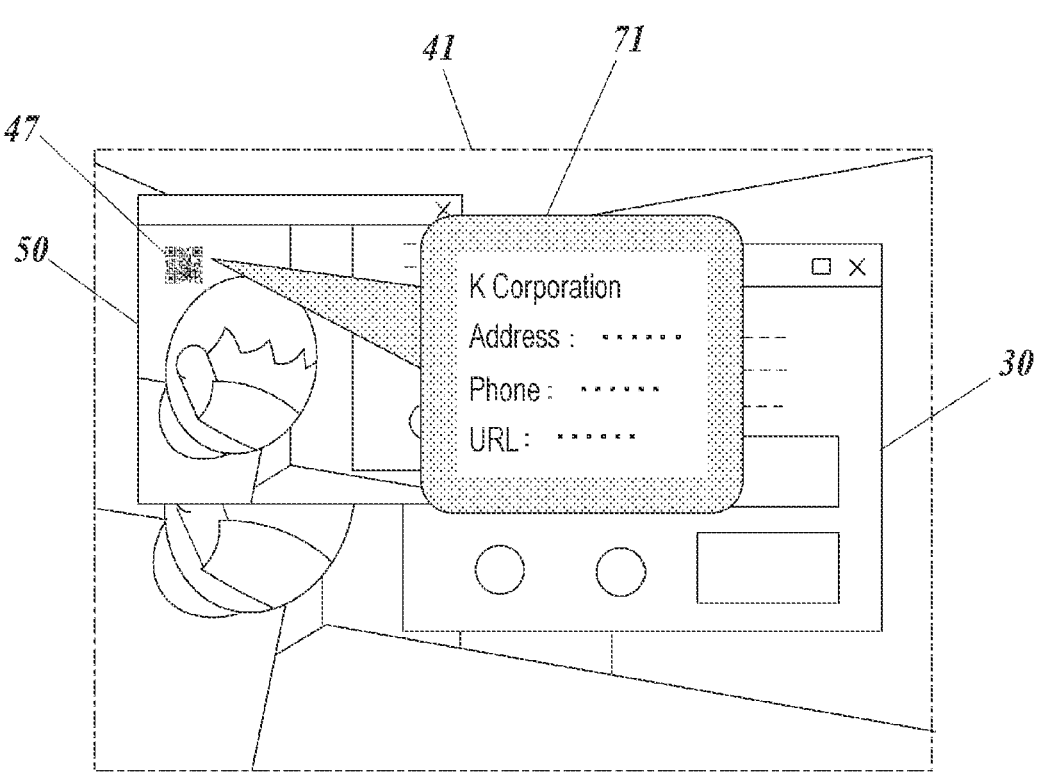
FIG. 28 is a diagram illustrating an operation of extracting information of a two-dimensional code from the virtual capture image and displaying the extracted information.

As illustrated in FIG. 28, when the virtual capture image 50 includes an image of a two-dimensional code 47 (code information) and information is extractable from the image of the two-dimensional code 47, an extracted information virtual image 71 (sixth virtual image) including the extracted information is displayed. The extracted information virtual image 71 displays information obtained by decoding the two-dimensional code 47 and information related to the information. In the example of FIG. 71, information "K corporation" is extracted from the two-dimensional code 47, and information such as an address, a phone number, and a URL of K corporation is displayed. In response to a gesture operation of selecting a phone number or a URL, an app (a call app, a browser app, or the like) for accessing "K corporation" may be started. Note that the code information from which information is extractable is not limited to the two-dimensional code 47, and may be a bar code or a code including characters and symbols.

Figure 29:
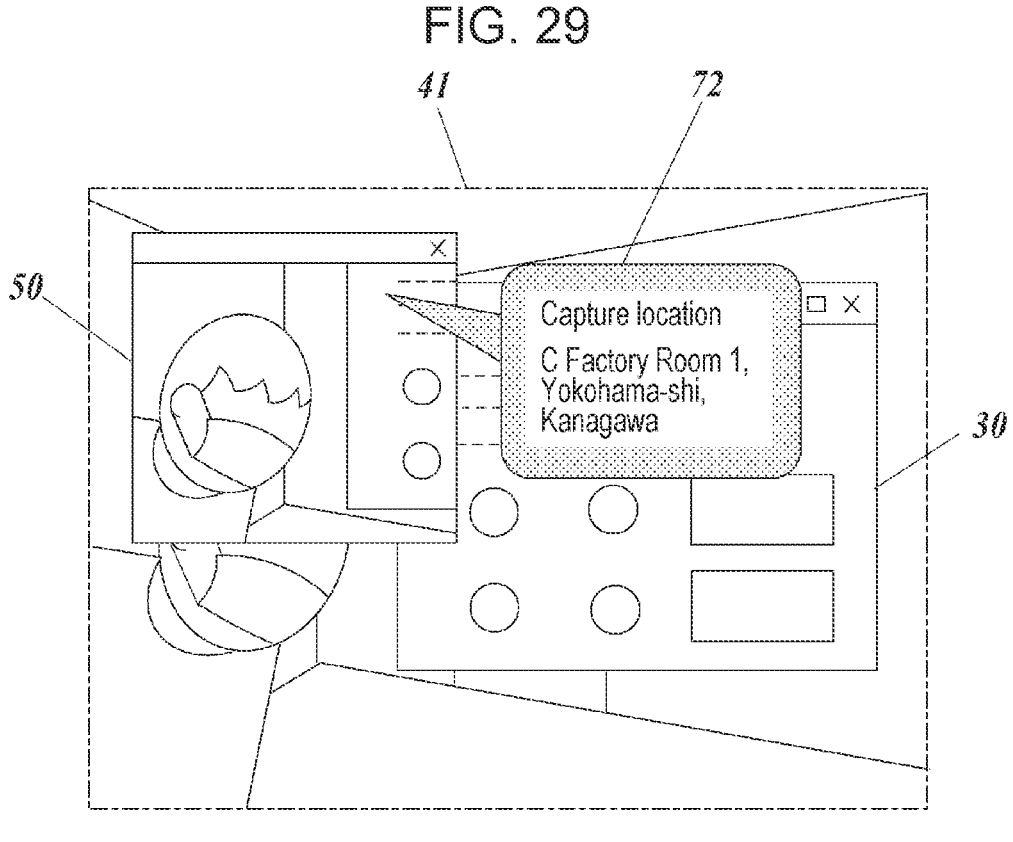
FIG. 29 is a diagram illustrating an operation of displaying position information obtained at generation of the capture image.

The virtual capture image 50 may include position information of the wearable terminal apparatus 10 at the time of generation of the capture image C. In this case, the CPU 11 acquires the position information of the apparatus (the wearable terminal apparatus 10) at the time of the first gesture operation described above, and stores the acquired position information in the storage unit 13 in association with the capture image C. This allows the generation location of the capture image C to be easily referred to at any timing after the capturing. The position information may be acquired from a positioning satellite of a global navigation satellite system (GNSS) such as a global positioning system (GPS), or may be various kinds of local position information. The local position information may be acquired from, for example, a signal transmitted from an access point of a wireless LAN, a beacon station, a local 5G base station, or the like. When the virtual capture image 50 is displayed based on the capture image C, a virtual image 72 including information related to the generation location of the capture image C may be displayed as illustrated in FIG. 29. Instead of the text information as illustrated in FIG. 29 (or in addition to the text information), a map indicating the capture location may be displayed. Note that in addition to the position information, information on the generation date and time of the capture image C may be acquired and displayed in the virtual image 72.

Figure 30:
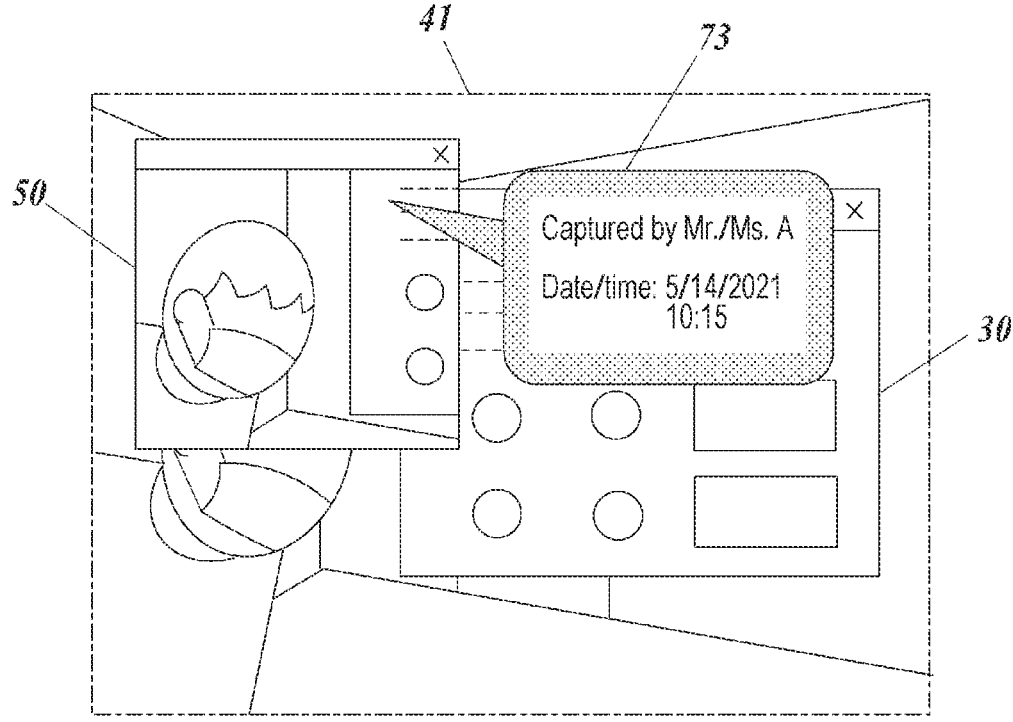
FIG. 30 is a diagram illustrating an operation of displaying user information obtained at generation of the capture image.

The virtual capture image 50 may include information for identifying a user using the wearable terminal apparatus 10 at the time of generation of the capture image C. In this case, the CPU 11 identifies the user at the time of the first gesture operation, and stores user information on the identified user in the storage unit 13 in association with the capture image C. This allows the operator at the time of generation of the capture image C to be easily referred to at any timing after the capturing. A method of identifying the user is not limited. For example, the user at the time of generation of the capture image C may be acquired from login information. When the virtual capture image 50 is displayed based on the capture image C, a virtual image 73 including information on the user and the date and time at the time of generation of the capture image C may be displayed as illustrated in FIG. 30. Note that an icon that allows a face image of the user to be displayed may be displayed as the information on the user over the virtual capture image 50 or near the virtual capture image 50.

The wearable terminal apparatus 10 can be used for various purposes at various locations. Thus, it may be inappropriate to generate and store the capture image C depending on the location where the capture operation is performed, the capture target included in the visible region 41, or the like. The wearable terminal apparatus 10 may have a function of not storing the capture image C in the storage unit 13 in such a case. Hereinafter, to prohibit generation of the capture image C and storage of the capture image C in the storage unit 13 is also referred to as "to prohibit capturing", and to permit generation of the capture image C and storage of the capture image C in the storage unit 13 is also referred to as "to permit capturing".

Figure 31:
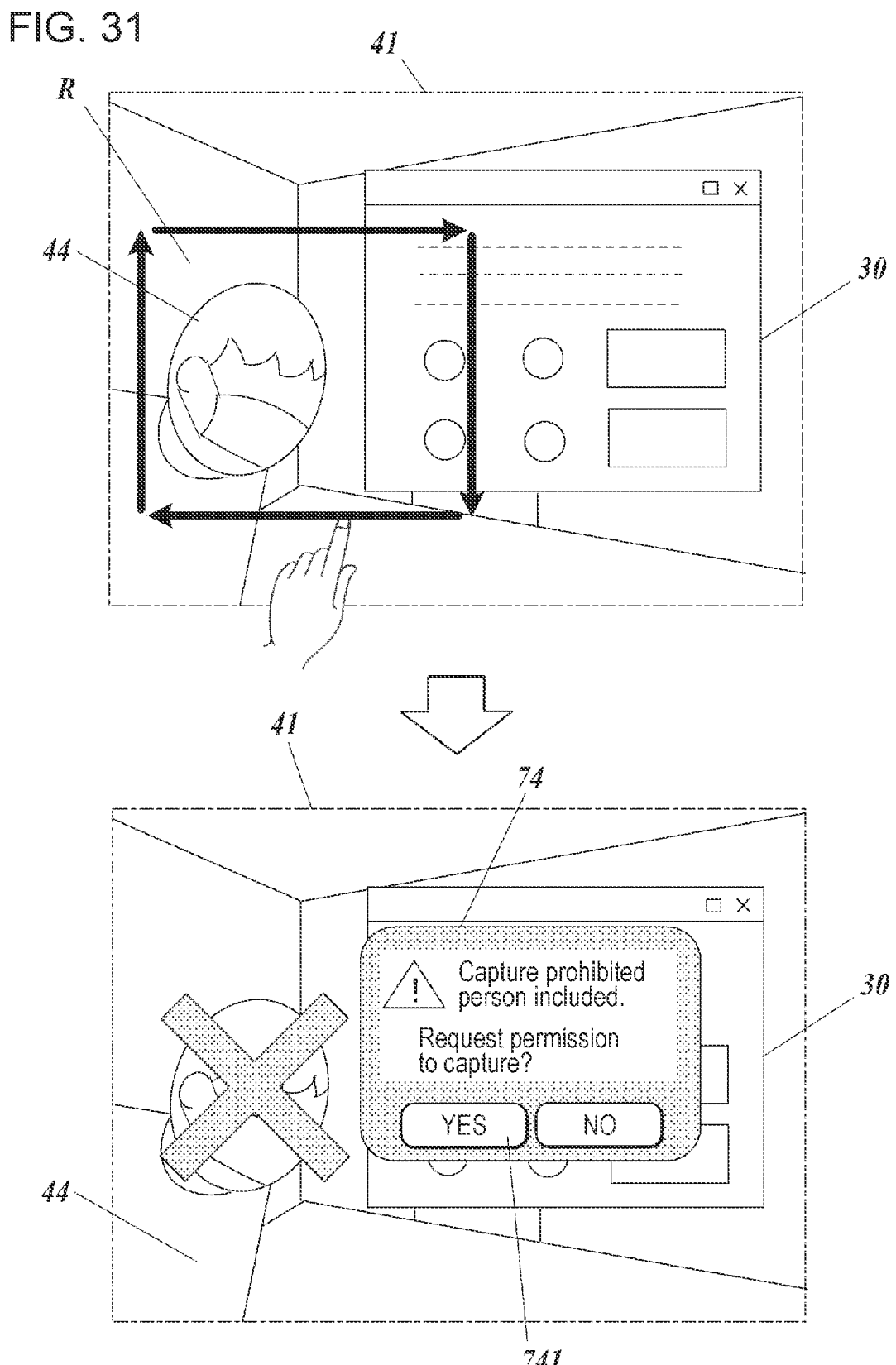
FIG. 31 is a diagram illustrating a display operation performed when capturing is prohibited.

For example, as illustrated in FIG. 31, the CPU 11 may determine whether a predetermined capture prohibited target is included in the capture region R. When the CPU 11 determines that the capture prohibited target is included in the capture region R, the capture image C may not be stored in the storage unit 13. In this manner, generation of the capture image C including the capture prohibited target and storage of the capture image C in the storage unit 13 can be restricted. In the example of FIG. 31, the person 44 set in advance as a capture prohibited target is included in the capture region R identified by the first gesture operation of the user. In this case, even if the capture region R is identified, the capture image C is not stored in the storage unit 13. The capture prohibited target is not limited to a person, and may be an article such as a work of art such as a painting or a real estate such as a building. The capture prohibited target may be an object protected by copyright. A to-be-used method of determining whether an object is a capture prohibited target may be, but not limited to, a method of storing an image feature of the capture prohibited target in the storage unit 13 or an external server and comparing the image feature of the capture prohibited target with the image feature of an image included in the capture region R, for example.

When capturing is prohibited, the display style of the capture operation start buttons 611 and 612 may be changed to invalidate the operation in the virtual menu image 61 illustrated in the lower drawing of FIG. 8, for example. Alternatively, the capture operation start buttons 611 and 612 may be hidden.

When a capture prohibited target is included in the capture region R, in response to an authorized person to cancel prohibition of capturing permitting the capturing, prohibition may be cancelled and the capture image C may be stored in the storage unit 13. For example, as illustrated in a lower drawing of FIG. 31, in response to the first gesture operation for identifying the capture region R, a virtual dialog image 74 for asking the user whether to request permission for capturing is displayed. In response to a gesture operation on a YES button 741 of the virtual dialog image 74, a signal requesting cancellation of prohibition of capturing is transmitted to an external device used by the authorized person. In response to reception of a permission signal for permitting cancellation of prohibition of capturing from the external device, the capture image C is stored in the storage unit 13. The subsequent display operation of the virtual capture image 50 is the same as and/or similar to the display operation described above.

The CPU 11 may refer to an authorization level of the user who is operating the wearable terminal apparatus 10, based on the user ID or the like used to log into the wearable terminal apparatus 10, and determine whether to prohibit capturing in accordance with the authorization level. The authorization level may be determined based on, for example, a job title, a department, or a qualification.

The CPU 11 may determine whether to prohibit capturing, based on the current position of the wearable terminal apparatus 10. In this case, the CPU 11 acquires the position information of the wearable terminal apparatus 10 at the time of the first gesture operation, and does not store the capture image C in the storage unit 13 when the position indicated by the position information satisfies a predetermined position prohibition condition. In this manner, capturing can be provided when the wearable terminal apparatus 10 is located at a specific location. The position information may be acquired from a positioning satellite of the GNSS such as the GPS, or may be various kinds of local position information. The local position information may be acquired from, for example, a signal transmitted from an access point of a wireless LAN, a beacon station, a local 5G base station, or the like. When the acquired position information is within a range of a predetermined prohibited area, the CPU 11 determines that the position prohibition condition is satisfied.

When the communication unit 16 receives a specific signal, the CPU 11 may not store the capture image C in the storage unit 13. In this manner, capturing can be prohibited at any timing by transmitting the specific signal to the wearable terminal apparatus 10. The specific signal may be any signal that is set in advance as a signal for prohibiting capturing. When a predetermined time elapses after the reception of the specific signal, prohibition of capturing may be canceled. Even through the communication unit 16 receives the specific signal, when the visible region 41 does not include any virtual object such as the virtual image 30 but includes only the background space 40, capturing may be permitted.

When a predetermined connection condition related to a connection state of the communication unit 16 to the communication network is satisfied, the CPU 11 may not store the capture image C in the storage unit 13. This allows prohibition of capturing to be controlled in accordance with the connection state to the communication network. The connection condition related to control of prohibition of capturing can be determined in any manner. In one example, when a connection is established to a public communication network, the CPU 11 may determine that the connection condition described above is satisfied and prohibit capturing, and when a connection is established to a private communication network (such as local 5G or wireless LAN), the CPU 11 may determine that the connection condition described above is not satisfied and permit capturing. In another example, when the wearable terminal apparatus 10 is online, the CPU 11 may determine that the connection condition described above is satisfied and prohibit capturing, and when the wearable terminal apparatus 10 is offline, the CPU 11 may determine that the connection condition described above is not satisfied and permit capturing.

When the capture region R includes at least a part of the virtual image (first virtual image) and the virtual image satisfies a predetermined prohibition condition, the CPU 11 may not store the capture image C in the storage unit 13. In this manner, the CPU can prohibit a virtual image that is inappropriate as the capture target from being stored as the capture image C. For example, when the virtual image is a screen of a specific app and a specific capture prohibition flag is set in the app, the CPU 11 can prohibit the virtual image of the app from being stored as the capture image C.

As described above, even though capturing is prohibited based on the current position, capturing is prohibited in response to reception of a specific signal, capturing is prohibited in response to satisfaction of the connection condition related to the connection state to the communication network, and capturing is prohibited in response to the virtual image included in the capture region R satisfying the prohibition condition, prohibition of capturing may be canceled when the authorized person gives permission. In this case, as illustrated in the lower drawing of FIG. 31, the virtual dialog image 74 for asking the user whether to request permission for capturing may be displayed. The CPU 11 may refer to the authorization level of the user who is operating the wearable terminal apparatus 10, and determine whether to prohibit capturing in accordance with the authorization level.

Figure 32:
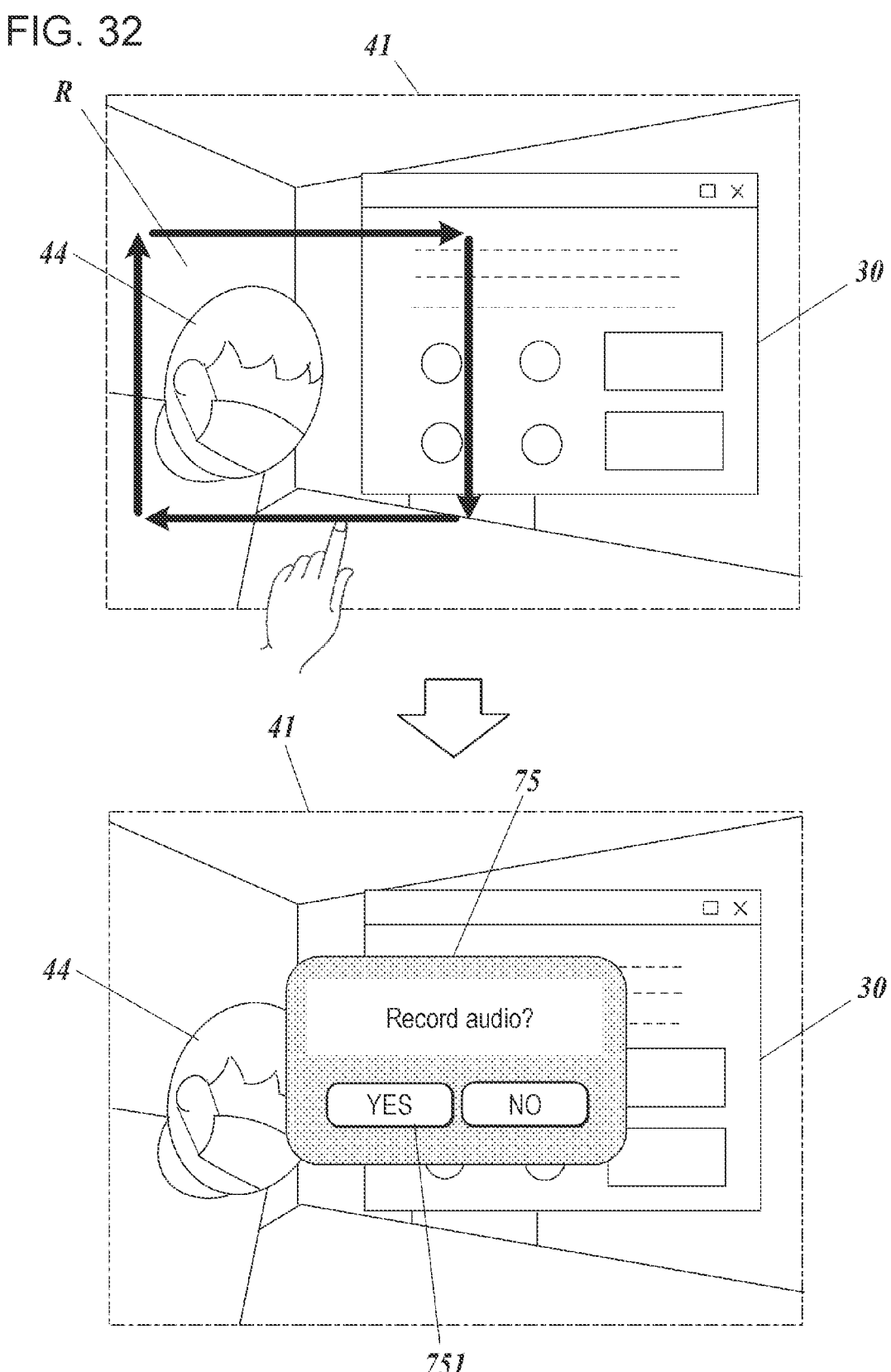
FIG. 32 is a diagram illustrating a display operation performed when sound is recorded in association with the capture image.
Figure 33:
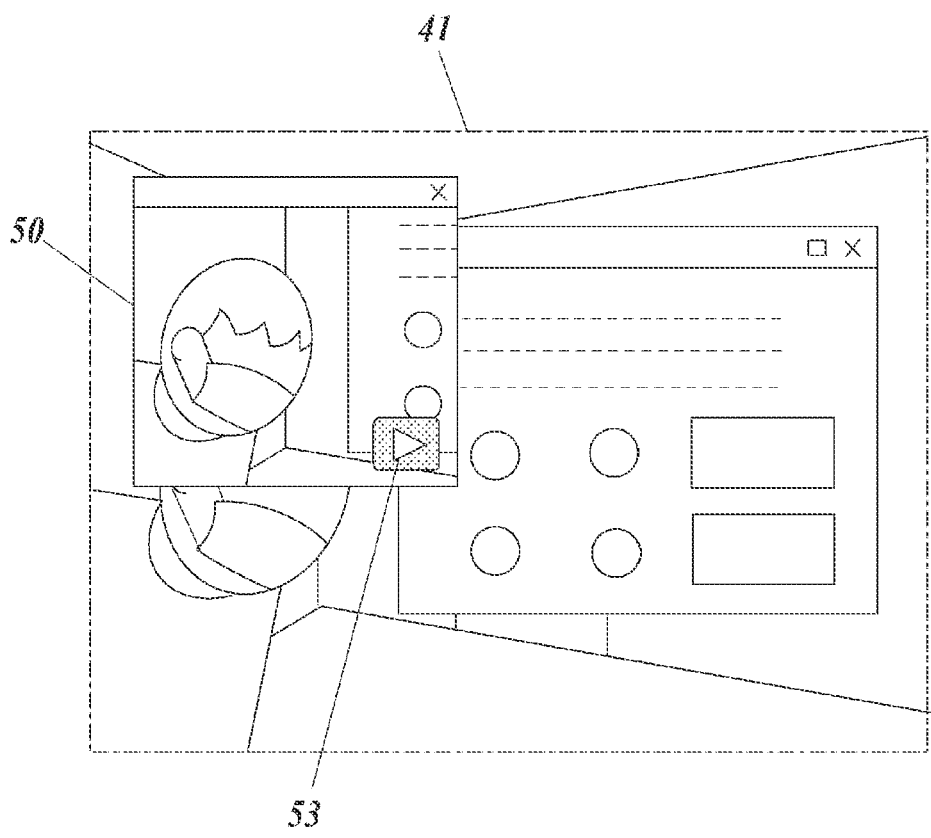
FIG. 33 is a diagram illustrating a virtual capture image when sound is associated with the capture image.

The capture image C may be stored in association with audio data. That is, when storing the capture image C in the storage unit 13, the CPU 11 may acquire audio data and store the audio data in the storage unit 13 in association with the capture image C. This allows audio information to be added to the capture image C. For example, when the capture region R is identified in response to the first gesture operation as illustrated in an upper drawing of FIG. 32, a virtual dialog image 75 for asking the user whether to record audio may be displayed as illustrated in a lower drawing of FIG. 32. In response to a gesture operation of operating a YES button 751 of the virtual dialog image 75, audio data is acquired (recorded) by the microphone 17 and stored in the storage unit 13 in association with the capture image C of the capture region R. Note that the timing of recording is not limited to this, and for example, recording may be performed when the virtual capture image 50 is displayed. When the virtual capture image 50 including the capture image C associated with the audio data is displayed, a playback button 53 for playing back the audio data may also be displayed as illustrated in FIG. 33. In response to a gesture operation of selecting the playback button 53, sound of the audio data associated with the capture image C is output from the speaker 18. Note that the playback button 53 may be displayed on the back side of the virtual capture image 50.

In the above description, the virtual capture image 50 is displayed alone in the space 40. However, the configuration is not limited this, and the virtual capture image 50 may be displayed to satisfy a predetermined positional relationship with respect to another object (display target). That is, the CPU 11 may cause the virtual capture image 50 which is the second virtual image to be displayed on a surface of a predetermined display target located in the space 40 or at a position where the virtual capture image 50 satisfies a predetermined positional relationship with the display target. The display target may be an object, a person, or any virtual image other than the virtual capture image 50 in the space 40. This allows the virtual capture image 50 to be displayed in association with another object, person, virtual image (such as a virtual object), or the like.

Figure 34:
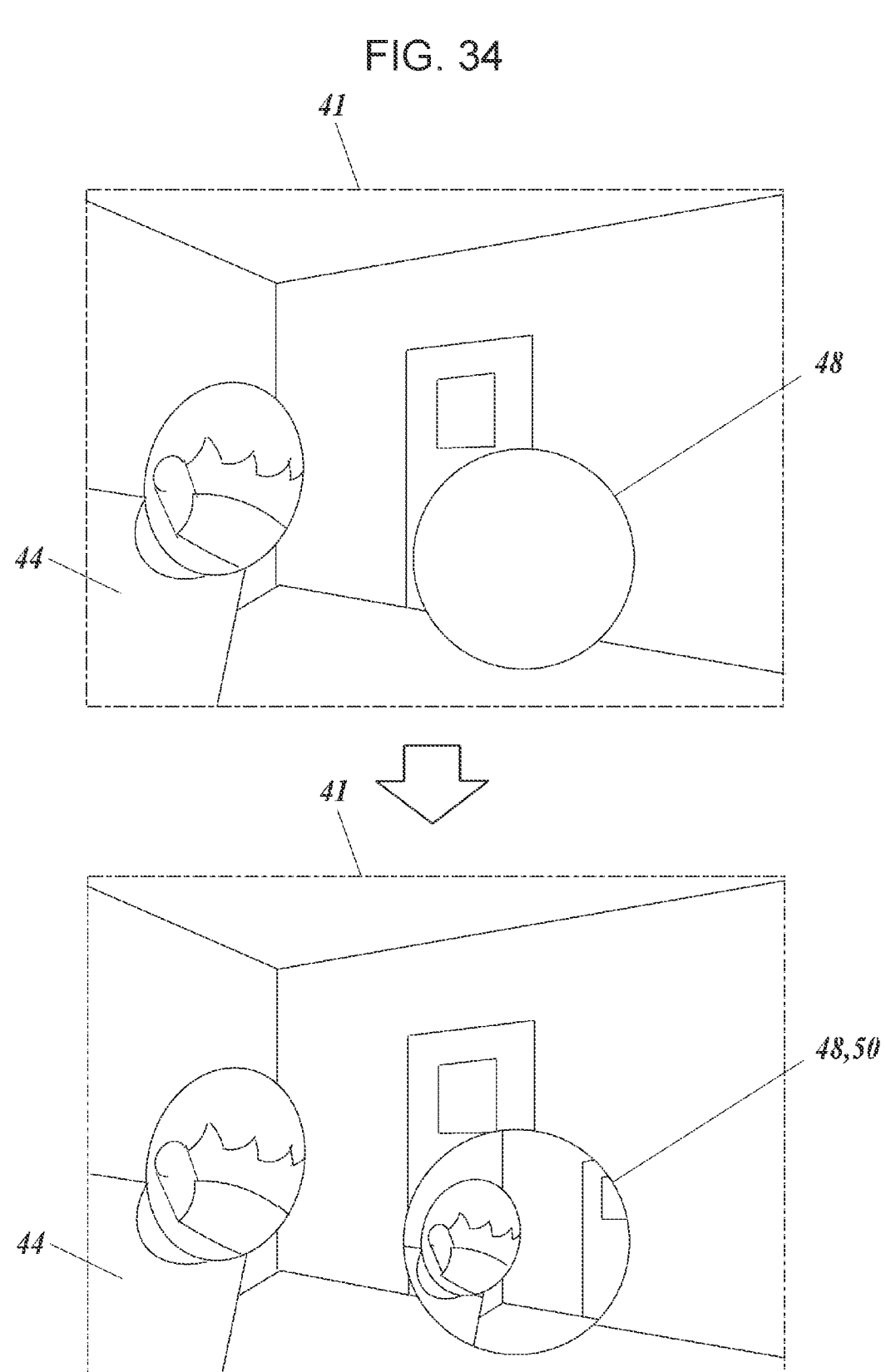
FIG. 34 is a diagram illustrating the virtual capture image displayed on a surface of another object.

For example, as illustrated in FIG. 34, the virtual capture image 50 may be displayed at a position corresponding to an outer surface of a spherical object 48 located in the space 40 to match the shape of the outer surface. An outline of a surface of an object or virtual image located in the space 40 may be identified, and the virtual capture image 50 having an outer shape matching the outline may be displayed on the surface of the object or the virtual image. The display position of the virtual capture image 50 is not limited to the surface of the object or the like, and may be a position near the object or the like.

Figure 35:
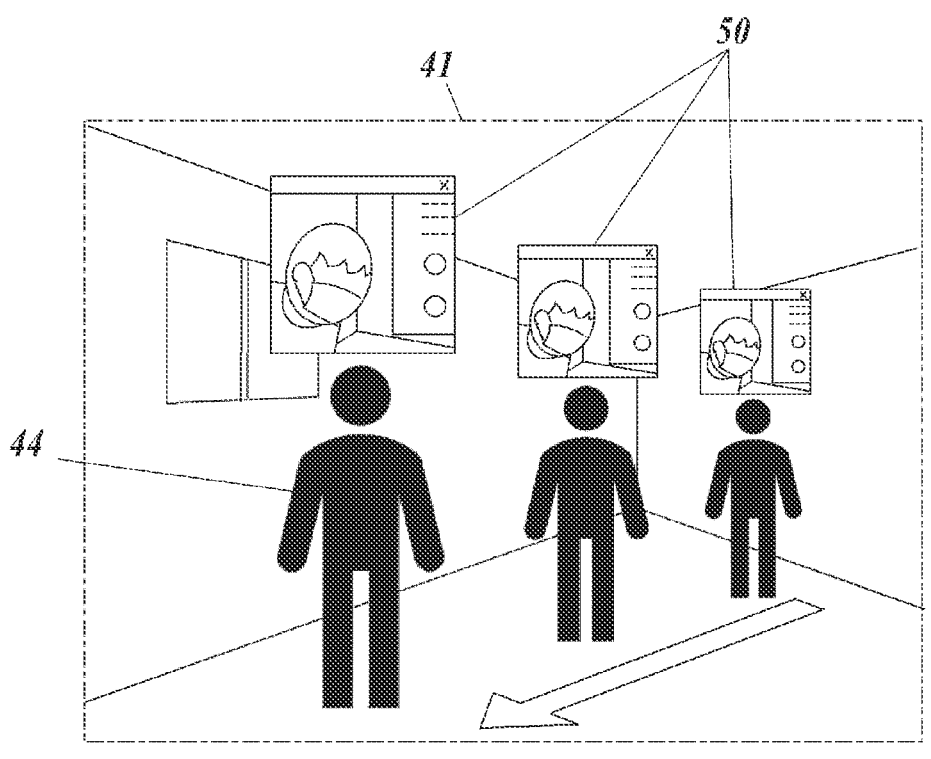
FIG. 35 is a diagram illustrating a virtual capture image that moves along with a display target.

The CPU 11 may move the display position of the virtual capture image 50 which is the second virtual image in accordance with movement of the display target in the space 40. This allows a relationship between the virtual capture image 50 and another object, person, virtual image, or the like to be dynamically expressed. For example, as illustrated in FIG. 35, when the virtual capture image 50 is displayed at a position above the head of the person 44 which is the display target, the virtual capture image 50 may be moved in accordance with the movement of the person 44. As illustrated in FIG. 35, the CPU 11 may cause the virtual capture image 50 that enlarges as the distance between the user and the display target decreases to be displayed. This allows the perspective to be expressed by the size of the virtual capture image 50, and thus can show the virtual capture image 50 to move in the space 40 more naturally.

The CPU 11 may change the orientation of the virtual capture image 50 which is the second virtual image in accordance with the change of the orientation of the display target. For example, in an upper drawing of FIG. 36, the virtual capture image 50 is displayed at a position right above an arrow-shaped stereoscopic virtual object 54 (virtual image) which is the display target such that the front side of the virtual capture image 50 is in the direction of the arrow. When the orientation of the virtual object 54 is changed as illustrated in a lower drawing, the orientation of the virtual capture image 50 is changed in accordance with the orientation of the virtual object 54. In this example, merely the states before and after the change of the orientation are illustrated. However, when the virtual capture image 50 is rotated from the state in the upper drawing of FIG. 36 to the state in the lower drawing, the virtual capture image 50 may be rotated in accordance with the rotation.

Figure 38:
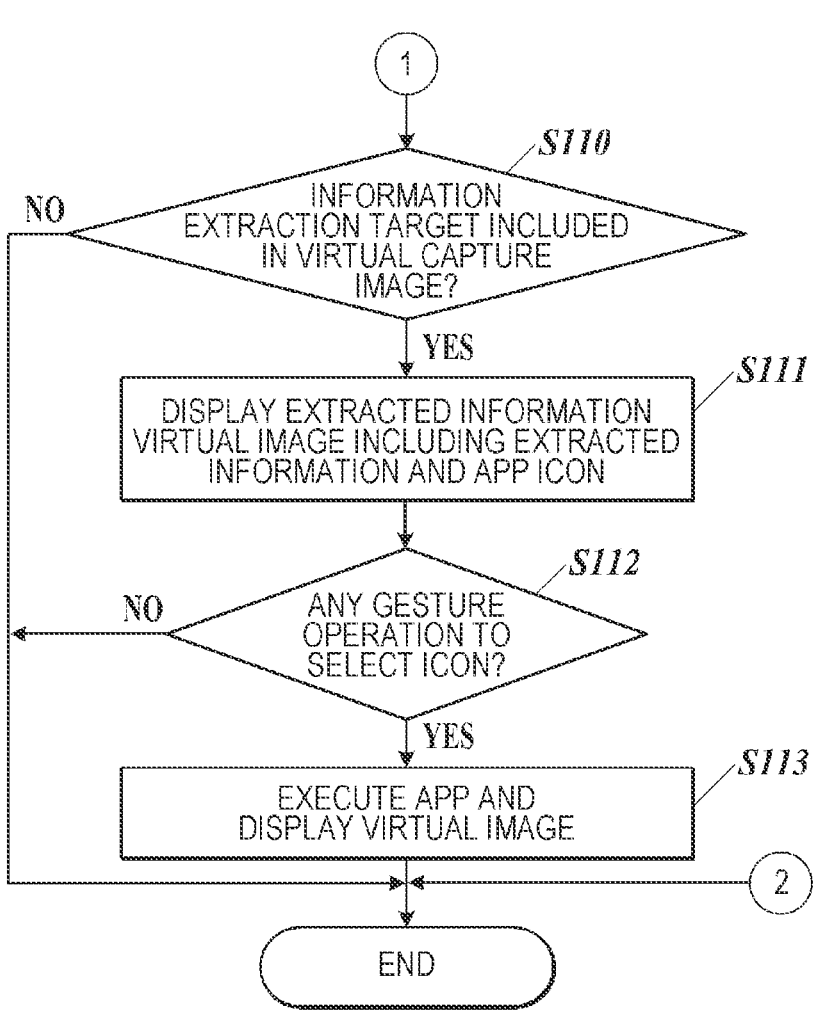
FIG. 38 is a flowchart illustrating the control procedure of the virtual capture image display process.

A virtual capture image display process for performing various operations related to display of the virtual capture image 50 described above is described with reference to flowcharts of FIGS. 37 and 38. Here, a representative process for performing a representative operation is illustrated. As described in the operations above, the operation and the process related to display of the virtual capture image 50 are not limited to these.

As illustrated in FIG. 37, after the disclosure of the virtual capture image display process, the CPU 11 causes the display unit 14 to display the virtual menu image 61 in response to the third gesture operation of the user (step S101). The CPU 11 determines whether the designation method of the capture region R is designated (step S102). For example, when an operation of selecting the capture operation start button 611 or 612 is performed in the virtual menu image 61 of FIG. 8, the CPU 11 determines that the designation method of the capture region R is designated. If the CPU 11 determines that the designation method of the capture region R is not designated ("NO" in step S102), the CPU 11 performs step S102 again. If the CPU 11 determines that the designation method of the capture region R is designated ("YES" in step S102), the CPU 11 accepts designation of the capture region R by using the selected designation method (step S103) and determines whether the capture region R is designated (step S104). If the CPU 11 determines that the capture region R is not designated ("NO" in step S104), the CPU 11 performs step S104 again.

If the CPU 11 determines that the capture region R is designated ("YES" in step S104), the CPU 11 determines whether capturing is prohibited (step S105). As exemplified above, capturing is prohibited when a capture prohibited target is included in the capture region R, when capturing is prohibited based on the current position, when capturing is prohibited in response to reception of the specific signal, when capturing is prohibited in response to satisfaction of the connection condition related to the connection state to the communication network, and when capturing is prohibited in response to the virtual image included in the capture region R satisfying the prohibition condition.

If the CPU 11 determines that capturing is prohibited ("YES" in step S105), the CPU 11 transmits, in response to an instruction of the user, a signal for requesting cancellation of prohibition of capturing to an external device operated by an authorized person, and determines whether a permission signal for permitting cancellation of prohibition of capturing is received from the external device (step S106). If the permission signal is not received within a predetermined period ("NO" in step S106), the CPU 11 ends the virtual capture image display process. If the permission signal is received within the predetermined period ("YES" in step S106) or if the CPU 11 determines in step S105 that capturing is not prohibited ("NO" in step S105), the CPU 11 generates the capture image C of the capture region R and stores the capture image C in the storage unit 13 (step S107).

The CPU 11 determines whether the second gesture operation for displaying the capture image C as the virtual capture image 50 is performed (step S108). When the CPU 11 determines that the second gesture operation is not performed ("NO" in step S108), the CPU 11 performs step S108 again. If the CPU 11 determines that the second gesture operation is performed ("YES" in step S108), the CPU 11 causes the display unit 14 to display the virtual capture image 50 including the capture image C (step S109).

The CPU 11 determines whether the virtual capture image 50 includes an information extraction target (step S110). When the CPU 11 determines that the information extraction target is included ("YES" in step S110), the CPU 11 causes the display unit 14 to display an extracted information virtual image including the extracted information, an icon of a predetermined app, and the like (step S111). The CPU 11 determines whether a gesture operation of selecting the icon is performed (step S112). If the CPU determines that the gesture operation is performed ("YES" in step S112), the CPU 11 executes the app corresponding to the icon to cause a virtual image of the app to be displayed on the display unit 14 (step S113). After step S113 is finished, if the CPU 11 determines in step S110 that the information extraction target is not included ("NO" in step S110), or if the CPU 11 determines in step S112 that the gesture operation of selecting the icon is performed ("NO" in step S112), the CPU 11 ends the virtual capture image display process.

Second Embodiment

Figure 39:
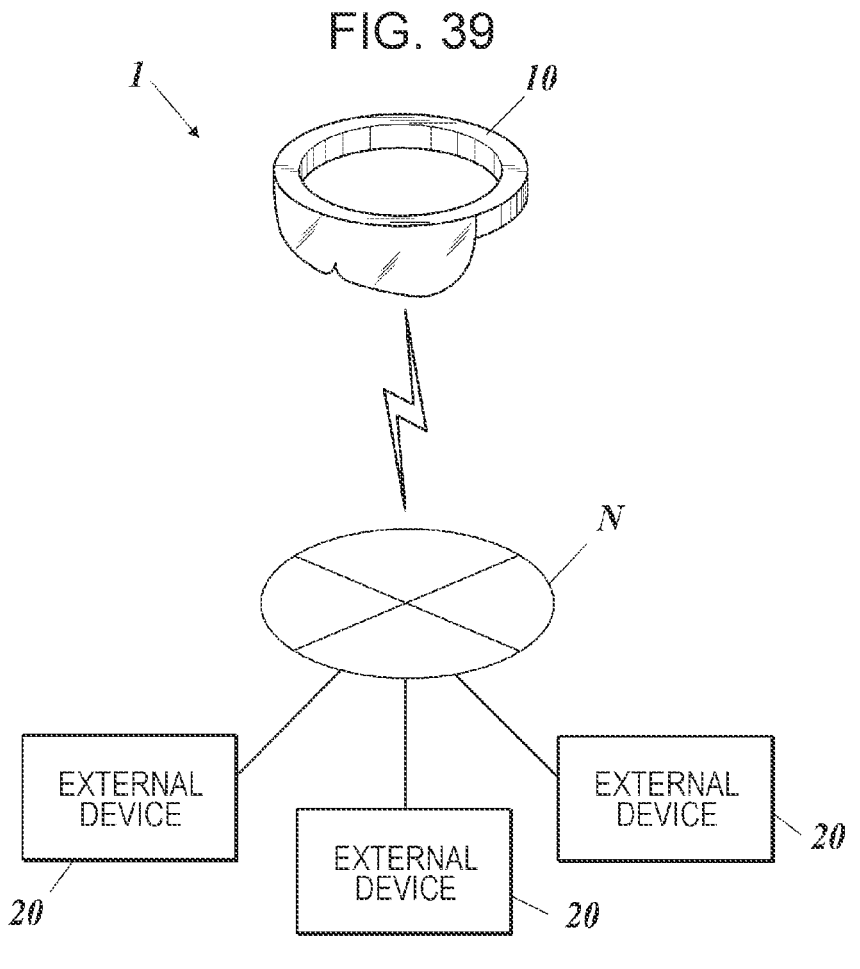
FIG. 39 is a schematic diagram illustrating a configuration of a display system according to a second embodiment.

A configuration of a display system 1 according to a second embodiment is described. As illustrated in FIG. 39, the display system 1 according to the second embodiment differs from the first embodiment in that the display system 1 includes a wearable terminal apparatus 10 and multiple external devices 20. Differences from the first embodiment are described below, and description of common points is omitted.

As illustrated in FIG. 39, the wearable terminal apparatus 10 and the multiple external devices 20 included in the display system 1 are connected to one another by communication via a network N. The network N may be, but not limited to, the Internet, for example. Note that the display system 1 may include multiple wearable terminal apparatuses 10. The display system 1 may include a single external device 20. For example, in the present embodiment, a user who performs a predetermined work wears the wearable terminal apparatus 10. A remote instructor who gives an instruction to the user wearing the wearable terminal apparatus 10 from a remote place via the wearable terminal apparatus 10 operates the external device 20.

Figure 40:
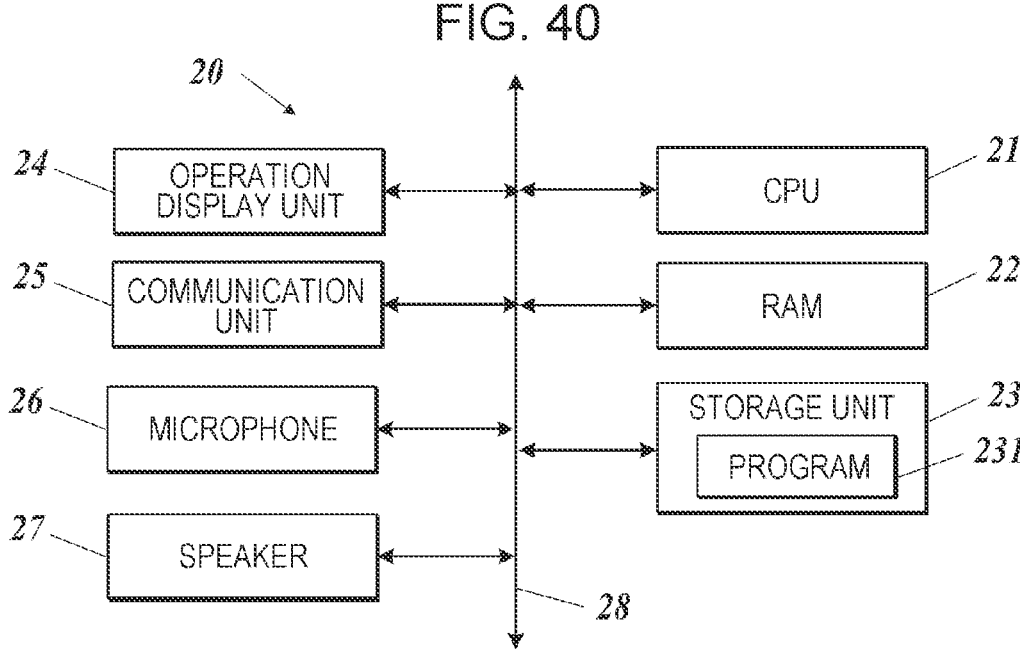
FIG. 40 is a block diagram illustrating a major functional configuration of an external device.

As illustrated in FIG. 40, the external device 20 includes a CPU 21, a RAM 22, a storage unit 23, an operation display unit 24, a communication unit 25, a microphone 26, and a speaker 27. These components are connected to one another by a bus 28.

The CPU 21 is a processor that performs various kinds of arithmetic processing and integrally controls operations of the components of the external device 20. The CPU 21 reads and executes a program 231 stored in the storage unit 23 to perform various control operations.

The RAM 22 provides a working memory space for the CPU 21 and stores temporary data.

The storage unit 23 is a non-transitory recording medium readable by the CPU 21 which is a computer. The storage unit 23 stores the program 231 to be executed by the CPU 21, various kinds of setting data, and so on. The program 231 is stored in the storage unit 23 in a form of a computer-readable program code. Examples of the storage unit 23 to be used include a nonvolatile storage device such as a solid state drive (SSD) including a flash memory or a hard disk drive (HDD).

The operation display unit 24 includes a display device such as a liquid crystal display and an input device such as a mouse and keyboard. The operation display unit 24 performs various displays such as an operation status and a processing result of the display system 1 on the display device. The displays include, for example, an instructor screen 42 (see FIG. 42) including an image of the visible region 41 imaged by the camera 154 of the wearable terminal apparatus 10. The operation display unit 24 converts a user's input operation on the input device into an operation signal and outputs the operation signal to the CPU 21.

The communication unit 25 transmits and receives data to and from the wearable terminal apparatus 10 in accordance with a predetermined communication protocol. The communication unit 25 can perform audio data communication with the wearable terminal apparatus 10. That is, the communication unit 25 transmits audio data collected by the microphone 26 to the wearable terminal apparatus 10, and receives audio data transmitted from the wearable terminal apparatus 10 to output sound from the speaker 27. The communication unit 25 may be capable of communicating with an apparatus other than the wearable terminal apparatus 10.

The microphone 26 converts sound such as voice of the remote instructor into an electric signal and outputs the electric signal to the CPU 21.

The speaker 27 converts the input audio data into mechanical vibrations and output the vibrations as sound.

In the display system 1 according to the present embodiment, the wearable terminal apparatus 10 and the one or more external devices 20 perform bidirectional data communication with each other to be able to share various kinds of data and operate in cooperation. For example, data of an image obtained by the camera 154 of the wearable terminal apparatus 10 and data of the displayed virtual image 30 are transmitted to the external device 20 and displayed as the instructor screen 42 on the operation display unit 24. This allows the remote instructor to recognize a scene the user of the wearable terminal apparatus 10 visually recognizes through the visor 141 in real time. Audio collected by the microphone 17 of the wearable terminal apparatus 10 and audio collected by the microphone 26 of the external device 20 are transmitted by bidirectional audio data communication, so that a voice call can be performed. Thus, a period in which the wearable terminal apparatus 10 and the external device 20 perform audio data communication includes a period in which the user of the wearable terminal apparatus 10 and the remote instructor are having a voice call. The remote instructor can give an instruction and a support to the user of the wearable terminal apparatus 10 via the voice call while viewing a real-time camera image on the instructor screen 42.

When the virtual capture image 50 described above is displayed on the display unit 14 of the wearable terminal apparatus 10, the display of the virtual capture image 50 can be reflected on the instructor screen 42 of the external device 20. However, not displaying the virtual capture image 50 on the instructor screen 42 of the external device 20 may be desired when the virtual capture image 50 includes confidential information or the like. Accordingly, in the display system 1 of the present disclosure, whether to reflect display of the virtual capture image 50 on the instructor screen 42 can be set in advance. The data related to the setting may be stored in the storage unit 13 of the wearable terminal apparatus 10 or may be stored in the storage unit 23 of the external device 20. Even though the virtual capture image 50 is set not to be reflected on the instructor screen 42 of the external device 20, the display of the virtual capture image 50 may be reflected on the instructor screen 42 when the user of the wearable terminal apparatus 10 gives permission.

Figure 41:
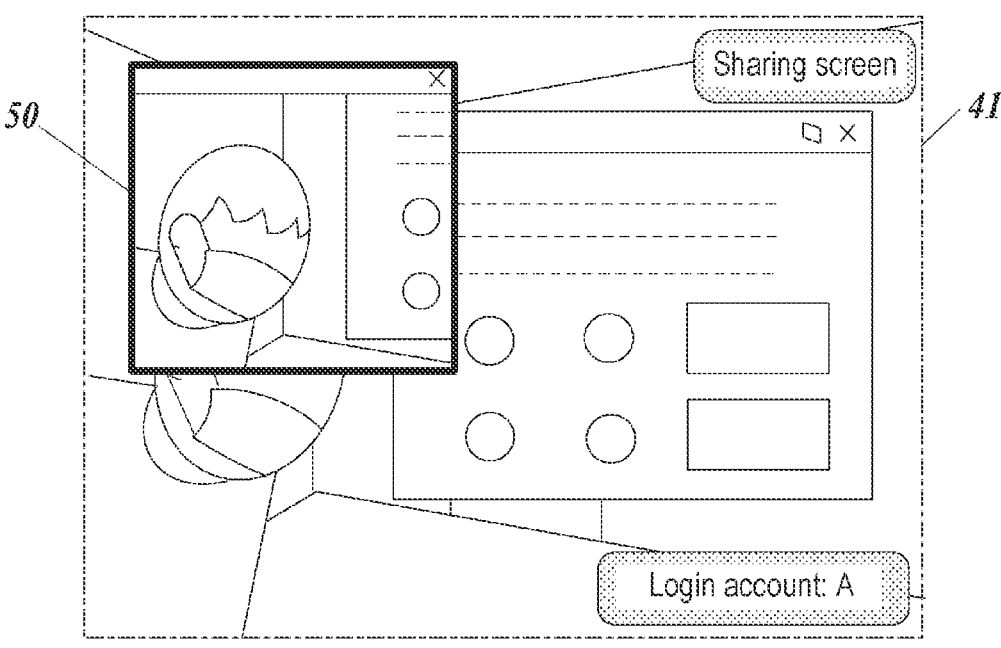
FIG. 41 is a diagram illustrating a visible region in the wearable terminal apparatus while a screen is shared.

For example, a user A has logged into the wearable terminal apparatus 10, a user B has logged into the external device 20, and the screen is shared between the wearable terminal apparatus 10 and the external device 20. The display of the virtual capture image 50 in the visible region 41 in the wearable terminal apparatus 10 is set not to be reflected on the instructor screen 42 of the external device 20. In this state, when the virtual capture image 50 is displayed on the wearable terminal apparatus 10 as illustrated in FIG. 41, a region corresponding to the virtual capture image 50 is displayed on the instructor screen 42 of the external device 20 but the content is not displayed as illustrated in FIG. 42.

Figure 42:
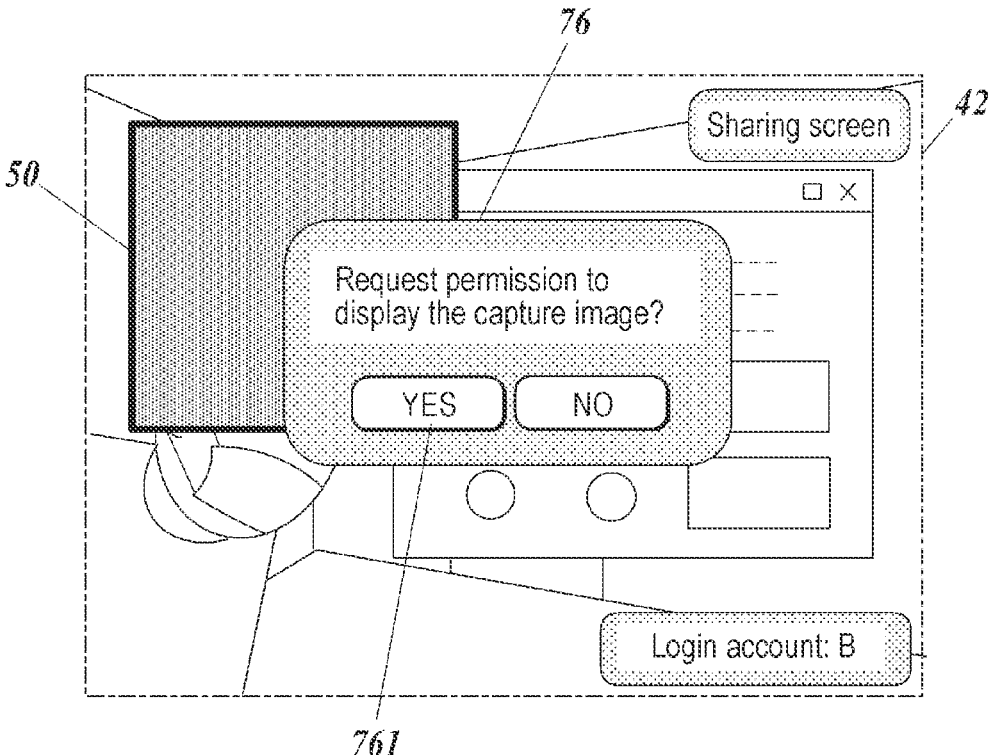
FIG. 42 is a diagram illustrating a dialog image displayed on an instructor screen of the external device while the screen is shared.

In this case, as illustrated in FIG. 42, a dialog image 76 for asking the remote instructor whether to request permission to display the virtual capture image 50 may be displayed on the instructor screen 42. In response to an operation of selecting a YES button 761 of the dialog image 76, a request signal for requesting permission to display the virtual capture image 50 is transmitted to the wearable terminal apparatus 10.

Figure 43:
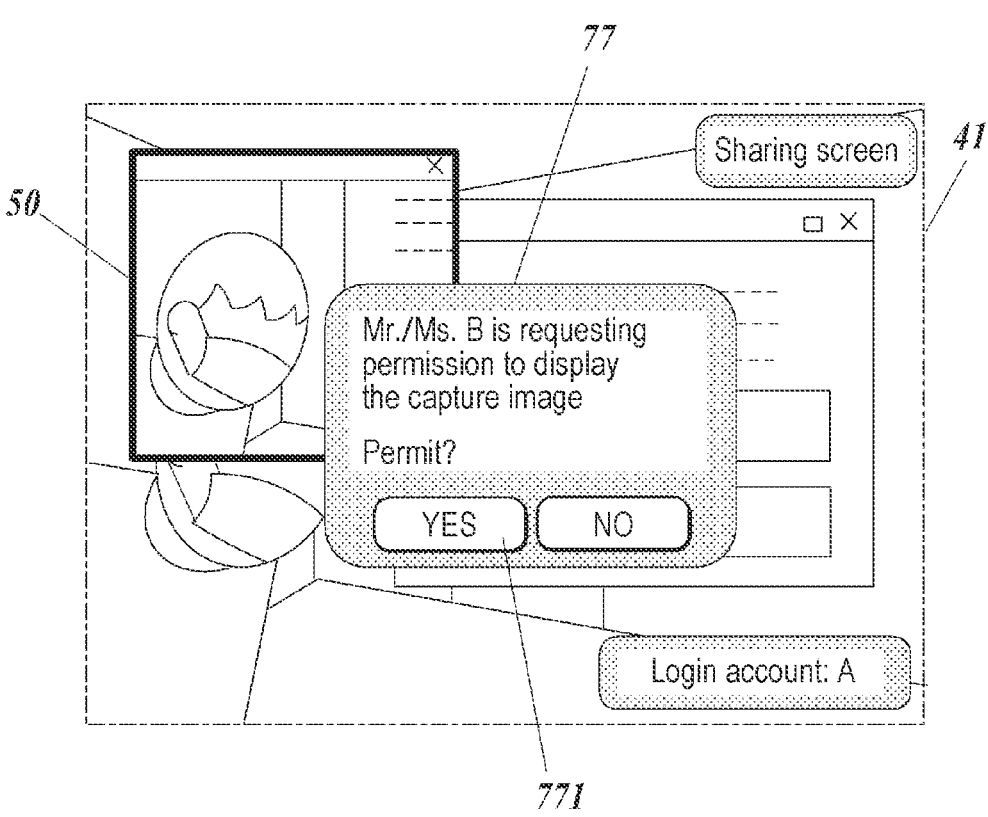
FIG. 43 is a diagram illustrating a virtual dialog image displayed in the visible region in the wearable terminal apparatus while the screen is shared.

As illustrated in FIG. 43, in response to reception of the request signal, a virtual dialog image 77 for asking whether to permit display of the capture image is displayed on the display unit 14 in the wearable terminal apparatus 10. In response to a gesture operation of selecting a YES button 771 of the virtual dialog image 77, a permission signal for permitting display of the virtual capture image 50 is transmitted to the external device 20. In response to reception of the permission signal, the content of the virtual capture image 50 is displayed on the instructor screen 42 of the external device 20.

Third Embodiment

A configuration of a display system 1 according to a third embodiment is described. The third embodiment is different from the first embodiment in that an external information processing apparatus 80 performs part of the process performed by the CPU 11 of the wearable terminal apparatus 10 in the first embodiment. Differences from the first embodiment are described below, and description of common points is omitted. The third embodiment may be combined with the second embodiment.

Figure 44:
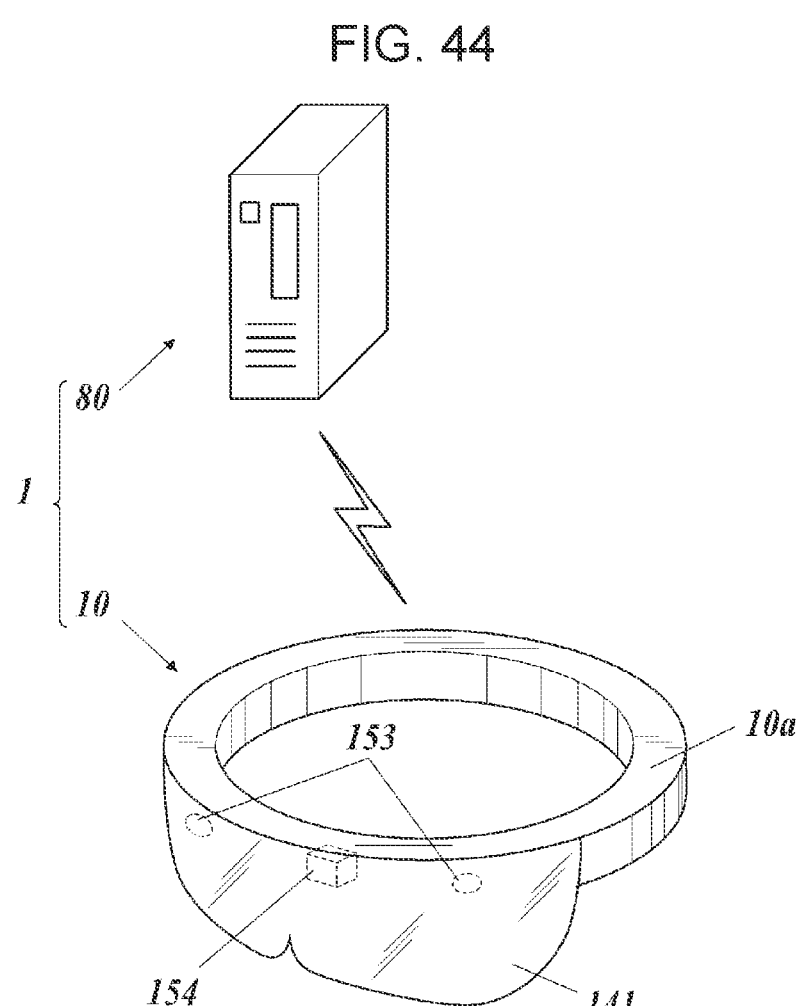
FIG. 44 is a schematic diagram illustrating a configuration of a display system according to a third embodiment.

As illustrated in FIG. 44, the display system 1 includes a wearable terminal apparatus 10 and an information processing apparatus 80 (server) connected to the wearable terminal apparatus 10 by communication. At least part of the communication path between the wearable terminal apparatus 10 and the information processing apparatus 80 may be based on wireless communication. The hardware configuration of the wearable terminal apparatus 10 may be the same as and/or similar to that of the first embodiment, but the processor for performing the same process as the process performed by the information processing apparatus 80 may be omitted. When the present embodiment is combined with the second embodiment, the information processing apparatus 80 may be connected to the network N.

Figure 45:
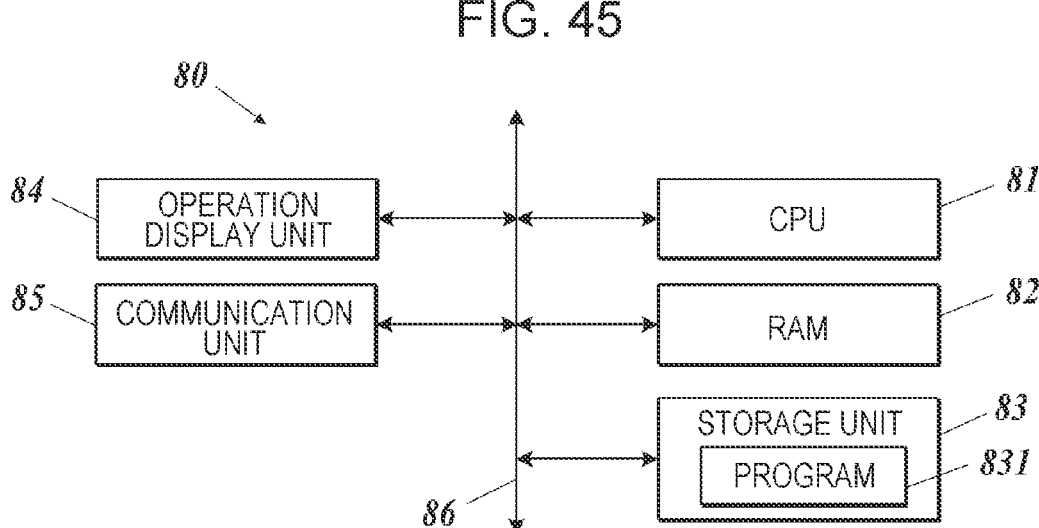
FIG. 45 is a block diagram illustrating a major functional configuration of an information processing apparatus.

As illustrated in FIG. 45, the information processing apparatus 80 includes a CPU 81, a RAM 82, a storage unit 83, an operation display unit 84, and a communication unit 85. These components are connected to one another by a bus 86.

The CPU 81 is a processor that performs various kinds of arithmetic processing and integrally controls operations of the components of the information processing apparatus 80. The CPU 81 reads and executes a program 831 stored in the storage unit 83 to perform various control operations.

The RAM 82 provides a working memory space for the CPU 81 and stores temporary data.

The storage unit 83 is a non-transitory recording medium readable by the CPU 81 which is a computer. The storage unit 83 stores the program 831 to be executed by the CPU 81, various kinds of setting data, and so on. The program 831 is stored in the storage unit 83 in a form of a computer-readable program code. Examples of the storage unit 83 to be used include a nonvolatile storage device such as a solid state drive (SSD) including a flash memory or a hard disk drive (HDD).

The operation display unit 84 includes a display device such as a liquid crystal display and an input device such as a mouse and keyboard. The operation display unit 84 performs various displays such as an operation status and a processing result of the display system 1 on the display device. The operation status of the display system 1 may include an image obtained in real time by the camera 154 of the wearable terminal apparatus 10. The operation display unit 84 converts a user's input operation on the input device into an operation signal and outputs the operation signal to the CPU 21.

The communication unit 85 communicates with the wearable terminal apparatus 10 to transmit and receive data. For example, the communication unit 85 receives data including some or all of the detection results obtained by the sensor unit 15 of the wearable terminal apparatus 10, information related to a user operation (gesture) detected by the wearable terminal apparatus 10, and so on. The communication unit 85 may be capable of communicating with an apparatus other than the wearable terminal apparatus 10.

In the display system 1 thus configured, the CPU 81 of the information processing apparatus 80 performs at least part of the process performed by the CPU 11 of the wearable terminal apparatus 10 in the first embodiment. For example, the CPU 81 may perform three-dimensional mapping of the space 40, based on the detection result obtained by the depth sensor 153. The CPU 81 may detect the visible region 41 of the user in the space 40, based on the detection result obtained by each component of the sensor unit 15. The CPU 81 may generate the virtual image data 132 related to the virtual image 30 in response to an operation of the user of the wearable terminal apparatus 10. The CPU 81 may detect the position and the orientation of the user's hand (and/or finger), based on images obtained by the depth sensor 153 and the camera 154. The CPU 81 may perform a process related to generation of the capture image C and display of the virtual capture image 50.

The processing result obtained by the CPU 81 is transmitted to the wearable terminal apparatus 10 via the communication unit 85. The CPU 11 of the wearable terminal apparatus 10 operates each component (for example, the display unit 14) of the wearable terminal apparatus 10, based on the received processing result. The CPU 81 may transmit a control signal to the wearable terminal apparatus 10 to control the display on the display unit 14 of the wearable terminal apparatus 10.

In this way, the information processing apparatus 80 performs at least part of the process. This allows the apparatus configuration of the wearable terminal apparatus 10 to be simplified and can reduce the manufacturing cost. The use of the information processing apparatus 80 with higher performance can increase the speed and accuracy of various kinds of processing related to MR. Thus, the accuracy of the 3D mapping of the space 40, the display quality on the display unit 14, and the response speed of the display unit 14 relative to a user operation can be increased.

Others

The embodiments described above are merely an example and may be variously changed.

For example, in each of the embodiments described above, the visor 141 having a light-transmitting property is used to allow the user to visually recognize the real space. However, the configuration is not limited to this. For example, the visor 141 having a light-shielding property may be used to allow the user to visually recognize the image of the space 40 imaged by the camera 154. That is, the CPU 11 may cause the display unit 14 to display the image of the space 40 imaged by the camera 154 and the virtual image 30 superimposed on the image of the space 40. Such a configuration can implement MR of merging the virtual image 30 with the real space.

The use of an image of the virtual space generated in advance instead of an image of the real space imaged by the camera 154 can implement VR that creates a sensation of being in the virtual space. In this VR, the visible region 41 of the user is identified, and a portion inside the visible region 41 in the virtual space and the virtual image 30 whose display position is determined to be inside the visible region 41 are displayed. Thus, the background of the capture image C in this case is the virtual space.

The wearable terminal apparatus 10 is not limited to the apparatus having the annular body 10a illustrated in FIG. 1, and may have any structure that has a display unit visually recognizable by the user when the user wears the apparatus. For example, the wearable terminal apparatus 10 may be configured to cover the entire head such as a helmet. The wearable terminal apparatus 10 may have a frame placed on ears such as glasses, and the frame may include various devices built therein.

The various virtual images are not necessarily stationary in the space 40, and may move inside the space 40 along a predetermined trajectory.

An example has been described in which a gesture of a user is detected and accepted as an input operation. However, the configuration is not limited to this. For example, the input operation may be accepted using a controller held by the user in hand or worn by the user on the body for use.

An example has been described in which a voice call is performed between the wearable terminal apparatus 10 and the external device 20. However, the call is not to this and a video call may be performed. In this case, the external device 20 may be provided with a web camera for imaging the remote operator, and image data obtained by the web camera may be transmitted to the wearable terminal apparatus 10 and displayed on the display unit 14.

In addition, specific details of the configuration and control described in the embodiments above can be appropriately changed within the scope not departing from the gist of the present disclosure. The configuration and control described in the embodiments above can be combined as appropriate within the scope not departing from the gist of the present disclosure.

INDUSTRIAL APPLICABILITY

The present disclosure can be used for a wearable terminal apparatus, a program, and an image processing method.

REFERENCE SIGNS 1 display system
10 wearable terminal apparatus

10*a* body
11 CPU (processor)
12 RAM
13 storage unit
131 program
132 virtual image data
14 display unit
141 visor (display member)
142 laser scanner
15 sensor unit
151 acceleration sensor
152 angular velocity sensor
153 depth sensor
154 camera
155 eye tracker
16 communication unit
17 microphone
18 speaker
19 bus
20 external device
21 CPU
23 storage unit
231 program
24 operation display unit
30 virtual image (first virtual image)
31 function bar
32 window shape change button
33 close button
34, 35 virtual image (fourth virtual image, fifth virtual image)
40 space
41 visible region
411 virtual line
412 pointer
42 instructor screen
44 person
45 article
46 text
47 two-dimensional code (code information)
48 object
50 virtual capture image (second virtual image)
50*a* initial display region
50*b* expanded region
51 virtual image region
52 space image region
53 playback button
54 virtual object
61 virtual menu image (third virtual image)
62-65, 71 extracted information virtual image (sixth virtual image)
622, 632, 642, 661-663 icon (indicator)
67-69, 72, 73, 623, 633, 643 virtual image
74, 75, 77 virtual dialog image
76 dialog image
80 information processing apparatus
81 CPU
83 storage unit
831 program
84 operation display unit
C capture image
D image
E composite image
L list region
N network
R capture region
r capture frame
U user

The invention claimed is:

1. A wearable terminal apparatus to be worn by a user for use, comprising:
a camera configured to image a space as a visible region of the user;
at least one circuitry;
a display including a display member having a light-transmitting property, wherein the at least one circuitry is configured to cause a first virtual image to be displayed on a display surface of the display member, the first virtual image being visually recognized in the space that is visually recognized through the display member, wherein
the at least one circuitry is configured to:
identify, as a capture region, a part of the visible region in the space imaged by the camera, based on a first gesture operation of the user;
store a capture image corresponding to the capture region in a storage; and
cause the display to display the capture image as a second virtual image based on the capture image having been stored in the storage.

2. The wearable terminal apparatus according to claim 1, wherein the at least one circuitry is configured to, in response to a second gesture operation of the user, cause the display to display the capture image as a third virtual image.

3. The wearable terminal apparatus according to claim 2, wherein
the at least one circuitry is configured to, in response to the second gesture operation, cause the third virtual image to be displayed at a predetermined relative position with respect to the user, and
the relative position is set in advance for each type of the second gesture operation.

4. The wearable terminal apparatus according to claim 1, wherein the at least one circuitry is configured to cause the second virtual image to be displayed at a position closer to the user than the first virtual image in the space.

5. The wearable terminal apparatus according to claim 1, wherein the at least one circuitry is configured to, in response to a third gesture operation of the user, cause the display to display a fourth virtual image for starting acceptance of the first gesture operation.

6. The wearable terminal apparatus according to claim 5, wherein the at least one circuitry is configured to:
identify the capture region using a different method for a different type of the first gesture operation; and
in response to an operation on the third virtual image, identify a type of the first gesture operation to be accepted.

7. The wearable terminal apparatus according to claim 1, wherein the at least one circuitry is configured to cause an outer frame of the second virtual image to be displayed in a predetermined emphasis style.

8. The wearable terminal apparatus according to claim 1, wherein the at least one circuitry is configured to move the second virtual image in response to a fourth gesture operation of the user on the displayed second virtual image.

9. The wearable terminal apparatus according to claim 1, wherein the at least one circuitry is configured to expand or shrink the second virtual image in response to a fifth gesture operation of the user on the displayed second virtual image, and, in response to the expansion or shrinkage, expand or shrink a range of the capture region to be reflected in the second virtual image.

10. The wearable terminal apparatus according to claim 1, wherein the at least one circuitry is configured to, when at least a part of the first virtual image is included in the capture region, store the capture image including the at least the part of the first virtual image in the storage.

11. The wearable terminal apparatus according to claim 10, wherein the at least one circuitry is configured to delete the first virtual image included in the second virtual image in response to a sixth gesture operation of the user on the displayed second virtual image, and cause, in a region from which the first virtual image is deleted, an image of the space corresponding to the region to be displayed.

12. The wearable terminal apparatus according to claim 11, wherein the at least one circuitry is configured to cause the first virtual image included in the second virtual image to be displayed in a predetermined emphasis style.

13. The wearable terminal apparatus according to claim 10, wherein the at least one circuitry is configured to delete a portion of the second virtual image other than the first virtual image in response to a seventh gesture operation of the user on the displayed second virtual image.

14. The wearable terminal apparatus according to claim 13, wherein the at least one circuitry is configured to cause a portion included in the second virtual image other than the first virtual image to be displayed in a predetermined emphasis style.

15. The wearable terminal apparatus according to claim 10, wherein the at least one circuitry is configured to, when a part of the first virtual image is included in the second virtual image, in response to an eighth gesture operation of the user on the displayed second virtual image, duplicate the first virtual image and cause a duplicate of the first virtual image to be displayed as a fifth virtual image.

16. The wearable terminal apparatus according to claim 10, wherein the at least one circuitry is configured to accept a start of an operation of moving the first virtual image included in the second virtual image using one of two or more moving methods in response to a ninth gesture operation of the user on the second virtual image, and the two or more moving methods include a method of expanding or shrinking a display range of the first virtual image in the second virtual image and a method of moving the first virtual image to outside of the second virtual image.

17. The wearable terminal apparatus according to claim 1, wherein the at least one circuitry is configured to, in response to a tenth gesture operation of the user on the displayed second virtual image, duplicate at least a part of the second virtual image and cause a duplicate of the at least a part of the second virtual image to be displayed as a sixth virtual image.

18. The wearable terminal apparatus according to claim 1, wherein the at least one circuitry is configured to, when an extraction target from which information is extractable is included in the second virtual image, extract the information from the extraction target and cause the display to display the extracted information.

19. The wearable terminal apparatus according to claim 18, wherein the at least one circuitry is configured to translate the extracted information in accordance with a predetermined translation setting or in accordance with a translation setting corresponding to an eleventh gesture operation of the user, and cause the display to display the translated information.

20. The wearable terminal apparatus according to claim 18, wherein the extraction target is at least one selected from the group consisting of a person, an article, a location, text, and code information.

21. The wearable terminal apparatus according to claim 1, wherein the at least one circuitry is configured to, when an extraction target from which information is extractable is included in the second virtual image, cause the display to display an indicator for starting an application predetermined in accordance with a type of the extraction target.

22. The wearable terminal apparatus according to claim 21, wherein the at least one circuitry is configured to:

cause the display to display a seventh virtual image including the information extracted from the extraction target, and cause the indicator to be displayed on at least one of a first surface of the seventh virtual image or a second surface of the seventh virtual image opposite to the first surface.

23. The wearable terminal apparatus according to claim 1, wherein the at least one circuitry is configured to:

acquire position information of the wearable terminal apparatus in response to the first gesture operation, and store the acquired position information in the storage in association with the capture image.

24. The wearable terminal apparatus according to claim 1, wherein the at least one circuitry is configured to:

identify the user in response to the first gesture operation, and store user information of the identified user in the storage in association with the capture image.

25. The wearable terminal apparatus according to claim 1, wherein the at least one circuitry is configured to:

determine whether a predetermined capture prohibited target is included in the capture region, and not store the capture image in the storage when determining that the capture prohibited target is included in the capture region.

26. The wearable terminal apparatus according to claim 1, wherein the at least one circuitry is configured to:

acquire position information of the wearable terminal apparatus in response to the first gesture operation, and not store the capture image in the storage when a position indicated by the position information satisfies a predetermined position prohibition condition.

27. The wearable terminal apparatus according to claim 1, further comprising:

a communicator configured to perform data communication with an external device, wherein the at least one circuitry is configured to not store the capture image in the storage when the communicator receives a specific signal.

28. The wearable terminal apparatus according to claim 1, further comprising:

a communicator configured to perform data communication with an external device, wherein the communicator is configured to perform the data communication via a predetermined communication network, and the at least one circuitry is configured to not store the capture image in the storage when a predetermined connection condition related to a connection state of the communicator to the communication network is satisfied.

29. The wearable terminal apparatus according to claim 1, further comprising:

a microphone configured to convert sound into audio data, wherein the at least one circuitry is configured to, when storing the capture image in the storage, acquire the audio data and store the audio data in the storage in association with the capture image.

30. The wearable terminal apparatus according to claim 1, wherein the at least one circuitry is configured to cause the second virtual image to be displayed on a surface of a predetermined display target located in the space or at a position satisfying a predetermined positional relationship with the display target.

31. The wearable terminal apparatus according to claim 30, wherein the at least one circuitry is configured to move a display position of the second virtual image in accordance with movement of the display target in the space.

32. The wearable terminal apparatus according to claim 31, wherein the at least one circuitry is configured to cause the second virtual image that enlarges as a distance between the user and the display target decreases to be displayed.

33. The wearable terminal apparatus according to claim 30, wherein the at least one circuitry is configured to change an orientation of the second virtual image in accordance with a change of an orientation of the display target.

34. The wearable terminal apparatus according to claim 30, wherein the display target is an object, a person, or any virtual image other than the second virtual image in the space.

35. A non-transitory computer-readable storage medium storing a program for causing a computer provided in a wearable terminal apparatus to perform a process, the wearable terminal apparatus being an apparatus to be worn by a user for use, the wearable terminal apparatus including a camera to image a space as a visible region of the user, the process comprising:

identifying, as a capture region, a part of the visible region in the space imaged by the camera, based on a first gesture operation of the user;

storing a capture image corresponding to the capture region in a storage;

acquiring position information of the wearable terminal apparatus in response to the first gesture operation; and storing the acquired position information in the storage in association with the capture image.

36. An image processing method to be executed by a computer provided in a wearable terminal apparatus that is to be worn by a user for use and includes a camera to image a space as a visible region of the user, the image processing method comprising;

identifying, as a capture region, a part of the visible region in the space imaged by the camera, based on a first gesture operation of the user;

storing a capture image corresponding to the capture region in a storage;

determining whether a predetermined capture prohibited target is included in the capture region; and not storing the capture image in the storage when determining that the capture prohibited target is included in the capture region.

* * * * *